US011166438B2

(12) United States Patent
Thrane

(10) Patent No.: US 11,166,438 B2
(45) Date of Patent: Nov. 9, 2021

(54) BROILER CONTAINER WITH A BASE AND SIDE WALLS, WHICH IS DESIGNED AND SET UP FOR RECEIVING AND HOLDING AT LEAST FIVE LIVING BROILERS, IN PARTICULAR AS PART OF A UNIT, AND AN ARRANGEMENT OF A TRANSPORT TRAILER

(71) Applicant: LINCO FOOD SYSTEMS A/S, Trige (DK)

(72) Inventor: Uffe Thrane, Hammel (DK)

(73) Assignee: Linco Food Systems A/S, Trige (DK)

( * ) Notice: Subject to any disclaimer, the term of this patent is extended or adjusted under 35 U.S.C. 154(b) by 134 days.

(21) Appl. No.: 16/019,149

(22) Filed: Jun. 26, 2018

(65) Prior Publication Data

US 2019/0110443 A1 Apr. 18, 2019

Related U.S. Application Data

(63) Continuation of application No. 15/116,806, filed as application No. PCT/EP2015/052398 on Feb. 5, 2015, now Pat. No. 10,660,314.

(30) Foreign Application Priority Data

Feb. 5, 2014 (DK) .............................. PA201470058
Feb. 5, 2014 (DK) .............................. PA201470060

(Continued)

(51) Int. Cl.
*A01K 31/00* (2006.01)
*A01K 31/07* (2006.01)
(Continued)

(52) U.S. Cl.
CPC .......... *A01K 31/005* (2013.01); *A01K 31/002* (2013.01); *A01K 31/07* (2013.01);
(Continued)

(58) Field of Classification Search
CPC .... A01K 31/002; A01K 31/005; A01K 31/07; A01K 45/005; B65D 21/0209
See application file for complete search history.

(56) References Cited

U.S. PATENT DOCUMENTS 1,451,760 A * 4/1923 Bucks .................... A01K 31/18
                                                                        119/490
1,619,895 A * 3/1927 Tarman .................. B65D 85/50
                                                                        119/496

(Continued)

FOREIGN PATENT DOCUMENTS

CN         2344338 Y     10/1999
CN         2871426 Y     2/2007

(Continued)

OTHER PUBLICATIONS

"Overview on current practices of poultry slaughtering and poultry meat inspection" by Dr. Ulrich Löhren, Supporting Publications 2012: EN 298.

(Continued)

*Primary Examiner* — Michael H Wang
(74) *Attorney, Agent, or Firm* — David B. Tingey; Bryant J. Keller; Kirton McConkie

(57) ABSTRACT

The invention relates to broiler containers having a floor and side walls defining an inner volume which is designed and configured to receive and accommodate at least five live broilers, wherein the broiler container is designed and configured to be stackable with broiler containers of the same construction and has at least one ventilation opening and at least one air outflow opening, which broiler container is characterised in that the broiler container comprises at least one segment of a ventilation or air outflow column which extends through the inner volume and has at least one ventilation or air outflow opening at a distance from the side walls, wherein each segment of the ventilation or air outflow (Continued)

column is designed and configured for connection to corresponding segments of broiler containers of the same construction and also for connection to an active ventilation system. The invention relates also to a unit comprising at least two containers, to an arrangement comprising a unit and a ventilation system, to a transport trailer, to a poultry slaughterhouse, and to a method for ventilating the broilers.

20 Claims, 40 Drawing Sheets

(30) Foreign Application Priority Data

| Feb. 5, 2014 | (DK) | PA201470061 |
|---|---|---|
| Feb. 5, 2014 | (DK) | PA201470062 |
| Feb. 5, 2014 | (DK) | PA201470063 |
| Feb. 5, 2014 | (DK) | PA201470064 |

(51) Int. Cl.
  *A01K 45/00* (2006.01)
  *B65D 85/50* (2006.01)
  *B65D 21/02* (2006.01)

(52) U.S. Cl.
  CPC ........ *A01K 45/005* (2013.01); *B65D 21/0209* (2013.01); *B65D 85/50* (2013.01); *B65D 2205/00* (2013.01)

(56) References Cited

U.S. PATENT DOCUMENTS

| 1,664,308 | A | * | 3/1928 | Miller | B65D 5/4295 |
|---|---|---|---|---|---|
| | | | | | 229/120.1 |
| 2,026,417 | A | * | 12/1935 | Conway | B65D 5/4295 |
| | | | | | 119/490 |
| 2,260,999 | A | * | 10/1941 | Mann | B61D 27/0081 |
| | | | | | 454/88 |
| 2,610,567 | A | * | 9/1952 | Davis | B60H 1/00014 |
| | | | | | 454/118 |
| 2,900,955 | A | * | 8/1959 | Danielsen | B65D 5/48024 |
| | | | | | 119/490 |
| 3,108,569 | A | * | 10/1963 | Kundikoff | A01K 31/002 |
| | | | | | 119/490 |
| 3,306,258 | A | * | 2/1967 | Hunt | A01K 1/0245 |
| | | | | | 119/496 |
| 3,339,725 | A | * | 9/1967 | Hamilton | B65D 71/42 |
| | | | | | 206/499 |
| 3,407,961 | A | * | 10/1968 | Box | A01K 31/07 |
| | | | | | 206/511 |
| 3,602,455 | A | * | 8/1971 | Lewis | B65H 49/08 |
| | | | | | 242/129 |
| 3,710,761 | A | * | 1/1973 | Gregory | A01K 1/0245 |
| | | | | | 119/496 |
| 3,777,710 | A | * | 12/1973 | Rhinehart | A01K 31/002 |
| | | | | | 119/454 |
| 3,965,865 | A | * | 6/1976 | Kundikoff | A01K 31/002 |
| | | | | | 119/490 |
| 4,245,773 | A | * | 1/1981 | Stollberg | B65D 5/003 |
| | | | | | 206/509 |
| 4,285,299 | A | * | 8/1981 | Thomas | A01K 45/005 |
| | | | | | 119/453 |
| 4,342,393 | A | * | 8/1982 | Box | B65D 21/0202 |
| | | | | | 206/504 |
| 4,454,837 | A | * | 6/1984 | Luebke | B60P 3/04 |
| | | | | | 119/401 |
| 4,481,870 | A | * | 11/1984 | Smith | A01K 45/005 |
| | | | | | 454/88 |
| 4,482,051 | A | * | 11/1984 | Cantey, Jr. | B65D 71/70 |
| | | | | | 206/386 |
| 4,492,361 | A | | 1/1985 | Jacquet et al. | |
| 4,508,062 | A | | 4/1985 | Berry et al. | |
| 4,846,109 | A | * | 7/1989 | Baer | B65D 21/0224 |
| | | | | | 119/496 |
| 4,998,967 | A | * | 3/1991 | Box | A01K 31/002 |
| | | | | | 119/489 |
| 5,165,363 | A | * | 11/1992 | McGinty | A01K 39/0106 |
| | | | | | 119/464 |
| 6,135,872 | A | | 10/2000 | Freeland et al. | |
| 6,382,141 | B1 | | 5/2002 | Maynor | |
| 6,543,387 | B1 | * | 4/2003 | Stein | A01K 1/0245 |
| | | | | | 119/419 |
| 6,581,544 | B1 | * | 6/2003 | Smith | B60P 3/04 |
| | | | | | 119/401 |
| 6,817,316 | B1 | | 11/2004 | Roussy | |
| 7,007,808 | B2 | * | 3/2006 | Morgan | A47F 5/01 |
| | | | | | 211/41.11 |
| 7,794,310 | B2 | | 9/2010 | Lang | |
| 7,882,806 | B2 | * | 2/2011 | Ver Hage | A01K 1/031 |
| | | | | | 119/418 |
| 8,794,187 | B2 | * | 8/2014 | Smith | B60P 3/04 |
| | | | | | 119/401 |
| 9,346,613 | B2 | * | 5/2016 | De Muinck | B65D 88/741 |
| 2003/0056731 | A1 | * | 3/2003 | Darby | A01K 31/002 |
| | | | | | 119/72 |
| 2005/0133577 | A1 | * | 6/2005 | Bowman | B65D 5/2057 |
| | | | | | 229/116.5 |
| 2007/0026781 | A1 | | 2/2007 | Lang et al. | |
| 2012/0192800 | A1 | * | 8/2012 | Zanotti | A01K 31/002 |
| | | | | | 119/489 |
| 2012/0294988 | A1 | * | 11/2012 | Munro | B65D 5/4295 |
| | | | | | 426/132 |
| 2013/0074777 | A1 | * | 3/2013 | Smith | B60P 3/04 |
| | | | | | 119/401 |
| 2013/0125826 | A1 | * | 5/2013 | Meter | A01K 39/00 |
| | | | | | 119/302 |
| 2014/0299067 | A1 | * | 10/2014 | Foreman | A01K 31/005 |
| | | | | | 119/453 |
| 2015/0115024 | A1 | * | 4/2015 | Finol | B65D 5/4608 |
| | | | | | 229/117.16 |
| 2016/0345545 | A1 | * | 12/2016 | Huisinga | A01K 31/005 |

FOREIGN PATENT DOCUMENTS

| CN | 2887785 Y | 4/2007 |
|---|---|---|
| CN | 201856956 U | 6/2011 |
| EP | 0326422 A2 | 9/1989 |
| EP | 0384530 A1 | 8/1990 |
| EP | 0867113 A2 | 9/1998 |
| EP | 1330952 B1 | 8/2005 |
| FR | 2915849 A1 | 11/2008 |
| GB | 1074164 A | 6/1957 |
| GB | 1110471 A | 4/1968 |
| GB | 1274834 Y1 | 5/1972 |
| GB | 1327641 A | 8/1973 |
| GB | 2129672 A | 5/1984 |
| JP | S47-31820 A | 9/1972 |
| KR | 20120032717 A | 4/2012 |
| RU | 91253 U1 | 2/2010 |
| WO | 2011/010329 A1 | 1/2011 |

OTHER PUBLICATIONS

International Search Report dated Mar. 30, 2015 from International Patent Application No. PCT/EP2015/052398 filed Feb. 5, 2015.
International Search Report dated Mar. 27, 2015 from International Patent Application No. PCT/EP2015/052390 filed Feb. 5, 2015.
Exam Report dated May 5, 2014 from Denmark Patent Application No. PA201470064.
Exam Report dated May 1, 2014 from Denmark Patent Application No. PA201470058.
Exam Report dated May 5, 2014 from Denmark Patent Application No. PA201470060.
Exam Report dated May 1, 2014 from Denmark Patent Application No. PA201470061.
Exam Report dated May 9, 2014 from Denmark Patent Application No. PA201470062.

(56) References Cited

OTHER PUBLICATIONS

Exam Report dated May 5, 2014 from Denmark Patent Application No. PA201470063.
International Preliminary Report on Patentability dated Aug. 9, 2016 from International Patent Application No. PCT/EP2015/052398, filed Feb. 5, 2015.
International Preliminary Report on Patentability dated Aug. 9, 2016 from International Patent Application No. PCT/EP2015/052390, filed Feb. 5, 2015.
Office Action dated Jun. 13, 2017 from Japanese Patent Application No. JP2016-550539, filed Feb. 5, 2015.
Exam and Search Report dated Oct. 10, 2017 from Russian Patent Application No. RU2016132371, filed Oct. 18, 2017.
Office Action dated Aug. 3, 2018 from U.S. Appl. No. 15/116,806, filed Aug. 4, 2016.

\* cited by examiner

BROILER CONTAINER WITH A BASE AND SIDE WALLS, WHICH IS DESIGNED AND SET UP FOR RECEIVING AND HOLDING AT LEAST FIVE LIVING BROILERS, IN PARTICULAR AS PART OF A UNIT, AND AN ARRANGEMENT OF A TRANSPORT TRAILER

CROSS REFERENCE TO RELATED APPLICATION

This application is a continuation of U.S. patent application Ser. No. 15/116,806, filed on Aug. 4, 2016, which is a National Stage of International Patent Application No. PCT/EP2015/052398, filed on Feb. 5, 2015, which claims the benefit of Danish Patent Application Nos. PA 2014, 70061, filed on Feb. 5, 2014; PA 2014, 70064, filed on Feb. 5, 2014; PA 2014, 70062, filed on Feb. 5, 2014; PA 2014, 70060, filed on Feb. 5, 2014; PA 2014, 70063, filed on Feb. 5, 2014; and PA 2014, 70058, filed on Feb. 5, 2014, the disclosures of which are hereby incorporated entirely herein by reference.

BACKGROUND

Technical Field

The present invention relates to a broiler container having a floor and side walls defining an inner volume which is designed and configured to receive and accommodate at least five live broilers, wherein the broiler container is designed and configured to be stackable with broiler containers of the same construction and has at least one ventilation opening and at least one air outflow opening.

State of the Art

Broiler containers (also called broiler transport containers, transport containers or containers in the following) of this type are known from GB 2 129 672 A and EP 0 867 113 A2, for example, and are very widely used in the transport of poultry from farms to slaughterhouses.

The invention relates also to a unit (also called a transport unit or broiler transport unit in the following) which is designed and configured to receive and accommodate live broilers during rearing and/or during transport of the broilers to the slaughterhouse and/or while the live broilers are awaiting processing in the region of the slaughterhouse, comprising at least two containers. Broilers can be transported from farms to slaughterhouses in broiler transport units as described in WO 2011/010329 and U.S. Pat. No. 6,382,141, wherein during transport the broilers are supplied with fresh air by natural ventilation, which is effected by the movement of the trailer, and ventilation air can be guided to the outside of the broiler transport units when the trailer is stopped.

Broilers are slaughter-ready chickens or hens or turkeys which are reared to be ready for slaughter for supplying meat to consumers, and they have fully developed plumage and a considerable weight of at least 1.6 kg per broiler.

An overview of current practices is given by the European Food Safety Authority in the scientific report "Overview on current practices of poultry slaughtering and poultry meat inspection" by Dr. Ulrich Löhren, Supporting Publications 2012: EN-298. In the report, the transport containers are referred to as crates and are to be distinguished from liners, which are cages that are fixed to the truck and cannot be unloaded, and container systems, which are transport units having a plurality of floors in a fixed frame, as described, for example, in EP 0 384 530 A1. According to the report, 30% of broilers are currently (2012) transported in the broiler transport containers that are relevant for the present invention, and 70% are transported in container systems.

As described in GB 2 129 672 A, European regulations require broiler containers with fixed floors, the main purpose of which is to prevent bird droppings from containers that are situated at the top of a stack of containers from falling onto birds in containers beneath. Units comprising at least two broiler containers are known from EP 1 330 952 B1 and EP 0 384 530 A1, for example, and are very widely used in the transport of poultry from farms to slaughterhouses and provide a very high transport capacity. The basis of the broiler transport containers is that they are placed in frame systems as described in EP 1 330 952 B1, for example, and held therein during transport. These frames must also be cleaned and, because of their size, require very large washing machines.

Transport units having a plurality of floors are currently filled by filling a floor starting with the lower floor. An example thereof is described in EP 0 384 530 A1, where part of the upper floors is pushed to the side in order to gain access to the lower floor. After the lower floor has been loaded, the floor above it is closed and the loading operation is continued on that floor, and so on, until the transport unit is fully loaded. The displacement of floor regions for opening and closing access is simple and can be carried out quickly and reliably. This is considered to be one of the factors which explain the extensive use of transport units for broiler transport. Systems for catching and feeding broilers are widespread because they permit mechanical catching of the broilers. A broiler catcher is described in U.S. Pat. No. 4,508,062, and such systems currently deliver broilers at rates of from 50 per minute to more than 200 per minute. The loading of broilers into the transport units accordingly takes place quickly, and easy and reliable operation of the transport unit during loading is a factor to be taken into consideration.

SUMMARY

These regulations have been set aside, however, because it has proved to be impossible in practice to achieve adequate ventilation of broiler transport containers with fixed floors. Although the problem of bird droppings is very relevant, inadequate ventilation not only leads to a larger number of birds dying during transport, but also to reduced meat quality owing to increased stress levels in the live birds. The number of birds which are dead on arrival (DOA) at the slaughterhouse and the frequency of so-called PSE (pale, soft, exudative) meat, which is a sign of stress, are widely used parameters for assessing the efficiency of broiler transport.

Openings in the floors of the broiler transport containers, on the other hand, are associated with the risk of birds becoming caught therein, in particular in the case of longer journeys during which, for example, a toe protruding into an opening may swell and the toe may become trapped in the floor.

Even in the case of broiler transport containers or in the case of units formed from a plurality of containers having a very large number of openings both in the floors and in the side walls, it has proved difficult to ensure adequate ventilation, in particular during warm weather conditions, even if transport takes place during the night or in the early hours of the morning. When a trailer or truck is not moving, for example if the truck transporting the broiler transport containers or stack thereof comes to a halt, for example in a traffic jam, the natural ventilation decreases because the airstream which is produced when the vehicle is moving disappears. In order to achieve more reliable ventilation, trailers or trucks have been provided with mechanical ventilation by positioning ventilators at the end of the vehicle which ventilate an aisle, or by positioning ventilators at the side of the vehicle which ventilate across the vehicle. Despite these efforts, the percentage of reduced-quality meat due to stress-related imperfections such as PSE is still considerable, and the welfare of the broilers during transport is a concern.

Both broiler transport containers and container systems are excellent from the point of view only of transport from the farm to the slaughterhouse, but experience has shown that they are relatively difficult to clean, which leads to a risk of cross-infection between farms if broiler containers or container systems are returned for use in another transport cycle. In order to counteract this potential biological safety problem, most slaughterhouses are equipped with advanced cleaning systems, including highly specialised container washing apparatuses and frequently also soaking tanks.

Both the frames as such and also, in particular, the broiler transport containers can be associated with a particular cross-infection problem which involves the accumulation of dirt in the floor structure, because they are usually set down directly onto the floor of the shed, which is naturally contaminated with bird droppings. The reinforcing ribs on the floor of the broiler transport containers typically extend in crossed patterns, with the result that a floor has many rows of cubic cavities in which dirt can accumulate and adhere to the sides of the ribs. The frames have recesses for the forks of a forklift truck. On driving with the frame in the shed immediately before loading onto the transport trailer, dirt from the floor is scraped into the recesses and transferred to the trailer together with the frame with the broiler transport containers carrying the live broilers. Such an accumulation of dirt can lead to a large amount of dirt being loaded onto the trailer.

The invention relates also to an arrangement comprising at least one unit according to any one of claims 24 to 30 and at least one ventilation system.

The invention relates also to a transport trailer designed and configured to transport units in particular according to any one of claims 24 to 30, which are designed and configured to receive and accommodate live broilers, to a slaughterhouse.

The carrying capacity of a transport trailer is typically limited to approximately 24 t for a standard trailer, and the loading capacity is typically limited in terms of height to 2.7 m for a standard trailer. Different limits can apply for special trailer sizes, such as, for example, for trailers having twin-axle chassis or for trailers having additional chassis, extra-large trucks, etc. However, the problem with current broiler transport trailers and broiler transport container systems, namely that dirt accumulates and accumulations of dirt in the floor regions are carried onto the trailer, is independent of the type of trailer.

The invention relates also to a method for ventilating live broilers during rearing and/or during transport of the broilers to the slaughterhouse and/or while the live broilers are awaiting processing in the region of the slaughterhouse. The broiler transport units are loaded with broilers on the farm and are then loaded onto the broiler transport trailer and transported to the slaughterhouse, where the broiler transport units are unloaded from the trailer before the broilers are processed. The broiler transport units with broilers can be unloaded and left at the slaughterhouse, and empty broiler transport units, for example, can be loaded onto the trailer, which is then driven to the farm to be loaded with broilers again.

If a trailer or truck is not moving, for example if the truck transporting the broiler transport units comes to a halt, for example in a traffic jam, the natural ventilation decreases because the wind caused by the speed of the moving vehicle disappears. In order to achieve more reliable ventilation, trailers or trucks have been provided with mechanical ventilation by positioning ventilators at the end of the vehicle which ventilate an aisle, or by positioning ventilators at the side of the vehicle which ventilate across the vehicle.

The invention relates also to a broiler slaughterhouse having a broiler lairage region for live poultry.

Lairage regions are used for accommodating the poultry after it has been unloaded from the vehicle transporting it to the slaughterhouse until it is received in the processing system of the slaughterhouse. The lairage region serves as a buffer and allows for transport delays caused by traffic and other circumstances. Different countries have different lairage requirements, but regulations generally require that every animal is protected from adverse weather conditions and that any animal exposed to high temperatures during humid weather is cooled by suitable means. In order to meet these requirements and prevent the time in lairage from increasing the stress levels of the poultry, which could impair the quality of the meat, many large slaughterhouses have invested heavily in lairage buildings. These buildings are air-conditioned and frequently also equipped with special lighting and conveying systems for transporting the poultry transport unit, in order to optimise the delivery of the poultry to stunning and slaughtering sections of the slaughterhouse. This works very well but is associated with considerable investment and operating costs.

It is an object of the present invention to provide a broiler container which allows the keeping of broilers with less stress and improved hygiene for the broilers, in particular during transport, in order to improve the welfare of the broilers and the resulting quality of the meat. The object further consists in proposing a corresponding method.

In light of the above, the broiler container according to the present invention is characterised in that the broiler container comprises at least one segment of a ventilation or air outflow column which extends through the inner volume and has at least one ventilation or air outflow opening at a distance from the side walls, wherein each segment of the ventilation or air outflow column is designed and configured for connection to corresponding segments of broiler containers of the same construction and also for connection to an active ventilation system. The term "segment" in connection with the ventilation or air outflow column means that it can be a longitudinal-axis section of a column or a cross-sectional section of a column. Using the example of a cylindrical column, the segment for a longitudinal-axis section can describe a section of a column having a circular cross-section, that is to say a column of small height. The segment for a cross-sectional section can, however, also describe a section of the column that is semicircular or quadrant-shaped. The joining of a plurality of segments of adjacent containers leads in all cases to a common column. Each ventilation column can also be an air outflow column, depending on whether an overpressure or a low pressure is generated by the ventilation system. Therefore, any reference in the following to a ventilation column can correspondingly also mean the air outflow column and vice versa. Reference is also made generally only to the column in the following.

The broiler container is preferably of a size and is also designed and configured for transporting the broilers. However, the broiler container can optionally also be used as a stationary container for rearing (so-called nesting) or while the live broilers are awaiting processing in the region of the slaughterhouse, which includes stunning (so-called gas stunning) of the broilers.

The broiler container preferably has a carrying capacity of at least 45 kg/m$^2$, and the at least one ventilation or air outflow opening of the segment of the ventilation or air outflow column is situated in the inner volume at a distance of at least 0.17 m from the side walls. For sufficiently efficient broiler transport, it is important that the broiler transport container has a floor with a carrying capacity of at least 45 kg/m$^2$. In connection with the present invention it has been found that, if the carrying capacity of the floor is less than 45 kg/m$^2$, it is not possible to load at least 28 broilers per square metre, and this would allow broilers to experience discomfort during transport because they are able to move around. Broilers are gregarious animals which feel comfortable when they are close to one another. This behaviour can be observed in the breeding region, where the floor typically has a very large surface area. At the beginning, when the birds are small, they tend to cluster together in a small area, and when they grow, they occupy an ever larger portion of the floor area. When they have grown to a slaughter-ready broiler size, they typically fill the entire floor area, and this has then already been the case for some time. Transport is a completely new experience for the broilers, and it is considered to be an advantage if they are all kept very close to one another. It would be best if they could be so close together that they can also support one another at the sides when the trailer travels round a bend. However, the closer they are together, the more difficult it becomes to provide the correct ventilation for broilers in the inner portions of the inner volume.

The provision of at least one ventilation opening in the inner volume of the broiler transport container at a distance from the side walls provides adequate ventilation for the broilers that are situated in the inner volume behind at least one outer row of other broilers. In containers of the prior art having a large number of ventilation openings in the side walls and in the floor, the ventilation for broilers inside the container is not considered to be adequate or effective enough under all transport conditions, and it is now believed that this is caused by the fully developed plumage of the broilers.

During transport, the outermost line or row of broilers can block or hinder ventilation from outside into the broiler transport container through the side walls, and the ventilation rate flowing upwards through the floor can likewise be insufficient, because the plumage of the broilers represents a barrier to ventilation in the vertical direction in the inner volume of the broiler transport container. When the broilers are upset, for example when travelling over a bumpy road, they may lift their wings and thereby also block the headspace in the upper portion of the inner volume. The broiler transport container according to the present invention has at least one ventilation column which extends into the inner volume, and this ventilation column improves the ventilation conditions for broilers which are surrounded by other broilers in the container, to a considerable degree.

At least one ventilation opening is situated in the inner volume with a distance of at least 0.17 m between the opening and all the side walls. The distance of at least 0.17 m ensures that there is a ventilation opening within the inner volume for supplying ventilation to broilers behind broilers that are standing along the side walls. When transporting turkey broilers, it may be expedient to increase the distance of the at least one ventilation opening from the side walls. Further ventilation openings in the inner volume of the broiler transport unit can be provided at larger distances from the side walls, in particular when the broiler transport container is of a size for transporting a large number of broilers.

The at least one ventilation column extending into the inner volume and the at least one ventilation opening at a distance from the side walls allow each broiler transport container to be ventilated from inside the container outwards, which is in contrast to broiler transport containers of the prior art, in which ventilation takes place from the outside inwards through the side walls and the floor. Ventilation from within the inner volume provides better ventilation to broilers standing in the inner volume behind other broilers at the side walls, and the birds are better able to dissipate the heat generated during their stay in the transport container. The conditions for the broilers are thus better, and the extreme stress situations caused by overheating are minimised or avoided. The occurrence of PSE meat in the meat obtained after slaughtering is expected to be very low.

In one embodiment, the broiler transport container has four side walls which form two pairs of opposing side walls, the at least one segment for forming at least one ventilation or air outflow column extends from the floor upwards through the inner volume, the at least one ventilation or air outflow column is preferably formed integrally with the floor, and the at least one ventilation or air outflow column is optionally situated in at least one row between one pair of opposing side walls at a distance of approximately $D/(N+1)$, where D is the distance between the one pair of opposing side walls and N is the number of ventilation or air outflow columns in the at least one row. The at least one ventilation column is preferably integral with the floor, for example injection moulded together with the floor. Because the ventilation column extends from the floor upwards, the at least one ventilation opening can be situated at such a height in the inner volume, and amongst the broilers, that ventilation air is provided above the breast height of the broilers, so that the necks of the broilers are free in fresh air. The plumage of some broilers accordingly does not block air to nearby broilers. In this embodiment, the ventilation air is supplied sufficiently evenly to the inner regions of the inner volume in the broiler transport container, to the advantage of the welfare of the broilers. The embodiment with the spacing of approximately $D/(N+1)$ is advantageous in particular with regard to symmetry, because the broiler transport containers can be stacked with the one end or the other end facing the operator and the at least one ventilation column nevertheless fits a corresponding ventilation column in the lower broiler transport container, and it is expedient for the operator that a broiler transport container cannot be wrongly oriented during stacking, particularly because the final placement of an empty container can occur at the same time as the position of a broiler delivery opening in a broiler loading device can be shifted in order to deliver broilers into the empty container.

The ventilation column further subdivides the floor region, which can counteract a tendency of broilers in the container all to move towards one location, where some of them can become trapped, and the distance between the side walls and the column ensures that broilers can still stand in the region between the column and the side walls without becoming trapped. In this respect too, the ventilation column thus improves the welfare of the broilers, particularly when the broiler transport container is large and three, four or five ventilation columns are provided per container.

The broiler transport container can also have a triangular base area and three side walls or a polygonal base area and five or more side walls.

The shape and size of the at least one ventilation column should preferably be chosen with due regard to keeping a relatively large inner floor surface region available for the broilers. In one embodiment, the at least one ventilation column has an annular cross-section with a hollow middle, which extends over the height of the column. Such a construction offers even surfaces, preferably without corners in the column, which is advantageous for cleaning after each broiler transport.

The filling of broilers into the broiler transport container can take place very quickly, for example at a rate of from 50 to more than 200 broilers per minute, and the individual broilers can enter the broiler transport container at a very high speed. It is advantageous if the at least one column is of such a shape that it is suitable for contact with broilers that hit the column with some speed, because the risk of injuries such as bruising and broken wings should preferably be minimised. If the ventilation column has an outside diameter in the range of from 7 cm to 30 cm, such as, for example, in the range of from 10 cm to 24 cm, preferably in the range of from 12 cm to 21 cm, the risk of injury to the broilers is low. If the diameter is much smaller than 7 cm, a wing can be exposed to high local stresses if the broiler enters the container at high speed. If the diameter is much larger than 30 cm, the column occupies too much floor space. It is currently considered to be particularly advantageous if the column is both rounded, possibly even has a circular cross-section, and has a diameter within the ranges indicated above.

In general, a larger surface area of the individual ventilation columns reduces the risk of injury, but the shape of the columns and in particular the absence of sharp edges are likewise advantageous. A large surface area (e.g. with a large diameter) of the individual column also offers a better possibility of distributing the ventilation openings on the column over a larger portion of the inner volume and thus ensuring a more even distribution of ventilation air to broilers situated in the inner regions of the inner volume.

The size and shape of the individual ventilation openings can vary greatly, for example according to the size and shape and positions of the ventilation columns, but in a preferred embodiment the opening areas of the ventilation openings in the at least one ventilation column have a total area in the range of from 0.5% to 10% of the area or of the floor of the broiler transport container. These opening areas serve to supply ventilation air into the inner volume, and other ventilation openings for transporting air out of the inner volume can additionally be provided. The opening areas must have a specific size in order to achieve good air distribution to all the broilers in the inner volume of the broiler transport container, and the opening area also influences the speed of the air flowing through the ventilation openings for a given ventilation rate. If the total area is greater than 10%, the air speed may become too slow for air to reach into the inner volume over a sufficient distance from the opening. On the other hand, if the total area is less than the mentioned 0.5%, the speed of the air is so high that broilers standing close to the ventilation opening become stressed by the influx of air.

If the ventilation openings in the ventilation column have a total area in the range of from 1.5% to 7% of the area or of the floor, all the broilers can be supplied with a sufficient amount of ventilation air to keep them at a level of comfort which allows the broilers to sleep without heavy breathing for relief from heat, and at the same time the ventilation rates are within the levels of comfort.

If the ventilation openings in the ventilation column have a total area in the range of from 2% to 4% of the area or of the floor, conditions are excellent for most of the broilers. Some of the broilers situated at the greatest distances from ventilation openings may have less optimum conditions, but they are nevertheless conditions which would not be expected to cause concern in relation to welfare and the occurrence of PSE in the meat.

With regard to the area of the ventilation openings in the ventilation column, it is noted that the openings are situated in the inner volume of the broiler transport container and that the ventilation opening area as such is not comparable with ventilation opening areas for openings in the side wall or in the floor of the container.

It is also noted that it is possible to apply in the ventilation columns either an overpressure for supplying air into the inner volume via the ventilation openings or a low pressure for drawing air out of the inner volume via the ventilation openings, but in any case the inner volume is ventilated from within the inner volume and not only by air that is blown in from outside the side walls or the floor of the broiler transport container. It is possible to have an overpressure in one ventilation column of a broiler transport container and a low pressure in another, so that air flows across the inner volume from one to the other, but when more than one column is present it may be expedient to have the same pressure type in all the columns and to provide ventilation openings in the side walls or the floor of the container so that air flows between the columns and those openings.

In addition to the or each segment of a ventilation or air outflow column which has at least one ventilation or air outflow opening and is arranged at a distance from all the side walls, there is preferably provided at least one further segment of a ventilation or air outflow column which has at least one ventilation or air outflow opening and is formed in the side walls. One segment can then form the ventilation column and the other segment can form the air outflow column. Particularly preferably, the or each segment of a ventilation or air outflow column whose ventilation or air outflow openings are formed at a distance from the side walls is itself arranged at a distance from the side walls and has a circular cross-section, while the or each segment of a ventilation or air outflow column whose ventilation or air outflow openings are formed in the side walls is part of a side wall and has either a semicircular or a quadrant-shaped cross-section. Of course, the cross-section of the segments in general, and in particular of the segments in the region of the side wall, that is to say of the segments provided at or in the side wall, can also be of a different shape.

In order further to facilitate an even distribution of the ventilation air, in addition to at least one ventilation column that is situated at a distance from the side walls, at least one side wall can be provided with at least one ventilation column part wall having ventilation openings. This is particularly advantageous in broiler transport containers having side walls without or with only a limited number of ventilation openings. Such ventilation column sections or localised ventilation openings in the side walls are suitable for controlling the flow of ventilation air outside the inner volume of the broiler transport container, and this can bring several advantages such as, for example, the regulated admission of used ventilation air and the partial recirculation thereof in order to achieve a sufficiently warm ventilation air mixture when the ambient climate is cold. Another advantage is that complete control of the inflow and outflow of ventilation air in channels defined by the ventilation columns and in the ventilation channels defined by the side walls allows the ventilation system to be independent of pressure changes along the length of the trailer or truck caused by the movement of the truck or trailer on the road and by changes in the speed of travel due to road and traffic conditions.

When two transport containers are arranged side by side with their side walls close together, such ventilation column sections in the side walls of the two containers can together form a common ventilation column which is used in the ventilation of the containers.

In one embodiment, the at least one ventilation column extends in the broiler transport container from one side wall into the inner volume towards another side wall. This can be useful if the trailer is provided with ventilation devices in a side wall of the trailer, so that the ventilation devices guide ventilation air to the horizontally arranged ventilation columns in the broiler transport containers. With regard to the provision of ventilation to the inner volume in the container in order to achieve ventilation from the inside outwards, it is entirely possible to arrange the ventilation columns in the horizontal direction or mainly in the horizontal direction, just as they can also be arranged in the vertical direction or mainly in the vertical direction. The individual ventilation column can be provided over its length with a row of ventilation openings, in order to provide a plurality of separate ventilation openings over the width of the inner volume of the container, or with at least one elongate opening which provides an even air flow along a portion of the length of the ventilation column. The ventilation column can be arranged in connection with the floor of the broiler transport container, the floor possibly forming a wall section of the ventilation column. The ventilation column can also preferably be arranged at a distance above the floor, preferably at a height corresponding to the height of the necks of the broilers or even at a greater height, so that broilers are able to pass beneath the column, possibly by ducking their heads.

A further embodiment has both at least one ventilation column extending mainly vertically, which extends into the inner volume, and at least one ventilation column extending mainly horizontally, which extends into the inner volume.

In one embodiment, the at least one ventilation column has a substantially hollow distribution channel, preferably a hollow centre, which extends over the length of the column. The ventilation column can be divided on the inside into a plurality of distribution channels, for example by providing the inside of the column with a central partition or with transverse separating walls which divide the volume in the column into four distribution channels, for example, the central partition or mutually intersecting separating walls extending along the length of the column. It is, however, preferred that the ventilation column has a hollow centre without internal subdivisions. The hollow distribution channel can have a substantially constant cross-sectional size and shape over its length, which leads to a very energy-efficient air flow, but portions of reduced size or tapering channels, on the other hand, can contribute to controlling the air flow. It is even possible to produce the ventilation column from a soft material which collapses when not in use and is inflated by the ventilation air flow during use. An advantage thereof is that the ventilation column is very soft when the broilers are loaded into the container at high speed.

In one embodiment, the at least one ventilation column extending from the floor upwards has a height such that it joins a ventilation column in a further broiler transport container which is placed on top of the broiler transport container. In this manner, the ventilation columns in the individual broiler transport containers are joined together to form common ventilation columns, and this results in a very simple design for forced ventilation because forced ventilation simply needs to be connected in order to ventilate the common ventilation column instead of being connected in order to ventilate the ventilation column in the individual broiler transport container.

In one embodiment, the broiler transport container has a broiler barrier at the upper end of the at least one ventilation column. Such a broiler barrier can be in the form of a cross which extends across the upwardly facing end opening of the ventilation column, or it can be a rounded structure at the upper end of the ventilation column. The broiler barrier prevents broilers from entering or becoming trapped in the ventilation column after they have been loaded into the broiler transport container. Loading can be carried out quickly and typically while the upper end of the ventilation column is exposed to the surroundings because another broiler transport container has not yet been placed on the loaded broiler transport container. In this situation, a broiler barrier is preferred at high loading speeds in order to avoid interruptions in loading due to a badly placed broiler.

In the broiler transport containers according to the present invention, the at least one ventilation column provides ventilation from within the inner volume and from outside and, by providing the container with as many ventilation columns as necessary to ensure the welfare of the broilers during transport, the broiler transport container can be produced in different sizes without being limited in terms of size for ventilation purposes. With the emphasis on handling, it is preferred that the length of the broiler transport container is in the range of from 0.50 m to 1.30 m, preferably in one of the following ranges: a) from 0.50 m to 0.70 m, b) from 0.70 m to 0.90 m, and c) from 1.10 m to 1.30 m, preferably approximately 1.2 m, and that the width of the broiler transport container is in the range of from 0.50 m to 1.30 m and preferably in one of the following ranges: a) from 0.50 m to 0.70 m, b) from 0.70 m to 0.90 m, and c) from 1.10 m to 1.30 m, and particularly preferably is approximately 1.2 m.

The construction of the side walls and of the floor of the broiler transport container can also be used to influence how the ventilation air flows in the inner volume. One or more of the side walls and the floor can be completely closed, apart from local regions where a region of the side wall forms part of a ventilation column in order to guide air out of the inner volume, or the side walls can be in sheet form and provided with ventilation openings, such as, for example, a single row of ventilation openings, which are situated in the upper half of the side wall. The provision of ventilation openings at the upper end of the side walls and/or ventilation columns can allow the air flow in the upper half of the container, where the heads of the broilers are situated, to be regulated.

Broiler transport containers according to the invention can be made from any material which is sufficiently strong and stable that the containers can be filled with broilers, and which can withstand thorough cleaning. It is currently preferred for the broiler transport container to be produced from a plastics material, preferably by injection moulding. Suitable plastics materials include high density polyethylene (HDPE) and polypropylene, but it is also possible to make the containers from steel, stainless steel, aluminium, metals or composites, such as, for example, carbon fibre composites, and/or to provide them with reinforcing inlays of a different material from the remainder of the container.

There are preferably provided at least two ventilation or air outflow columns which extend from the floor upwards through the inner volume. These broiler containers are designed and configured to receive and accommodate at least ten live broilers. Particularly preferably, the or each ventilation or air outflow column, or each segment of a ventilation or air outflow column, has elongate ventilation or air outflow openings, each having a longitudinal axis which is oriented with the longitudinal axis in the longitudinal direction of the ventilation or air outflow column. Preferably, the length of the broiler container having the larger receiving capacity is in the range of from 2.10 m to 2.80 m, preferably approximately 2.4 m, and the width of the broiler container is in the range of from 0.70 m to 2.6 m, preferably in the range of from 0.70 m to 0.90 m and particularly preferably approximately 0.8 m.

A particularly preferred further development is characterised in that the broiler container has at least one supply which is designed and configured for supplying feed into the inner volume. This embodiment is advantageously employed in particular when the containers are used for receiving and accommodating the broilers during rearing. With such a container it is possible to accommodate the broilers continuously and without changing container from the first day until they are transported to the slaughterhouse. Space-saving rearing of the broilers in a plurality of tiers is thereby made possible, which on the one hand offers more space for each broiler individually and on the other hand ensures adequate ventilation and an adequate and even supply of feed to the broilers.

Advantageously, at least one side wall is designed to be movable in particular as an inspection flap in such a manner that it can be opened and shut. Accessibility to the individual containers is thereby ensured in particular when they are layered on top of one another as a stack.

A supply for water and a supply for feed is preferably provided for each broiler container in the region of the side walls. The supply to the broilers can thereby be ensured even better.

Particular preference is given to a broiler container which is characterised in that at least one of the segments, extending from the floor upwards through the inner volume, of the ventilation or air outflow columns arranged at a distance from all the side walls is in the form of a support element, in such a manner that the support element has the height to support the floor of a further, stacked broiler container. Secure and stable stacking of the containers during transport, during accommodation of the broilers during rearing or while waiting at the poultry slaughterhouse is thereby ensured in a particularly simple and effective manner. Owing to the dual function of each segment or of each column section or of each column, namely for improving the ventilation on the one hand and for support on the other hand, a compact container which is improved in terms of hygiene and can be stacked despite heavy loads is produced.

Because the support column extends from the floor, the feet of the broilers cannot become trapped at the column because there are no gaps between the floor and the column, and the distance between the column and all the side walls also prevents a broiler from becoming trapped between the column and side wall and being injured.

The additional support at a distance from the sides of the container which is provided by the at least one column in particular allows the floor of the broiler transport container to be a structure with few or without a reinforcing rib structure in the floor region, as a result of which accumulations of dirt are minimised and cleaning is facilitated. Although the at least one column occupies some floor space which would otherwise be available for the broilers, the weight of the broiler transport container per kilo of broilers loaded onto the broiler transport container is comparable with or lower than in the case of current broiler transport systems.

The provision of the at least one support column provides support for containers which are placed one on top of another in a stack, in order to reduce the need for reinforcing ribs and allow containers with smoother outside surfaces to be produced, which can be cleaned more easily. The broiler transport containers can be used in frames as in the systems of the prior art, but they are suitable in particular for stacking without the use of a frame in order to form a frameless transport unit. Because the separate frame is omitted, washing systems in the slaughterhouse can be simplified, and cross-infections via the frame are eliminated completely. When a frame is not used, handling is also more efficient and a considerable reduction in the total weight of the transport system itself is achieved, so that the weight of the loaded broilers, that is to say the net weight, can be higher.

Although the floor of the broiler transport container can be provided with holes in the floor region, it is preferred in one embodiment of the broiler transport container for the floor to have an outer surface which is flat and does not have openings in the regions between the at least one support column and the side walls. Cleaning is thus simpler, and the risk of contamination is smaller because dirt does not readily adhere to a planar surface without openings.

The floor as such does not need to be situated in one plane but can exhibit a plurality of planar, sheet-like sections, one example being a floor which is in the form of a trapezoidal metal sheet. In other embodiments, the floor can be produced with variations in the thickness of the material in the regions between the at least one support column and the side walls, the thicker regions preferably extending between opposing side walls. If the container does not have a square base, the thicker regions preferably extend between the opposing side walls that are situated furthest away from one another.

The overall shape of the broiler transport container and the number and position of support columns in relation to the side walls depend inter alia on the size of the container and on the weight of the broilers to be transported. It is currently preferred for the broiler transport container to have four side walls which form two pairs of opposing side walls, for the at least one support column to be positioned on the floor approximately in the middle between one pair of opposing side walls and distributed between the other pair of opposing side walls at a distance of approximately $D/(N+1)$, where D is the distance between the other pair of opposing side walls and N is the number of support columns in the broiler transport container. This embodiment is advantageous in particular with regard to symmetry because the broiler transport container can be stacked with either end facing the operator and the at least one support column nevertheless fits a corresponding support column in the lower broiler transport container. The filling operation can take place quickly, for example at a rate of from 50 to more than 200 broilers per minute, and it is useful for the operator that a broiler transport container cannot be oriented wrongly during stacking, in particular because the final placing of an empty container can occur at the same time as a broiler delivery opening in a broiler loading device is displaced for delivering broilers to the empty container.

The broiler transport container can also have a triangular base area and three side walls or a polygonal base area and five or more side walls.

The shape and size of the at least one support column should preferably be chosen with due regard to keeping a relatively large inner floor area available for the broilers. In one embodiment, the at least one support column has an annular cross-section with a hollow centre, which extends over the height of the column. Such a construction provides even surfaces, preferably without corners in the column, which can easily be cleaned after each broiler transport.

In order to fix the broiler transport containers relative to one another when they are arranged in a stack, in order to form a frameless transport unit, each broiler transport container can have upper corresponding regions and lower corresponding regions, wherein the upper corresponding regions fit onto the lower corresponding regions of a further broiler transport container placed on top of the broiler transport container. The broiler transport containers stacked on a pallet support as a transport unit are then mutually supported via the upper corresponding regions and the lower corresponding regions. Pallets which are used to form the base of the transport units and to support the broiler transport units can likewise be provided with upper corresponding regions which are designed to engage in the lower corresponding regions on the lowermost broiler transport container of a stack. These upper and lower corresponding regions can be omitted if a frame is used to control the mutual positioning of the containers.

In one embodiment, the corresponding regions can be so provided that the at least one support column has an upper end and a lower end, and can be provided with an upper corresponding region at the upper end and a lower corresponding region at the lower end. This can be achieved in a simple manner, for example, by providing the columns with conical or frustoconical end regions, so that the upper end of at least one column on one container fits into a hollow centre in the lower end of a corresponding column on another container.

In order to supplement the engagement between the upper corresponding regions and the lower corresponding regions of the columns, or in order to serve as an alternative thereto, the side walls can have an upper end and a lower end and can be provided with upper corresponding regions at the upper end and lower corresponding regions at the lower end. An example of such corresponding regions is that the broiler transport container is provided with a recess at the bottom of each side wall so that the floor of the container fits into the opening at the upper end of another container, the recess serving as the lower corresponding region and the upper edges of the side walls serving as the upper corresponding regions. Alternatively, the upper edges of at least two opposing side walls can be provided with L-shaped flanges which project outwards and upwards, so that they enclose the lower outer corners at the lower ends of the side walls of another container. In yet another embodiment, the side walls and/or the outer surface of the floor are provided with matching openings and projections, such as, for example, holes and pins or springs and grooves, but because such corresponding regions are more difficult to clean, they are currently not preferred.

The corresponding regions do not need to extend over the entire length of the side walls. Instead, the upper corresponding regions on the side walls can project upwards at intermediate portions of the side wall and leave openings between upper ends of the intermediate portions and a further broiler transport container which is stacked on top of the broiler transport container. For example, the upper corresponding regions can be present only at corners of the container at which side walls meet, so that openings extend substantially from one corner across the intermediate portions to the other corner. If the container is longer and/or wider, it may then also be expedient to provide upwardly projecting upper corresponding regions, for example in the middle of a side wall, so that openings extend substantially from the corners to the middle of the container, or it is even possible, if required, to provide further such upper corresponding regions. If the broiler transport container has four side walls which form two pairs of opposing side walls, upper corresponding regions of this type can be distributed between one pair or both pairs of opposing side walls with a distance of approximately $D/(N+1)$ as described above for the columns, and in some embodiments these upper corresponding regions and the columns can be spaced in the same manner.

In relation to the size and dimensions of the broiler transport container, it may be expedient, for reasons of efficient handling, for the containers to be as large as possible in order to reduce the outlay in terms of work that is associated with the handling of containers upon filling on the farm and upon emptying at the slaughterhouse. However, working environment laws concerning the maximum weight that may be handled by farm personnel, and the possibility of practical handling of the containers, set upper limits for the size of containers of the prior art. With the broiler transport containers according to the present invention, it is currently preferred for the length of the broiler transport container to be in the range of from 2.10 m to 2.80 m, preferably approximately 2.4 m, and for the width of the broiler transport container to be in the range of from 0.70 m to 2.6 m, preferably in the range of from 0.70 to 0.90 m and particularly preferably approximately 0.80 m. A width of 2.4 m corresponds to the width of the platform that is to be found on the trucks which are typically used nowadays for transporting broilers, and with such broiler transport containers it is accordingly not necessary to load two or more transport units side by side, but the platform of the trailer can instead be filled with a single row of broiler transport container stacks. Transport by other means can require different sizes, one example being transport by rail, where wagons can have an available platform width of up to 2.8 m.

As explained above with reference to the floor of the container, planar surfaces can easily be cleaned, and it is therefore also preferred for the side walls to be substantially planar and preferably sheet-like without openings other than possible ventilation openings. However, the construction of at least one of the side walls can be such that ventilation is made possible either by providing an opening between the respective side walls of broiler transport containers arranged one on top of another, or by providing ventilation openings through the side wall.

Broiler transport containers according to the invention can be made from any material which is sufficiently strong and stable that the containers can be filled with broilers, and which can withstand thorough cleaning. It is currently preferred for the broiler transport container to be produced from a plastics material, preferably by injection moulding. Suitable plastics materials include high density polyethylene (HDPE) and polypropylene, but it is also possible to make the containers from steel, stainless steel, aluminium, metals or composites, such as, for example, carbon fibre composites, and/or to provide them with reinforcing inlays of a different material from the remainder of the container.

The container according to the invention can be used as an individual component, in particular when the inner volume is closed at the top by a lid so as to form a receiving space which is enclosed on all sides and is in contact with the surroundings (in particular the ventilation and air outflow system and the supply for feed) only through the ventilation and air outflow openings and optionally via the supply for feed. However, as will be explained in the following, each container can also be a component part of a superordinate system, such as, for example, a unit (stack of at least two containers, also referred to in the following as a transport unit or broiler transport unit), an arrangement (unit having an active ventilation system) and a transport trailer. Everything which has been described and will be described hereinbelow in relation to the individual containers correspondingly applies in the same manner to the unit, the arrangement and the transport trailer.

The unit according to the invention is designed and configured to receive and accommodate live broilers during rearing and/or during transport of the broilers to a slaughterhouse and/or while the live broilers are awaiting processing in the region of the slaughterhouse, and comprises at least two broiler containers which are designed according to one or more of claims 1 to 23, wherein corresponding segments of the ventilation or air outflow columns of the broiler containers which form the unit and are situated next to one another and/or above one another each form common ventilation or air outflow columns extending through all the inner volumes.

At least two broiler containers are preferably stacked one above another, wherein the or each segment of a ventilation or air outflow column, which extends in the individual broiler container from the floor upwards, is joined to at least one segment of a ventilation or air outflow column in the other broiler containers of the stack, so that at least one common ventilation or air outflow column is formed in the unit.

A ventilation air flow can thus pass through a plurality of broiler transport containers arranged one above another, so that a ventilation unit can potentially supply the air flow necessary for ventilating a common ventilation column or a plurality of common ventilation columns in all the containers in a stack.

The unit according to the invention is characterised in that at least one ventilation column extends into the broiler transport unit and has at least one ventilation opening in each inner volume. The provision of at least one ventilation opening at the at least one ventilation column in the individual inner volume means that adequate ventilation is achieved even for broilers which are situated in the inner volume behind at least one outer row of other broilers. In units of the prior art having a large number of ventilation openings in the side walls and in the floor, the ventilation for broilers in the interior of the unit is not considered to be sufficient or effective enough under all transport conditions, and it is now believed that this is caused by the fully developed plumage of the broilers.

During transport, the outermost line or row of broilers can block or hinder ventilation from outside into the broiler transport unit through the side walls, and the ventilation flowing upwards through the floor can likewise be insufficient, because the plumage of the broilers represents a barrier to ventilation in the vertical direction in the inner volume of the broiler transport unit. The broiler transport unit according to the present invention has at least one ventilation column which extends into the inner volume, and the ventilation column improves the ventilation conditions for broilers situated behind other broilers to a considerable degree.

In one embodiment, the at least one ventilation column extends downwards through the uppermost inner volumes. In this manner, the lowermost inner volume can also be supplied with ventilation air, even if the at least one ventilation column terminates with an end opening situated at the ceiling in the lowermost inner volume. It is, however, preferred for the at least one ventilation column to extend through all the inner volumes to a downwardly facing end opening on the underside of the broiler transport unit, because this allows broiler transport units to be stacked, the ventilation columns being strung together. In a further embodiment, one ventilation column extends into some of the inner volumes, and another ventilation column extends into other inner volumes.

A ventilation apparatus can be arranged above the transport unit, or the ventilation apparatus can be situated in the lower carrying structure of the transport unit, so that the ventilation apparatus supplies the at least one ventilation column with ventilation air. A ventilation apparatus in a ventilation arrangement is preferably provided on the trailer used for transportation and, after the trailer has been loaded, the at least one ventilation column is connected to the associated ventilation apparatus, which can be a ventilation channel which forms part of a common ventilation system, or a local ventilator which is positioned on the ventilation column. There can be more than one ventilation column in the transport unit, and a ventilation apparatus can be provided for each ventilation column in the unit.

In a further embodiment, ventilation columns in two transport units stacked one on top of the other form common ventilation columns, preferably via ventilation column sections in a support pallet or through a ventilation device integrated into the pallet. If the individual transport unit has a smaller height than the height available on the trailer, two or more transport units may possibly be stacked one on top of another, and in this case it is advantageous for the ventilation columns to form common ventilation columns because it becomes easier to provide ventilation and connect it to the ventilation columns.

Preferably, when the transport units are loaded onto a transport vehicle carrying loaded transport units, the ventilation column or columns in each unit stack is/are supplied with forced ventilation. Because the ventilation in the inner volumes is forced, the ventilation is independent of whether the transport vehicle is moving or not, and a very uniform ventilation rate can be achieved over all the inner volumes because the specific location of the transport unit on the vehicle (such as, for example, in the middle) has no real influence on the ventilation rates supplied to the inner volume.

In one embodiment, at least two broiler transport containers in a stacked configuration form a transport unit in which ventilation columns which extend from the floor upwards in the individual broiler transport containers join corresponding ventilation columns in the other broiler transport containers in the transport unit, in order to form common ventilation columns. A ventilation air flow is accordingly able to flow through a plurality of broiler transport containers stacked one on top of another and potentially allow one ventilation unit to provide the air flow necessary for ventilating all the inner volumes in the transport unit via a common ventilation column or via a plurality of common ventilation columns which extend to all the containers in the stack. There can also be a single ventilation air supply channel for each common ventilation column in the transport unit. Because the broiler transport container has at least two ventilation columns, there are at least two common ventilation columns which supply ventilation to each inner volume in broiler transport containers, and by using at least two ventilation units or two independent ventilation air supply channels, the reliability of the ventilation air supply is increased.

When two transport units are arranged side by side with their side walls close together, such sections of a ventilation column in the side walls of the two units can together form a common ventilation column which ventilates both units, such as, for example, an outflow of ventilation air from the two units, if the at least one ventilation column within the inner volume of one of the units is supplied with inflowing ventilation air.

The broiler transport containers according to the invention can be arranged without the use of a separate frame for holding the individual containers, for example, in a stacked configuration as a transport unit having from 3 to 14 broiler transport containers in a single stack or in a stack of from 6 to 12 broiler transport containers or in a stack of from 3 to 5 broiler transport containers. The stack of broiler transport containers in the transport unit can be arranged on a support or on a pallet support, or the lowermost broiler transport container can be designed with an integrated support so that the transport unit as a whole can be lifted, or a support can be part of the surface on which the transport unit is placed.

In another embodiment, ventilation columns in at least two transport units stacked one on top of the another form one or more common ventilation columns. If the individual transport unit has a smaller height than the height that is available on the trailer, two or more transport units may be stacked one on top of another, and in this case it is advantageous if the ventilation columns form common ventilation columns because they are then easier to arrange and to connect to the ventilation to the ventilation columns.

In the above-mentioned embodiment, at least two broiler transport containers in a stacked configuration form a transport stack, wherein at least one ventilation column which extends from the floor upwards in the individual broiler transport unit is joined to a corresponding ventilation column in another broiler transport unit in the transport stack in order to form a common ventilation column. A ventilation air flow is thus able to pass through two or more broiler transport units arranged one on top of another. The at least one ventilation column is accordingly located as a prolongation of a corresponding at least one ventilation column in a further broiler transport unit which is stacked on the broiler transport unit. An advantage thereof is the ability to ventilate the ventilation columns in a plurality of units jointly by means of a common ventilation apparatus or a single connection of the column to a ventilation supply channel, such as, for example, a supply channel provided on a transport trailer. The construction of the ventilation arrangement on the trailer is accordingly simplified because a common ventilation column in two or more stacked units is connected to the ventilation arrangement at a single point.

There can be an individual ventilation air supply channel for each common ventilation column in the transport unit. The broiler transport unit can have at least two ventilation columns, and in this case there are at least two common ventilation columns which ventilate each inner volume in broiler transport units, and by using at least two ventilation units or two independent ventilation air supply channels, the reliability of the ventilation air supply to each inner volume is increased.

In one embodiment, the at least one ventilation column is produced in sections, and at least one of the floors is movable and is joined to a section of the ventilation column. An advantage thereof is that a portion of the floor is movable or displaceable relative to another portion of the floor, and the column section is then located on the movable portion of the floor and can be moved together with that portion. It is thus possible to provide the inner column in sections on the associated floor sections and to move the column sections during loading of the broilers. In this manner, a large loading opening can be achieved despite the placing of the at least one ventilation column in the inner volume. Alternatively, a movable portion of the floor can have an open recess which is located at the position of the ventilation column, which can then be fixed to the immovable portion of the floor. As a further alternative, the at least one ventilation column extends from a side wall, so that the functionality of the floor remains unhindered by the presence of the at least one ventilation column.

In one embodiment, the ventilation columns have elongate ventilation openings, each having a longer axis and oriented with the longer axis in the length direction of the ventilation column. This produces a uniform air flow and a lower risk of the openings becoming blocked by broilers or dirt, but it is also possible to provide a row of ventilation openings along the length of the ventilation column in order to provide a plurality of separate ventilation points. This applies regardless of whether the ventilation columns are horizontal or vertical and/or coupled to columns in other units to form a common ventilation column.

The ventilation air flow to the ventilation columns can be provided by natural ventilation or by forced ventilation or by a combination of the two. It is preferred that each unit stack is provided with forced ventilation to the ventilation columns when transport takes place on a transport vehicle carrying loaded transport units. Such forced ventilation can be present in the form of either air supplied to the ventilation columns or air conveyed away from the ventilation columns. When the air is guided into the columns, that is to say when a ventilation unit supplies air to the ventilation columns with overpressure, the air blown into the broiler transport containers can be conditioned, for example by regulating the temperature and/or the humidity of the ventilation air. In cold weather, a portion of the ventilation air can be recirculated ventilation air. In this manner, the heat from the broilers is used and the energy consumption for air conditioning is minimised.

In one embodiment, which applies inter alia to ventilation columns that extend from the floor upwards, the ventilation columns can have elongate openings each having a longer axis, wherein the longer axis is oriented in the length direction of the ventilation column.

With regard to the size and dimensions of the broiler transport container, it may be expedient for reasons of efficient handling for the containers to be as large as possible, in order to reduce the work associated with the handling of containers during filling on the farm and during emptying at the slaughterhouse. With the broiler transport containers according to the present invention, the ventilation columns provide ventilation from the inside of the inner volume outwards and, by providing the container with as many ventilation columns as are necessary for permanently good welfare of the broilers, the broiler transport containers can be produced with large dimensions. It is currently preferred that the length of the broiler transport container is in the range of from 2.10 m to 2.80 m, preferably approximately 2.4 m, and that the width of the broiler transport container is in the range of from 0.70 m to 2.6 m, preferably in the range of from 0.70 to 0.90 m and particularly preferably approximately 0.80 m. A width of 2.4 m corresponds to the width of the platform which is to be found on the trucks which are typically used today for transporting broilers, and with such broiler transport containers it is thus not necessary to load two or more transport units side by side, but the platform of the trailer can instead be filled with a single row of broiler transport container stacks. Transport by other means can require different sizes, one example being rail transport, where wagons can have an available platform width of up to 2.8 m.

The unit preferably has at least three floors which define the inner volumes, and at least one ventilation or air outflow opening of the common ventilation or air outflow column is provided in each inner volume.

The unit advantageously further comprises a pallet for receiving the stack formed of at least two broiler transport containers, as well as a covering element for closing the uppermost inner volume of the stack. Both the pallet and the covering element are designed and configured for connection to an active ventilation system.

Particularly preferably, the pallet comprises adapters in the form of ventilation or air outflow column sections which are designed and configured for connecting the ventilation or air outflow columns of two units arranged one above the other. For example, the adapters of a pallet can be matched to a corresponding connection piece of the cover element in order to form a closed ventilation circuit.

Particularly advantageously, the unit can be designed and configured for connection to a central system for supplying the broilers with feed and/or to a central system for forced ventilation of the broilers with a gas.

A preferred further development is characterised in that the at least one ventilation or air outflow column is produced in sections, and in that at least one of the floors is movable and is joined to a section of the ventilation or air outflow column.

The design of the side walls and floors of the broiler transport unit can also be used to influence how the ventilation air flows into the inner volume. One or more of the side walls as well as the floors can be fully closed, apart from local regions where the side wall locally becomes part of a ventilation column in order to guide air out of the inner volume. Alternatively, the side walls can be in sheet form and provided with ventilation openings, such as, for example, a single row of ventilation openings, which are located in the upper half of the inner volume. The provision of ventilation openings at the upper end of the inner volume can allow the air flow in the upper half of the inner volume, where the heads of the broilers are situated, to be regulated.

In one embodiment, the floors are without openings apart from the at least one ventilation column. This facilitates an even distribution of the ventilation air, and the welfare of broilers is increased because their feet or toes cannot become stuck in small openings. The side walls can also be in sheet form and have closed surfaces, apart from ventilation openings at a local ventilation column.

During loading and unloading of the broiler transport unit, the unit is naturally open. In one embodiment, the side walls and end walls of the broiler transport unit are closed except at the locations of ventilation openings and columns. This not only ensures efficient ventilation of the transport unit but also makes the inner volumes dark in the closed state, so that the broilers tend to sleep while they are being transported. This is the case regardless of the design of the ventilation columns and ventilation openings.

The broiler transport containers according to the invention can preferably be arranged in a stacked configuration with from 3 to 14 broiler transport containers in a single stack or in a stack of from 6 to 12 broiler transport containers or in a stack of from 3 to 5 broiler transport containers, without the use of a separate frame for holding the individual containers. The latter corresponds in its number to current crate systems having a frame which receives from three to five crates. The stack of broiler transport containers can be arranged on a support or on a pallet support and forms a unit (also referred to as transport unit in the following) having a basic weight and a total floor area, wherein the total floor area is the sum of the floor areas of the broiler transport containers in the transport unit. In one embodiment, the basic unit weight (in kg) divided by the total floor area (in $m^2$) is not more than 24.0 ($kg/m^2$), and the basic unit weight (in kg) divided by the total floor area (in $m^2$) is preferably in the range of from 5 to 24 $kg/m^2$, particularly preferably in the range of from 10 to 20 $kg/m^2$. By comparison, the basic unit weight divided by the total floor area of the prior art, which uses separate broiler transport containers and a frame, is typically approximately from 60 to 100 $kg/m^2$. The basic unit weight is understood as including all the elements of a transport unit, that is to say not only the broiler transport containers but also all supports, pallets, lids or coverings which are used together with the broiler transport containers during the movement thereof as a stacked unit or stacked units during loading onto a trailer, the weight of the broilers, however, not being included in the basic unit weight. The broiler transport containers are preferably stacked on a pallet support in order to facilitate handling of the transport unit, but the use of alternatives such as, for example, a simple arrangement of the lowermost broiler transport container of a stack on simple spacers which are detached from the transport unit in order to be held above the support surface and leave space for the forks of a forklift truck is not excluded. The pallet support can also be in the form of a special type of container which is used as the lowermost tier in a stack, the support in this lowermost container being integrated with the container floor. The construction of the pallet and/or of the lowermost broiler transport container should be such that the risk of dirt and bird droppings accumulating during handling on the farm is low in order both to improve hygiene and to avoid the transport of unnecessary dead load.

Although the basic unit weight (in kg) divided by the total floor area (in $m^2$) is preferably not more than 24.0 ($kg/m^2$), it is desirable in some cases for the basic unit weight to be higher, such as, for example, when the broiler transport container is to withstand the load of a very high stack, for example 15 broiler transport containers loaded with broilers.

A particularly low weight of the broiler transport container can be achieved if the stack is filled with broilers only in the situation where the floor of the individual container is supported from beneath, either by support from a pallet or other support (applicable to the lowermost container in a stack) or by support from the at least one column in the broiler transport container located beneath the container (applicable to containers stacked above the lowermost container). It is advantageous first to introduce the broilers into the lowermost container, then place the next container on the lowermost container and then load broilers into the next container etc., as the transport unit is built up, and to empty the containers starting with the uppermost container and to continue downwards. The individual broiler transport container thus never needs to be lifted at the ends as a separate container when it is filled with broilers, so that the floor can be of lightweight construction.

The broiler containers of the unit preferably have upper corresponding regions and lower corresponding regions, wherein the upper corresponding regions fit into the lower corresponding regions on a further broiler container stacked on the broiler container, and broiler containers stacked on a pallet support as a unit mutually support one another via the upper corresponding regions and lower corresponding regions. The upper corresponding regions advantageously project upwards from the side walls at intermediate sections of the side walls and leave openings between upper ends of the intermediate sections and a further broiler container stacked on the broiler container. A particularly stable unit which protects the broilers is thus produced.

An arrangement according to the invention comprises at least one unit according to any one of claims 24 to 30 and at least one ventilation system which is designed and configured to actively ventilate the or each unit. Such an arrangement forms an independent system which can be placed virtually as desired, namely in particular in a poultry rearing enterprise, on a transport trailer, in a waiting region at the slaughterhouse, in a calming and/or stunning chamber or in any other place.

The ventilation system is preferably designed and configured to ventilate the or each unit with a gas. The gas is understood as being any oxygen-containing and/or $CO_2$-containing or other gas/gas mixture having a calming or stunning effect.

Particularly preferably, the arrangement is characterised in that it further comprises at least one system for supplying the or each unit with feed. By means of the arrangement according to the invention, highly flexible husbandry of the broilers at different stages is ensured with one and the same system, from day-old chicks to slaughter-ready broilers from the rearing operation to the slaughterhouse.

Ventilation devices such as fans or compressors can be provided on the individual stack or the individual transport unit, such as, for example, by positioning a ventilation apparatus on the stack or on the floor of a stack or by integrating at least one ventilation device into the transport unit. The ventilation device preferably forms part of the transport vehicle, where the ventilation device can be provided on the roof and/or on the floor of the transport vehicle and can be used to ventilate an entire stack via the ventilation columns, so that optimum use is made of the space available on the vehicle so that, in combination with the improved ventilation, more broilers can be transported on the vehicle without increasing the stress levels.

In such embodiments, the ventilation device can follow the broiler transport unit stack and provide ventilation even when the transport vehicle or the transport trailer is not present.

The ventilation device is preferably part of the transport vehicle, whereby the ventilation device can be provided on the roof and/or on the floor of the transport vehicle and can be used to ventilate an entire unit stack via the common ventilation columns, so that optimum use is made of the space available on the vehicle and thus, in combination with the improved ventilation, more broilers can be transported on the vehicle without their stress levels being increased.

The transport trailer according to the invention is designed and configured to transport units in particular according to any one of claims 24 to 30, which are designed and configured to receive and accommodate live broilers, to a slaughterhouse and is characterised in that the transport trailer comprises a ventilation system which is adapted to ventilate the units according to any one of claims 24 to 30.

The ventilation system preferably has ventilation devices for ventilating live broilers in the units, which are arranged in rows on the trailer, wherein the transport trailer is so designed that the units can be loaded in an arrangement of individual ventilation or air outflow column sections in the units of at least one row, which form common ventilation or air outflow columns which extend within the inner volumes of the units, wherein the common ventilation or air outflow columns have end openings, and the ventilation system is so designed that a plurality of end openings are ventilated via ventilation devices on the transport trailer. With regard to the results obtained with these features, reference is made to the general explanations of the above-mentioned descriptions relating to the method. It is noted that some of the individual ventilation column sections can be ventilated by different methods, such as, for example, by natural ventilation in the outermost broiler transport units on the trailer.

Advantageously, the units in at least one row comprise at least one common inlet ventilation column for guiding ventilation air to the inner volumes in the units, and at least one common outlet ventilation column for guiding ventilation air out of the inner volumes in the units, wherein the ventilation system is so designed that it ventilates at least the end openings of the common inlet ventilation columns. This embodiment generates ventilation inflow and outflow, so that it is possible to control the ventilation air flows in the broiler transport units independently of the ambient conditions which are created by the movement of the broiler transport trailer.

The ventilation system is preferably designed to ventilate the end openings of the common inlet ventilation columns with ventilation air from the ventilation devices, wherein the ventilation system has controllable flaps which are arranged at least at one end, preferably at a lower end, of the common outlet ventilation columns in order to open or close the region of the common outlet ventilation openings wholly or partially. The controllable flaps can regulate the degree of recirculation of ventilation air in a simple manner.

A preferred further development is characterised in that ventilation devices are individually controllable independently of the speed of travel of the transport trailer, preferably for delivering at least a preset ventilation rate ($m^3$ air per second), preferably at least 0.05 $m^3$/s, for example at least 0.12 $m^3$/s, advantageously at least 0.18 $m^3$/s, and wherein optionally at least one ventilation device is mounted at the end opening of the common ventilation column ventilated thereby. These ventilation rates produce good conditions for the welfare of the transported broilers.

It is particularly preferred for the ventilation system to comprise a recording system and sensors for detecting and recording parameters selected from the group a) ventilation air temperature, b) ventilation air humidity, c) ambient air temperature, d) ambient air humidity, e) outlet air temperature, f) outlet air humidity, g) $CO_2$ content in outlet air, h) transport duration, i) lairage duration, j) vibration level, k) noise level, and l) light intensity. The recording of one or more of these parameters can contribute to the documentation of the welfare of the broilers and can be used in regulating the local climate in the broiler transport units.

The transport trailer advantageously has a ventilation system having ventilation devices and ventilation openings with forced ventilation, such as, for example, fans and channels having openings, for ventilating the units, wherein the units in the loaded state on the trailer comprise a plurality of floor surfaces which are arranged in stacks on the transport trailer, and wherein an inner volume for receiving broilers is present above the individual floor surface, wherein the ventilation system on the transport trailer is arranged to supply at least 20 separate ventilation column end openings with mechanical ventilation, wherein the individual ventilation column end opening is situated on a side face of a unit at the end of a ventilation or air outflow column which extends into the inner volume or volumes of the unit while the unit is temporarily loaded on the transport trailer. Effects of providing mechanical ventilation to ventilation columns extending into the inner volumes of the poultry transport unit are apparent from the above description, and the capacity to mechanically ventilate at least 20 separate ventilation columns gives a minimum distribution of ventilation air to the inner volumes. The provision of ventilation columns within the poultry transport units permits a more even distribution of ventilation air, so that the temperature, humidity and $CO_2$ content can be kept more constant than is possible when the ventilation air flow must enter the transport units from outside the side faces. Ventilation from the inside of the inner volumes is also advantageous when the transport units have a relatively closed construction, and it further becomes possible to arrange the transport units close to one another.

The ventilation system on the transport trailer preferably has at least two ventilation openings for each stack, which ventilation openings are so arranged that they are situated next to at least two ventilation column end openings on the stack when the stack has been loaded onto the transport trailer. With vertically extending ventilation columns, at least two columns per stack provide more even ventilation in each inner volume. With horizontally extending ventilation columns there should be at least one ventilation column per inner volume. In other words, the number of columns should at least be comparable to the number of floors in the stack. When the poultry transport units have from two to five ventilation columns, it is possible to have an overpressure in one ventilation column of a transport unit and a low pressure in another, so that air flows from one column to the other, but it is usually expedient to have the same type of pressure in all the columns in order to provide ventilation openings in the side walls or the floor of the transport unit, so that air flows between those openings and the columns. Some columns can be situated inside the transport units, while others are arranged at the sides of the transport unit and may supply ventilation air to two adjacent transport units simultaneously.

The ventilation system preferably has at least 20 ventilation openings and/or ventilation devices which are arranged on the roof of the transport trailer or on the floor of the transport trailer in positions which correspond to upwardly facing ventilation column end openings on the units which are temporarily placed on the transport trailer.

In a particularly preferred embodiment of the transport trailer, the transport trailer is provided with a $CO_2$ supply system which provides the ventilation air with a $CO_2$ content preferably in the range of from 3 to 22 vol. %, and the $CO_2$ supply system preferably receives $CO_2$ from exhalation air of the poultry and/or from exhaust gases from the transport drive vehicle.

The object is also achieved by a method for ventilating live broilers during rearing and/or during transport of the broilers to the slaughterhouse and/or while the live broilers are awaiting processing in the region of the slaughterhouse, namely using at least one broiler container according to one or more of claims 1 to 23 and/or a unit according to one or more of claims 24 to 30 and/or an arrangement according to one or more of claims 31 to 33 and/or a transport trailer according to one or more of claims 34 to 43. The method according to the invention for ventilating the broilers can accordingly be used particularly flexibly both during the rearing of the broilers in the agricultural enterprises, and during transport to the slaughterhouses and also before and inside the slaughterhouse. The use of the method is not limited to the supply of oxygen-containing air but can also be used for supplying gas mixtures by means of which the broilers are, for example, calmed for transportation or stunned before the actual processing.

The method preferably serves to ventilate offloadable units on a transport trailer, wherein the units on the transport trailer comprise a plurality of floor regions which are arranged in rows on the transport trailer, and wherein an inner volume is present above the individual floor region for receiving broilers and wherein a ventilation system having ventilation devices supplies forced ventilation air to the units, wherein the ventilation system supplies forced ventilation to a plurality of ventilation or air outflow column sections, the individual ventilation or air outflow column section extending into the inner volume(s) of the unit guides the forced ventilation air through ventilation or air outflow openings which are positioned on the ventilation or air outflow column section in the inner volume of the unit, and individual ventilation or air outflow column sections of units in a row form common ventilation or air outflow columns, wherein these common ventilation or air outflow columns guide the forced ventilation air to ventilation or air outflow column sections situated in the row.

The ventilation system of the transport trailer preferably guides forced ventilation air to and/or from ventilation or air outflow column sections in units which are situated at one end of rows, preferably at an upper end of rows extending downwards or at a front end of rows extending to the rear end of the transport trailer or at a side end of rows extending in the width direction of the transport trailer.

The units are preferably loaded onto the transport trailer in a predetermined pattern, the ventilation or air outflow column sections being joined together to form common ventilation or air outflow columns.

At least one ventilation or air outflow section of the ventilation system is preferably activated and begins to ventilate loaded units while further units are being loaded onto the transport trailer.

Ventilation or air outflow air supplied to ventilation or air outflow pipe sections in the units preferably flows from the ventilation or air outflow openings within the units and out of the ventilation or air outflow openings at side walls of the units.

Ventilation or air outflow air supplied to ventilation or air outflow pipe sections in the units preferably flows from ventilation or air outlet openings at side walls of the units to the ventilation or air outflow openings within the units.

The ventilation system on the transport trailer preferably receives ventilation air from the units and recirculates at least a portion of the received ventilation air to the units as ventilation air.

One or more of the parameters a) air temperature, b) air humidity and c) $CO_2$ content in air in ventilation air received from the units is/are preferably measured.

The amount of recirculated air is preferably so regulated, in dependence on at least one of the measured parameters, that the amount increases if the air temperature is below a predetermined temperature value, or the amount decreases if the air humidity is over a limit value, or the amount decreases if the $CO_2$ content is above a predetermined value.

The ventilation system preferably supplies ventilation air to all the units on the transport trailer in an amount in the range of from 10,000 $m^3/h$ to 100,000 $m^3/h$, preferably in the range of from 30,000 $m^3/h$ to 80,000 $m^3/h$.

The method preferably serves to transport live poultry to a slaughterhouse and to receive live poultry at the slaughterhouse, wherein poultry is accommodated during transport in units having at least two floors, wherein live poultry arrives at the slaughterhouse in units on a transport trailer of a vehicle, wherein the transport trailer comprises a ventilation system which supplies ventilation air to the individual poultry transport unit via ventilation or air outflow openings situated within the inner volume above the floors of the units carrying the poultry, wherein the units, after arrival at the slaughterhouse, remain on the transport trailer during lairage and the ventilation system is operated during lairage.

After lairage, the units are preferably transferred from the transport trailer to a CAS (controlled atmosphere stunning) apparatus and the controlled atmosphere is effected by mechanical ventilation directly into ventilation lines extending into the interior of the unit to at least one gas outlet opening in each inner volume in the unit that contains poultry.

A recording system preferably detects and records parameters which are selected from the group a) ventilation air temperature, b) ventilation air humidity, c) outlet air temperature, d) outlet air humidity, e) $CO_2$ content in outlet air, f) ambient temperature, g) ambient humidity, h) transport duration, i) lairage duration, j) vibration level, k) noise level and l) light intensity.

At least the parameters c) outlet temperature and d) outlet air humidity are preferably detected and recorded.

The transport trailer preferably receives a plurality of units or a plurality of stacks of units, wherein the recording system detects and records the chosen parameters for the individual unit or the individual stack of units.

The ventilation system supplies ventilation column sections extending into the inner volume of the poultry transport unit with ventilation, and the forced ventilation air flows through ventilation openings which are situated within the inner volume at the ventilation column section, where effective ventilation can be achieved even for broilers which are standing with other broilers between themselves and the side walls of the broiler transport unit. The inner volume, or the individual inner volumes when the broiler transport unit has a plurality of floors, is thus ventilated from the inside outwards, and all the broilers in the transport unit receive good ventilation in amounts that ensure an acceptable local climate. The reliable distribution of ventilation in the inner volumes allows the floors of the broiler transport units to be filled very tightly with broilers and acceptable welfare of the broilers between other broilers in the middle regions of the floors nevertheless to be maintained.

The ventilation system of the broiler transport trailer ventilates the inner volumes of transport units situated behind other broiler transport units via the ventilation column section(s) in the mentioned other broiler transport units. The ventilation column sections serve as part of the ventilation system on the trailer. The common ventilation columns formed by the ventilation column sections distribute forced ventilation air from the ventilation system to all the broiler transport units in the row through which the common ventilation column extends. The individual ventilation column sections serve to effectively ventilate the interior of the broiler transport unit to which the section belongs and to distribute ventilation to other broiler transport units in the row.

The common ventilation columns are built up on the transport trailer during loading of the broiler transport units onto the transport trailer, and the ventilation system on the trailer therefore needs only to supply ventilation air to ends of the common ventilation columns in order to ventilate all the broiler transport units in each inner volume containing broilers.

A further advantage of the present method for ventilating broiler transport units is that the side walls and/or floors of the transport units can be produced without or with only limited openings. The side walls are thus better able to protect the broilers from environmental influences such as rain and sunlight, and floors without openings prevent bird droppings from floors above from falling onto the broilers beneath the floor.

The ventilation openings in the inner volumes are preferably positioned at a distance above the floors and suitably above the breast height of broilers standing on the floor.

It is possible to arrange a central ventilation region so that it extends over the length of the trailer, but a result thereof would be that broiler transport units would have to be loaded onto the trailer from both sides. In order to simplify loading of the trailer, it is preferred in one embodiment for the ventilation system of the broiler transport trailer to supply forced ventilation air to and/or from ventilation column sections in broiler transport units situated at an end of rows, preferably at an upper end of rows extending downwards or at a front end of rows extending towards the rear end of the trailer or at a side end of rows extending in the width direction of the trailer.

The ventilation system of the trailer can be integrated with the broiler transport units which are loaded onto the trailer in stacks placed one on top of another, without actually placing the stacks precisely in relation to the trailer and to one another; ventilation devices are then placed on individual vertical common ventilation columns, or a positionable ventilation channel or ventilation hose can be connected to individual common ventilation columns. However, these operations are time-consuming, and it is therefore preferred for the broiler transport units to be loaded onto the broiler transport trailer in a predetermined pattern, in which the ventilation column sections are joined to form the common ventilation shafts and the common ventilation shafts are then in alignment with ventilation devices or ventilation openings which are arranged on the trailer in a pattern corresponding to the loading pattern of the broiler transport units. The predetermined pattern can include predetermined positions on the trailer, and such predetermined positions can be defined by providing markings or projections on the floor of the trailer which serve as guides for surfaces of the broiler transport units or coincide with depressions or recesses in the floor of the transport units. Alternatively, a more complex system can be used, in which the transport units are positioned by means of a robotic handling apparatus.

In one embodiment, at least one ventilation section of the ventilation system is activated and begins to ventilate loaded broiler transport units while further broiler transport units are being loaded onto the trailer. It can take some time for a trailer to be loaded fully, for example one hour, because the broilers are typically loaded into the broiler transport units and the units are then loaded onto the truck. It is advantageous for the welfare of broilers if the local forced ventilation to the broilers in each broiler transport unit is started within 15 minutes of loading the broiler transport unit onto the trailer. It is accordingly advantageous if broiler transport units can be loaded onto one section of the trailer and then connected to the ventilation system of the trailer while other sections of the trailer are being loaded with broiler transport units. Alternatively, a large number of broiler transport units can be loaded with broilers and loaded onto the trailer as a common set, and in this case the time from loading broilers into the units to the end of the trailer loading operation and connection of the ventilation can be so short that all the broilers are fine even without section-wise connection of ventilation. In another embodiment, it is possible to place broilers in a stack and then load the stack onto the trailer and connect it to the ventilation, following which the procedure is continued with the next stack.

The ventilation air supplied to the ventilation pipe sections in the broiler transport units flows from the ventilation openings in the broiler transport units out of ventilation openings at side walls of the broiler transport units. The ventilation air supplied to the inner volumes can flow out of the inner volume and through one or more rows of ventilation openings into, for example, one or two side walls of the broiler transport unit. In order to effect the flow of air away from the broiler transport units, these could be arranged with a free distance to the adjacent row on at least one side of the row, so that space through which ventilation air can flow remains between columns. Alternatively, the rows of broiler transport units can be arranged tightly side by side, and the adjacent side walls of the broiler transport units in adjacent rows can have mutually matching ventilation column sections, so that the tightly stacked broiler transport units joined together define common ventilation columns at the side walls for the flow of ventilation air out of the broiler transport units. An advantage is that the side walls of the broiler transport units can be closed side walls, apart from the ventilation column sections in the walls. The closed side walls render the broiler transport units almost independent of the ambient conditions, apart from the conditions of the ambient air.

Alternatively, it is possible that ventilation air supplied to ventilation channel sections in the broiler transport units flows out of ventilation openings at side walls of the broiler transport units to the ventilation openings in the broiler transport units. The reversal of the directions of flow scarcely changes the principles. The advantages mentioned above also apply to the opposite direction of flow. It is also possible to change between one direction of flow and the other direction of flow. This can make the ventilation to the broilers even more uniform over time, irrespective of their location on the transport trailer.

It is also possible to obtain the directions of flow in other ways. The directions of flow can be controlled by the ventilation system by applying an overpressure at the ends of some of the common ventilation columns, while no pressure or a low pressure is applied to other of the common ventilation columns on the trailer. Ventilation column sections with different pressure and/or direction of flow in the same broiler transport unit are possible with the ventilation system, but it is also possible, for example, to apply overpressure to a ventilation column in one broiler transport unit and low pressure to a ventilation column in another broiler transport unit and to achieve a flow of ventilation air from one broiler transport unit to the other via ventilation openings in the side walls of the units. It is also possible that the ventilation system supplies different flows or different ventilation air compositions to some common ventilation columns than to other ventilation columns. One example thereof is where it is advantageous to have differences in the ventilation flows in different broiler transport units, for example when only one side of the trailer is heated by solar radiation and must be cooled, while the other side does not need to be cooled.

It is possible that the ventilation system supplies ventilation air to the broiler transport units only on the basis of ambient air drawn in by mechanical ventilation or on the basis of air drawn in by the air pressure at air intake openings facing the direction of travel, or a combination of the two. Alternatively, however, it is also possible to condition the ventilation air by mixing spent ventilation air with the ventilation air supplied by the ventilation system. In one embodiment, the ventilation system on the broiler transport trailer receives ventilation air from the broiler transport units and recirculates at least a portion of the received ventilation air back to the broiler transport units as ventilation air. This can be relevant in cold ambient conditions, in which the recirculated ventilation air leads to a higher temperature in the broiler transport units at least in the initial phases of the transport.

It is possible that at least one of the parameters a) air temperature, b) air humidity and c) $CO_2$ content in the air is measured on the trailer in ventilation air received by the broiler transport units. These parameters can give information about the current welfare of broilers and whether there would be advantages in improving the ventilation to the broilers. If the broilers become too warm, they give off heat by aspiration, and the aspiration releases moisture, so that the air humidity and the air temperature in the air flowing out of the broiler transport units are each an indicator of whether the ventilation is sufficient or must be adjusted. The $CO_2$ content, on the other hand, can require a maximum limit value, and recirculation may be limited under some ventilation conditions by the $CO_2$ content in the air. However, one or more of the parameters can also be measured solely for the purpose of documenting the welfare of the broilers during transport.

The amount of recirculated air can be regulated in dependence on at least one of the measured parameters, preferably in such a manner that the amount increases if the air temperature is below a predetermined temperature value, or the amount decreases if the air humidity is above a limit value, or the amount decreases if the $CO_2$ content is above a predetermined value.

In one embodiment, the ventilation system provides ventilation air to all the broiler transport units on the broiler transport trailer in a total amount in the range of from 10,000 $m^3/h$ to 100,000 $m^3/h$, preferably in the range of from 30,000 $m^3/h$ to 80,000 $m^3/h$.

The object is also achieved by a poultry slaughterhouse having a poultry lairage region for live poultry using at least one broiler container according to one or more of claims 1 to 23 and/or a unit according to one or more of claims 24 to 30 and/or an arrangement according to one or more of claims 31 to 33 and/or a transport trailer according to one or more of claims 34 to 43.

Preferably, the live poultry arrives at the slaughterhouse in poultry transport units on a trailer of a vehicle, wherein the trailer comprises a ventilation system for ventilating the poultry transport units, wherein the poultry lairage region of the poultry slaughterhouse has a plurality of parking regions with supply sockets for operating the ventilation systems on trailers which are temporarily placed in the poultry lairage region, wherein the ventilation systems ventilate ventilation columns extending into the inner volumes of the poultry transport units.

The poultry lairage region is preferably at least in part an outside region.

A poultry receiving system at the poultry slaughterhouse preferably includes semi-automatic or automatic actuators which are designed to engage poultry transport units on a trailer and transfer the poultry transport units to a conveyor in the poultry receiving system.

The slaughterhouse preferably comprises a CAS (controlled atmosphere stunning) apparatus with a chamber having at least one ventilation opening having at least one outlet opening, which is designed for temporary connection to and guiding of controlled atmosphere gas into at least one local ventilation line leading to at least one ventilation gas outlet opening situated in at least one inner volume of a poultry transport container or a poultry transport unit, and wherein the at least one ventilation device in the CAS apparatus guides controlled atmosphere gas by forced ventilation to each inner volume receiving poultry in the poultry transport container or the poultry transport unit.

Preferably, a delivery system for delivering poultry transport units to the CAS apparatus is arranged to receive poultry transport units from the trailer and convey received poultry transport units directly to the CAS apparatus.

With the design according to the invention of the poultry slaughterhouse, the lairage region can be managed with lower operating costs, and the building investment costs associated with setting up the lairage region are preferably also reduced.

With regard to the slaughterhouse according to the present invention, the poultry lairage region of the poultry slaughterhouse has a plurality of parking regions with supply sockets for operating the ventilation systems on trailers placed temporarily in the poultry lairage region, wherein the mentioned ventilation systems ventilate ventilation columns extending into the inner volumes of the poultry transport units. By providing parking regions for trailers and by using trailers having an on-board ventilation system which ventilates ventilation columns extending into the poultry transport units, the transport units containing the poultry can be kept on the trailer until they can be conveyed directly to the stunning and slaughtering sections or to the slaughterhouse.

The need for a lairage building which ventilates transport units after they have been unloaded from the trailer, and for individual placing of the transport units in the ventilated building, is therefore eliminated. It is important for the possibility of keeping the transport units on the trailer in the lairage parking region that the ventilation system ventilating the trailer has ventilation columns which extend into the inner volumes of the transport units. Only with such ventilation columns is it possible properly to ventilate the poultry situated in the middle of an individual inner volume, and for a stack of transport units which are situated in the inner region of the trailer loading region between other stacks of transport units, such ventilation columns within the stacks are very important for avoiding overheating of the poultry.

A further important advantage is achieved with regard to the activities that are necessary when a loaded poultry transport trailer is received. The necessity for handling of the poultry transport units is reduced because they no longer need to be unloaded from the trailer, brought into the lairage building and then transported out of lairage again. Because each handling step means noise, vibrations and changes to the environment for the poultry accommodated in the poultry transport units, an increased stress level for the poultry is unavoidably obtained, and the omission only of a single handling step therefore means improved meat quality, for example because the frequency of so-called PSE (pale, soft, exudative) meat is reduced. In terms of a single poultry transport unit, the effect may be small, but from the large perspective of the overall production of a modern poultry slaughterhouse, such small improvements add up to a considerable economic gain, and the improvements are clearly advantageous also from the perspective of the welfare of the animals.

A further advantage is that the driver transporting the poultry transport units to the slaughterhouse no longer needs to wait for the trailer to be unloaded. He can simply leave the trailer parked and connected in the lairage region and take another trailer which has previously been unloaded and possibly filled with empty transport units.

The trailer itself provides adequate shelter for the poultry during the waiting period, so that no building is actually required in the lairage region. The lairage region can accordingly be an outside region, but it is also possible to equip the lairage region with sun or wind protection or with a shelter for the supply sockets. The poultry lairage region can accordingly be an outside region at least in part. In some climate zones, the parking regions are expediently covered in order to protect the trailers from the sun and/or rain. An open construction allows natural ventilation to be used in addition to the forced ventilation on the trailers, but in some cases it may be necessary to provide temporary or permanent side coverings or walls, in particular to protect the supply sockets.

It is of course still possible to unload the trailers using forklift trucks, but a poultry receiving system at the poultry slaughterhouse can also have semi-automatic or automatic actuators which are so designed that they engage poultry transport units on a trailer and convey the poultry transport units to a conveyor in the poultry receiving system. The poultry transport units can thus be conveyed directly and without problems to a conveyor which brings them to the stunning section, which in turn results in a reduction in the handling-related stress levels of the poultry. An example of such actuators is an ejection mechanism which is provided in the floor of the trailer and presses on the floor of each poultry transport unit so that it is pushed out of the trailer and onto a receiving conveyor which is arranged permanently or temporarily on a level with the floor of the trailer. This not only results in the elimination of the swinging and turning movement which occurs when the transport units are unloaded using forklift trucks; it also permits better controlled (slower) acceleration and deceleration. It is possible for one transport unit at a time to be unloaded, or the entire load on a trailer can be unloaded at once, depending on the construction of the actuators and of the receiving system and on the capacity of the stunning and slaughtering sections. In the semi-automatic version, an operator decides which transport units are unloaded when and then activates the actuators, while in the automatic system, the presence of a full trailer is registered, for example by means of optical sensors coupled to a computer system, and transport units are unloaded preferably in response to feedback data from the stunning and slaughtering sections. When poultry transport units on the trailer are stacked one on top of another, it may be expedient to have receiving conveyors at different heights and/or to use vertically adjustable receiving conveyors. Alternatively, a de-stacker can be provided.

In order to reduce the number of handling steps still further and improve the quality of the meat, the slaughterhouse can comprise a CAS (controlled atmosphere stunning) apparatus having a chamber with at least one ventilation devices with at least one outlet opening, which is so designed that it is temporarily connected to controlled atmosphere ventilation gas and guides that gas into at least one local ventilation line leading to at least one ventilation gas outlet opening situated in at least one inner volume of a poultry transport container or of a poultry transport unit. It is thus avoided that the poultry is unloaded onto a conveyor and transported into the stunning apparatus, an operation which can place the poultry in a state of confusion and discomfort; more importantly, however, the supply of gas into the local ventilation lines ensures that each bird receives the same gas composition for the desired duration because all the birds receive the gas at the same time. This effect is promoted still further if the at least one ventilation device in the CAS apparatus preferably directs controlled atmosphere gas by forced ventilation to each inner volume in the poultry transport container or in the poultry transport unit that receives poultry.

The transport units can be brought directly into the stunning apparatus without the need for compartments to be emptied as in EP 0 384 530 A1. As a result, the number of handling steps experienced by the poultry before stunning is reduced, and the work associated with handling and the required equipment are simplified.

In one embodiment, a supply system for poultry transport units to the CAS apparatus is arranged to receive poultry transport units from the trailer and convey received poultry transport units directly to the CAS apparatus. This produces a construction which is structurally very simple and a very short handling time, which results in the advantage that the stress levels of the poultry are kept low.

The invention relates also to a method for transporting live poultry to a slaughterhouse and for receiving live poultry at the slaughterhouse, wherein the poultry is accommodated during transport in poultry transport units having at least two floors, wherein the live poultry arrives at the slaughterhouse in poultry transport units on a trailer of a vehicle, wherein the trailer comprises a ventilation system.

In order to optimise the welfare and handling of the poultry prior to slaughter, the ventilation system guides ventilation air into the individual poultry transport units via ventilation openings situated within the inner volumes above the floors of the poultry transport units carrying the poultry, wherein the poultry transport units remain on the trailer during lairage after arrival at the slaughterhouse and the ventilation system is operated during lairage.

The advantages relating to a reduced number of handling steps and a reduced total handling time apply equally to this aspect of the invention. In this method, however, the trailer does not need to be connected to a supply socket at the slaughterhouse but can use its own on-board energy supply as an alternative and may remain connected to the truck or other engine during the lairage time.

As described in detail with regard to the above-mentioned slaughterhouse, it is advantageous if the poultry transport units are transferred after lairage from the trailer to a CAS (controlled atmosphere stunning) apparatus and the controlled atmosphere is guided by mechanical ventilation directly into ventilation lines which extend into the interior of the transport unit to at least one gas outlet opening in each inner volume in the poultry transport unit that receives poultry.

In a further development of the method according to the present invention, parameters selected from the group a) ventilation air temperature, b) ventilation air humidity, c) outlet air temperature, d) outlet air humidity, e) $CO_2$ content in outlet air, f) ambient temperature, g) ambient air humidity, h) transport duration, i) lairage duration, j) vibration level, k) noise level and l) light intensity are detected and recorded by a recording system.

Some of these parameters are potential stress factors for poultry, and detection of these factors during transport and parking can serve to document high welfare of the poultry or to document conditions which should be avoided or reduced. The detection and recording can be compared with specific limit values for specific parameters and coupled with a warning system which, for example, informs the driver or an office of the undesirable condition which has been caused by the limit value being exceeded, and this can be used to change or regulate the conditions causing the warning. One example may be vibrations caused by driving too quickly on an agricultural road, and the warning can lead to a reduction in the speed.

Other of the indicated parameters can be used to detect the condition of the poultry, such as, for example, whether the poultry is too warm. The outlet air humidity in combination with the ventilation air humidity can show whether the poultry is beginning to become too warm, and this information can be used in regulating the ventilation and achieving improved welfare of the poultry. The recording of one or more of the parameters can not only be used by the carrier to demonstrate to his customer that the poultry has been treated properly during transport, but it can also be used, for example, to provide the completed meat product with an animal welfare certificate.

If it is decided to focus on a limited number of factors, it can be advantageous to detect and record at least the parameters c) outlet air temperature and d) outlet air humidity, because these factors can influence the quality of the meat after slaughter.

It is preferred that the trailer receives a plurality of poultry transport units or a plurality of stacks of poultry transport units and that the recording system detects and records the chosen parameters for the individual poultry transport unit or the individual stack of poultry transport units. The conditions in each poultry transport unit or each individual stack can thus be regulated independently in order, for example, to compensate for higher temperatures in one end region of the trailer than in the opposite end region.

It is noted that it is possible to apply either an overpressure or a low pressure to the ventilation columns, so that air is either forced out of the ventilation columns and into the inner volumes or is drawn out of the inner volumes and into the ventilation column. The ventilation columns can be closed at one end. When transport units having a pallet support are used, the ventilation columns can extend into or through the pallet.

In one embodiment, the ventilation openings and the ventilation devices are arranged at the roof of the trailer or at the floor of the trailer, and the ventilation columns extend vertically within the stacks. The ventilation devices, such as, for example, fans or compressors, of the ventilation arrangement can then be provided at the roof and/or at the floor of the trailer. If ventilation devices are situated both at the roof and at the floor, they can work together in order to increase air flows in the ventilation columns, or they can ventilate different columns. If a plurality of transport units are arranged one on top of another, ventilation devices at the roof can ventilate the upper transport units, and ventilation devices at the floor can ventilate the lower transport units. Ventilation devices at the roof and/or at the floor potentially also offer free access to the trailer, so that transport units can be loaded and unloaded from each side, but ventilation devices can also be situated at the sides of the trailer either as an alternative or in addition to ventilation devices at the roof and/or at the floor. Likewise, it is also possible to use a combination of horizontal and vertical ventilation columns.

In one embodiment, the ventilation system has at least 20 ventilation openings and/or ventilation devices which are arranged at the roof of the trailer or at the floor of the trailer in positions corresponding to ventilation column end openings facing upwards or downwards on the poultry transport units which are temporarily placed on the poultry transport trailer. The arrangement at the roof makes it easier to create space for loading the poultry transport units by raising the ventilation section during loading or unloading.

In one embodiment, the trailer is provided with at least one ventilation device per stack and preferably with one ventilation device per ventilation column in the stack. This permits very precise regulation of the ventilation to local inner volumes, as a result of which, for example, colder air is guided to columns in the middle of the trailer, where the temperature tends to be higher than at the sides, or pressures caused by the movement of the trailer can be compensated for, which pressures can influence in particular the transport of transport units with relatively open side walls. Accordingly, it is advantageous if such ventilation devices can be regulated individually, preferably in such a manner that at least a preset ventilation rate ($m^3$ air per second) is delivered. This can be achieved, for example, by providing a fan at each ventilation column, but it is also possible to provide one or a number of fans which are connected to distribution channels which may be provided with valves for regulating the air flow. The provision of more than one ventilation device per stack has the advantage that the ventilation is not interrupted completely if one ventilation device fails.

In one embodiment, the trailer is equipped with a $CO_2$ supply system which provides ventilation air with a $CO_2$ content preferably in the range of from 3 to 22 vol. %, and the $CO_2$ supply system receives $CO_2$ preferably from exhalation air from poultry and/or from exhaust gas from the transport drive vehicle. $CO_2$ can be used to stun poultry, and the effective supply into the inner volumes by mechanical ventilation has been mentioned in the above description as an advantage of the distribution of the carbon dioxide via the ventilation columns. During transport, however, a lower $CO_2$ concentration may be used so that the poultry is kept calmer during transport without actually being stunned. Transport examples of the prior art in open crates have shown high transport-related weight losses, such as, for example, a weight loss of 15% of the initial body weight at the start of transport. Apart from the effects of heat and the resulting panting, the poultry may also be anxious owing to the completely new environment it experiences during transport—with noises, movements, bright light—and this can result in the poultry using energy due to stress. By controlling the composition of the ventilation air, poultry can be calmed, and this is advantageous both for its welfare and for reducing weight loss. The ventilation system on the trailer according to the present invention is effective in distributing the ventilation air evenly, so that additions, for example, of carbon dioxide in small amounts can be regulated. If the carbon dioxide content exceeds 22 vol. %, the poultry probably becomes unconscious, which is not considered an advantage during transport.

In one embodiment, the trailer is provided with a recording system for detecting and recording parameters chosen from the group a) ventilation air temperature, b) ventilation air humidity, c) ambient air temperature, d) ambient air humidity, e) outlet air temperature, f) outlet air humidity, g) $CO_2$ content in outlet air, h) transport duration, i) lairage duration, j) vibration level, k) noise level and l) light intensity. This recording system can run on the same processing device or computer as is used for controlling the ventilation arrangement, or it can run on a separate processing device which communicates with the mentioned processor device, and data from the recording system can then be used for controlling the ventilation arrangement, for example by providing an increased air flow in some ventilation columns if an unacceptable temperature is detected in the vicinity of those columns. Alternatively, the recording system can be an isolated system which is used only for detection and recording purposes. The recording system can also be associated wholly or in part with the transport unit, so that one or more of the above-mentioned parameters can be detected and recorded even after the transport unit has been unloaded from the trailer.

The recording system can have one or more separate detectors and recording devices which are able to communicate via (a) wireless connection(s), but it is also possible to use smaller local units in which the detector and the recording device are part of the same unit. Such units can be added to and removed from the transport units in conjunction with the filling and emptying of the transport units, and they can be disposable or reusable.

The ventilation devices can comprise bellows or the like for producing a suitable air-tight connection with the ventilation columns, and/or the ventilation arrangement can comprise actuators for moving the ventilation devices into and out of contact with the openings of the ventilation columns.

A computer system designed to control the ventilation arrangement automatically or semi-automatically can be provided on the trailer.

BRIEF DESCRIPTION OF THE DRAWINGS

Examples of embodiments of the invention will be described in greater detail below with reference to the schematic drawings, in which.

DETAILED DESCRIPTION OF EMBODIMENTS

Figure 1:
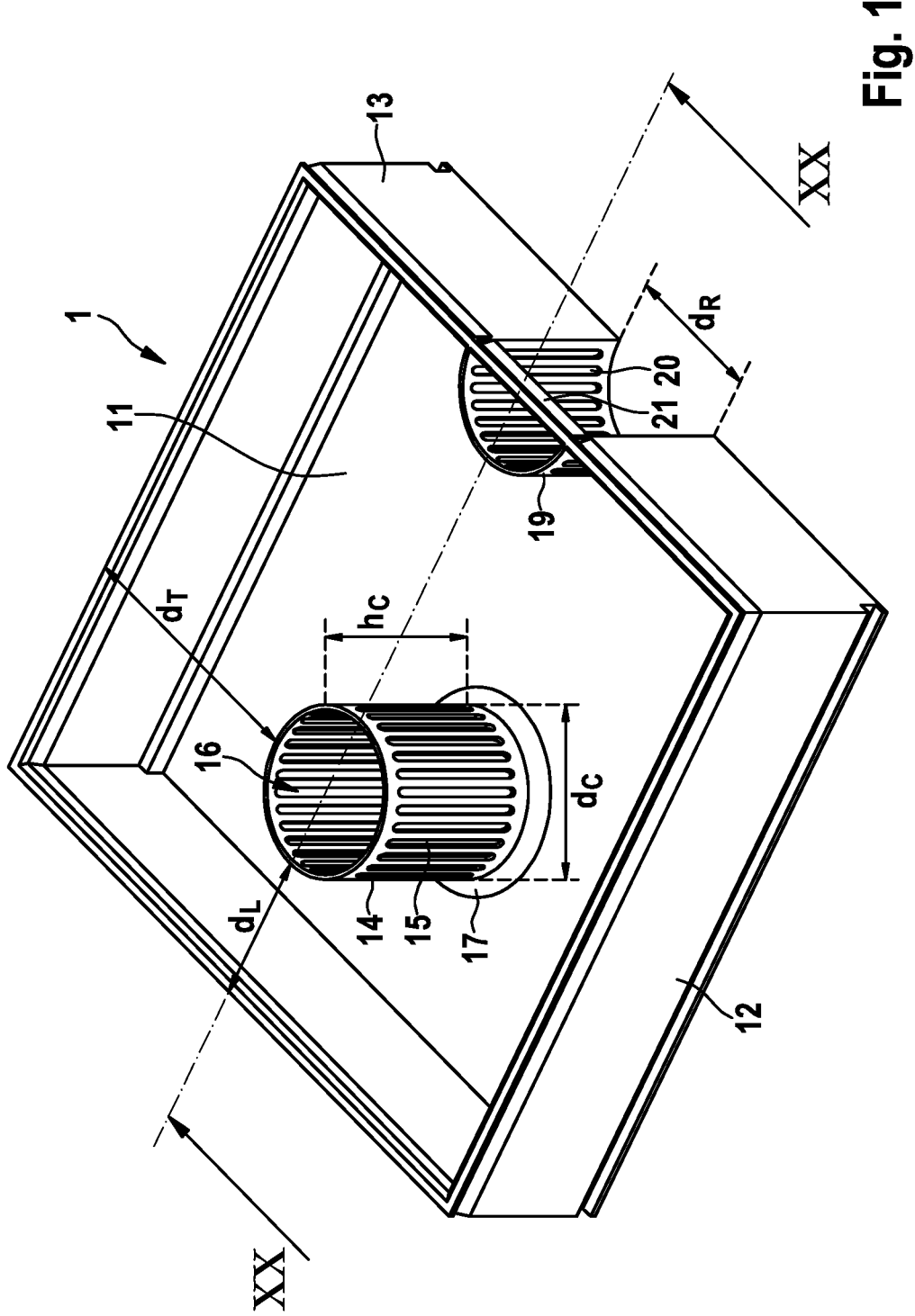
FIG. 1 shows an embodiment of a broiler transport container in a perspective view seen from above.
Figure 2:
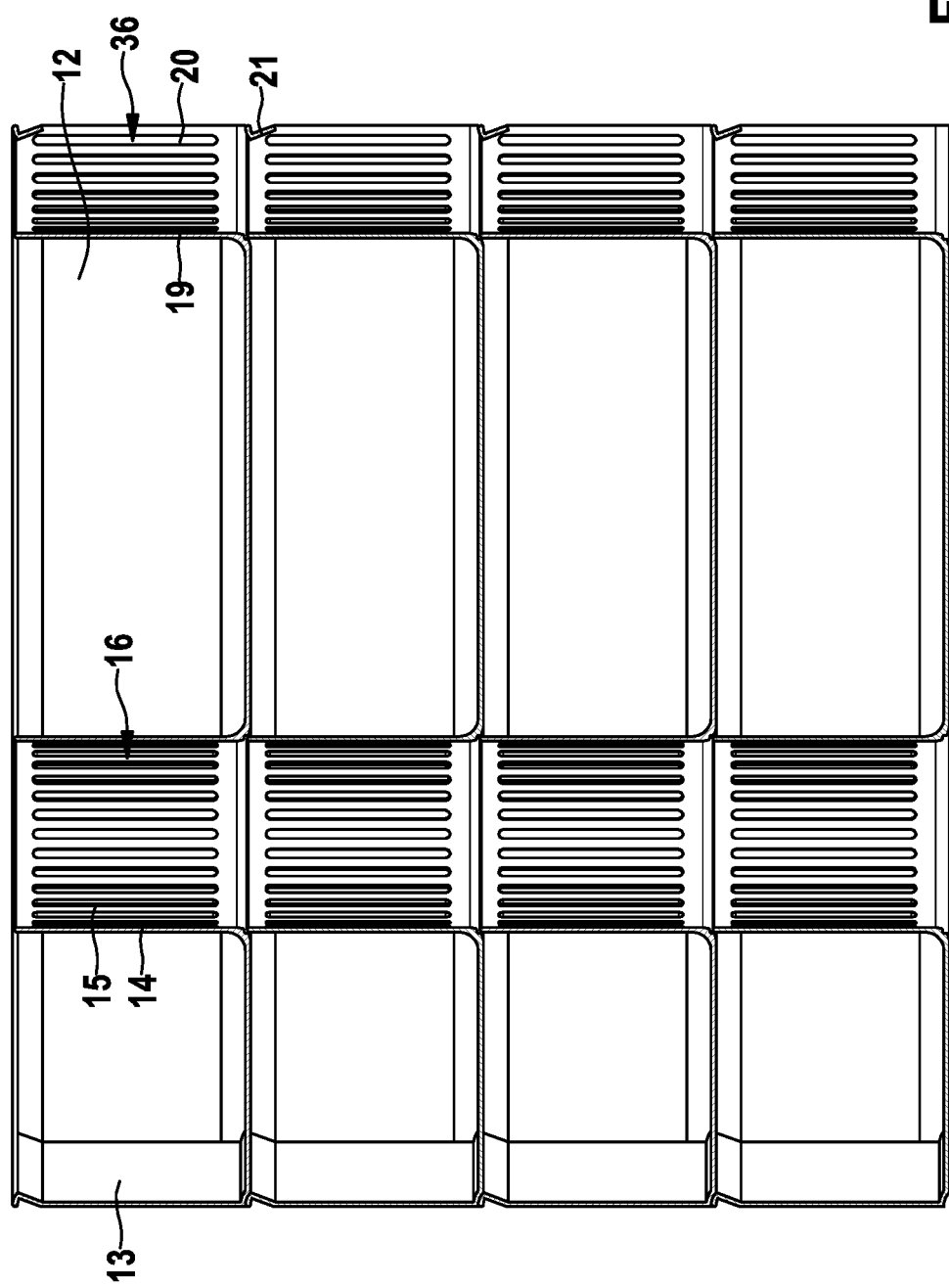
FIG. 2 shows a broiler transport unit composed of broiler transport containers as can be seen in FIG. 1 in cross-section along the line XX-XX in FIG. 1.

An embodiment of a broiler transport container 1 according to the invention is shown in FIGS. 1 and 2. It comprises a substantially square floor 11 and four side walls 12, 13, which together delimit an inner volume of a size to receive at least five live broilers (not shown). A ventilation column (as a ventilation opening or air outflow opening) in the container can also be referred to as a ventilation column section 14 or segment, because it becomes a section of a common ventilation column which extends through a plurality of broiler transport containers when they are stacked to form a unit or loaded onto a transport trailer. The ventilation column section 14 extends in the middle of the floor from the floor 11 into the inner volume, and a recess 19 (as an air outflow opening or ventilation opening) is provided in one of the side walls. Each ventilation column section 14 and each recess 19 is provided with elongate ventilation openings 15 which extend over almost the entire height of the column.

In connection with the ventilation or air outflow column, "segment" describes a section of a column which can serve as a ventilation or air outflow column. It is both a longitudinal-axis section of a column and a cross-sectional section of a column. Joining a plurality of segments, or a plurality of column sections, of adjacent containers in all cases results in a common column. Each ventilation column can also be an air outflow column, depending on whether an overpressure or a low pressure is generated by the ventilation system. Therefore, any mention in the following of a ventilation column can correspondingly also mean the air outflow column, and vice versa. Mention is also made generally in the following only of the column. Each segment or each ventilation column section 14 can form or constitute a separate column. Each segment acquires particular importance, however, in a unit described hereinbelow comprising at least two containers, namely when a plurality of segments form a common column.

The ventilation column section 14 is arranged at a distance $d_T$ from one side wall 12 and at a distance $d_L$ from the other side walls 13. These distances $d_T$, $d_L$ are such that there is space for at least one broiler between each of the columns 14 and the respective side walls 12, 13, and they are therefore at least 0.17 m. This distance not only prevents broilers from becoming trapped, but it also provides ventilation for a region of the inner volume.

In this embodiment, the ventilation column section 14 has a height $h_C$ corresponding to the height of the side walls 12, 13, and is cylindrical with a cavity in the middle and a constant diameter $d_C$, apart from a small angled portion 17 which is provided at the joining face with the floor 11. As mentioned, each column 14 can have a height $h_C$ which corresponds approximately to the height of the side walls 12, 13 (including the thickness of the floor), so that the columns 14 are so designed that they serve as support columns for supporting the floor 11 of a further broiler transport container 1 stacked on top of the broiler transport container 1, as shown in FIGS. 2 and 6-8.

One side wall 13 is provided with a semicircular recess 19 having a diameter $d_R$ which is slightly greater than that of the column section 14, and the recess is also provided with ventilation openings 20. In order to ensure the stability of the broiler transport container 1 even when it is fully loaded with broilers, a carrier 21 bridges the recess 19 as a continuation of the plane of the side wall 13. This carrier is also suitable for use as a handle when the container is handled either manually or automatically.

The column section 14 is so designed that it serves as a ventilation column, and the openings 15 are designed as ventilation openings which allow ventilation air to be guided via the cavity 16 into the column and through the ventilation openings into the inner volume of the broiler transport container. In this manner it is possible to supply fresh air even to birds that are situated at a distance from the side walls 12, 13, which were usually provided with ventilation openings. The air supply can also be used to heat or cool the inner volume of the container.

Ventilation air supplied through the ventilation openings 15 in the column section 14 can emerge via the openings 20 in the recess 19 in the side wall, and it will be appreciated that air can also be supplied in the opposite direction from the openings 20 in the side wall to the ventilation column section when a low pressure is applied to the columns.

The rounded surfaces and the relatively large diameter of the columns 14 and recesses 19 contribute to protecting the broilers during transport and during loading into the container. If a broiler hits the side of a column or recess, there are no sharp edges which could cause bruising, and the cavity can impart a certain impact-absorbing resilience to the columns and recesses.

When broiler transport containers of this type are arranged one on top of another in a broiler transport unit as shown in FIG. 2, the column sections 14 form a common ventilation column 16 which extends vertically through all the units, and the recesses 19 form a common ventilation column which extends along one of the outer side walls.

The bevelled section 17 not only reinforces the structure but also allows the upper edge of the column section 14 of a lower broiler transport container to project slightly into the corresponding column section 14 of an upper broiler transport container in order thus to achieve a relatively tight connection between the ventilation column sections. It is noted, however, that direct contact between the upper ends of the respective ventilation column sections and the outer undersides of the floors of containers arranged above them is not necessary in order to achieve good ventilation of the inner volumes. On the contrary, a gap between the column sections and the floor can contribute to the distribution of ventilation air, because the gap can form an annular ventilation opening.

The broiler transport container in FIGS. 1 and 2 has a length and a width of 120 cm, a height of 22.5 cm and a diameter of the ventilation columns 14 of 20 cm. The distance $d_T$ to the side walls without recesses is 50 cm and the distance $d_L$ to the side wall opposite the side wall having the recess 19 is 30 cm.

Figure 3:
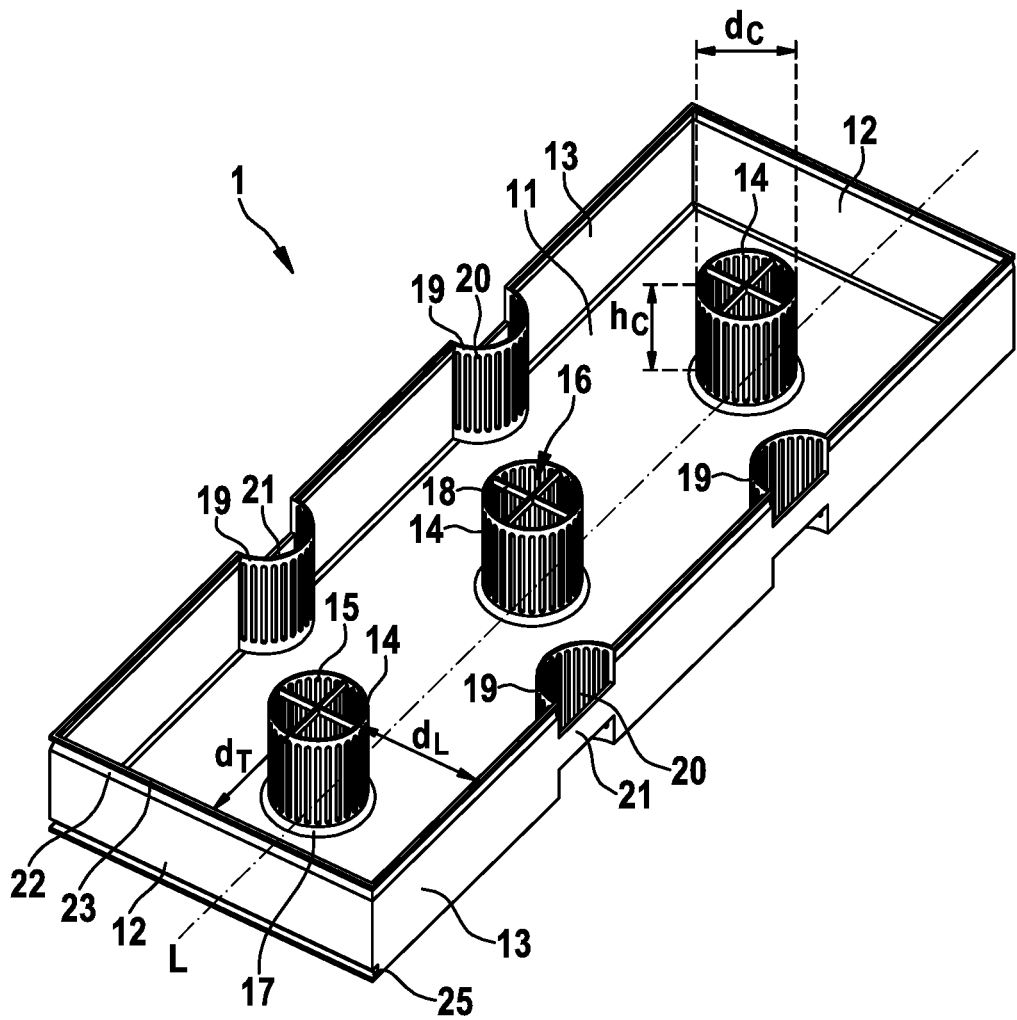
FIG. 3 shows another embodiment of a broiler transport container in a perspective view seen from above.
Figure 4:
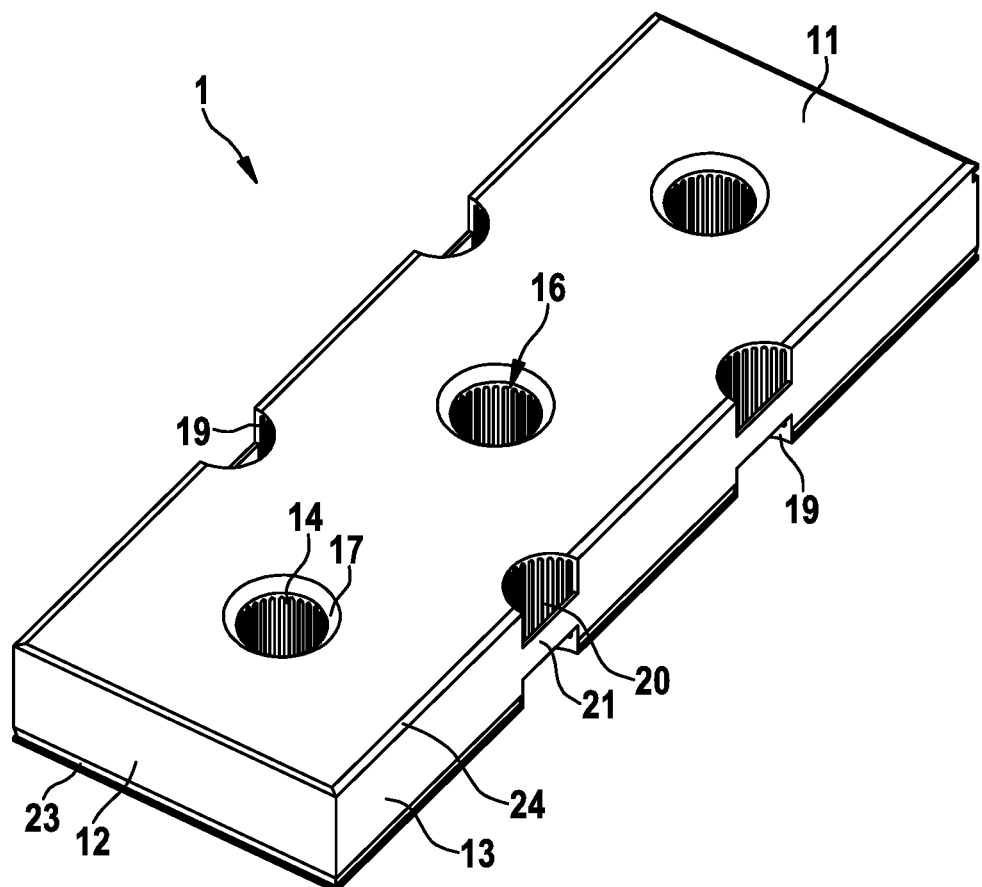
FIG. 4 shows the broiler transport container in FIG. 3 in a perspective view seen from beneath.
Figure 5:
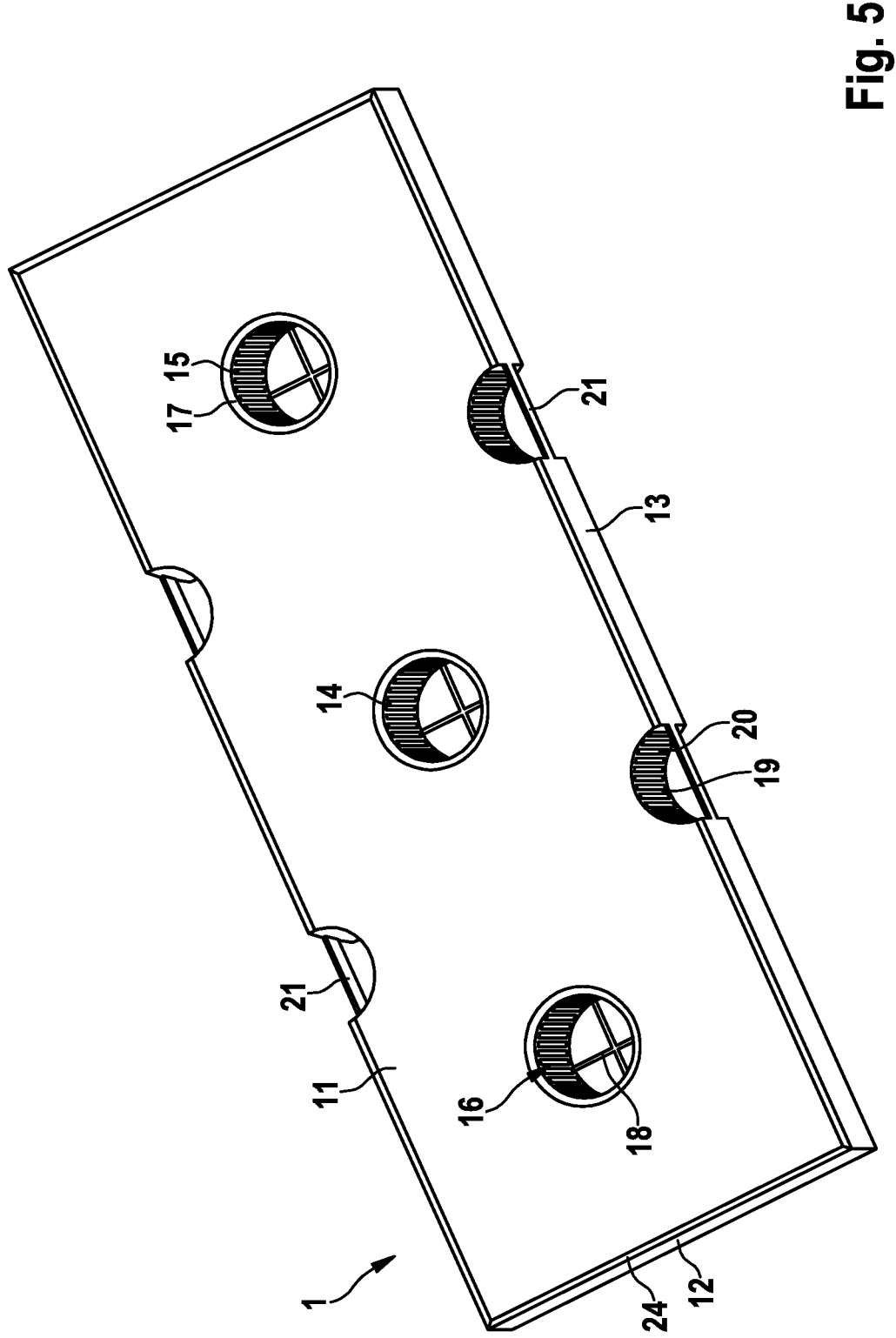
FIG. 5 shows a view corresponding to FIG. 4 but seen from a slightly different angle.

Another embodiment of a broiler transport container according to the invention is shown in FIGS. 3-5. This container corresponds to that in FIGS. 1 and 2, except that it is larger and has a different configuration of the ventilation columns, and the same reference numerals as in FIGS. 1 and 2 have therefore been used.

The container in FIGS. 3-5 comprises a rectangular floor 11, two transverse side walls 12 and two longitudinal side walls 13. Three column sections 14 extend upwards through the inner volume at a distance $d_T$ from the transverse side walls 12 and a distance & from the longitudinal side walls 13, the column sections being arranged in a row along the middle longitudinal axis L of the container and being evenly spaced. The ventilation columns in the individual broiler transport container can also be referred to as ventilation column sections 14, because the ventilation columns in the individual broiler transport container are joined together to form a common ventilation column when the containers are stacked one on top of another. The presence of more than one ventilation column section produces better ventilation in the inner volume and allows different pressures to be provided at the different column sections 14 in order to induce an air flow from one column to the other, so that ventilation is possible even if the openings in the side walls are blocked or no such openings at all are present.

The ventilation column sections 14 are designed as in FIGS. 1 and 2, and the ventilation openings 15 here have a total opening area which corresponds to approximately 40% of the total area of the column, corresponding to approximately 9% of the surface area of the floor of the broiler transport container, but the openings can also be shorter and/or narrower if a smaller opening area is desired. The lowermost region of the column can have an annular cross-section without openings, like the column in the embodiment of FIG. 10.

The ventilation column sections 14 have a cavity 16 in the centre and are cylindrical with a constant diameter $d_C$, except for a small bevelled portion 17 provided at the point of connection with the floor 11. This bevelled portion not only reinforces the structure but also allows a column section of another container to project into the cavity, as will be described below.

In this embodiment, the height $h_C$ of the ventilation sections 14 corresponds to the height of the side walls 12, 13, but they can also be made slightly higher so that they can be brought into engagement with a column section of another container.

At the upper end of each column 14 a cross 18 bridges the opening of the cavity 16. This cross contributes to the stability of the column but, which is equally as important, it also functions as a broiler barrier, which prevents broilers from entering the cavity of the column during loading of the broiler transport container.

Each of the longitudinal walls is provided with two recesses 19 forming column sections 36, and in this embodiment they correspond in size and shape to half a column 14, and the carriers 21 are centred with respect to the height of the longitudinal side wall 13, so that they are even more suitable for use as a handle.

It is also possible to provide different pressures at the different ventilation columns in order to induce a flow of air from one column to the other, so that ventilation is possible even if there are no openings in the side walls.

The two longitudinal walls are provided with recesses 19 which correspond in size and shape to half a column 14, and they are also provided with ventilation openings 20, but there is no bevelled portion and no cross. In order to ensure the stability of the broiler transport container 1 even when it is fully loaded with broilers, a carrier 21 bridging each recess 19 is provided as a continuation of the plane of the longitudinal side wall 13. This carrier is also suitable for use as a handle in the case of manual or automatic handling of the container.

The broiler transport container in FIGS. 3-5 has a length of 240 cm, a width along the transverse side walls 12 of 80 cm and a height of 22.5 cm, and the diameter of the ventilation columns 14 is 20 cm. According to current European regulations, the containers may thus receive up to 50 broilers having a weight of 3 kg. Other sizes are of course also possible.

Figure 6:
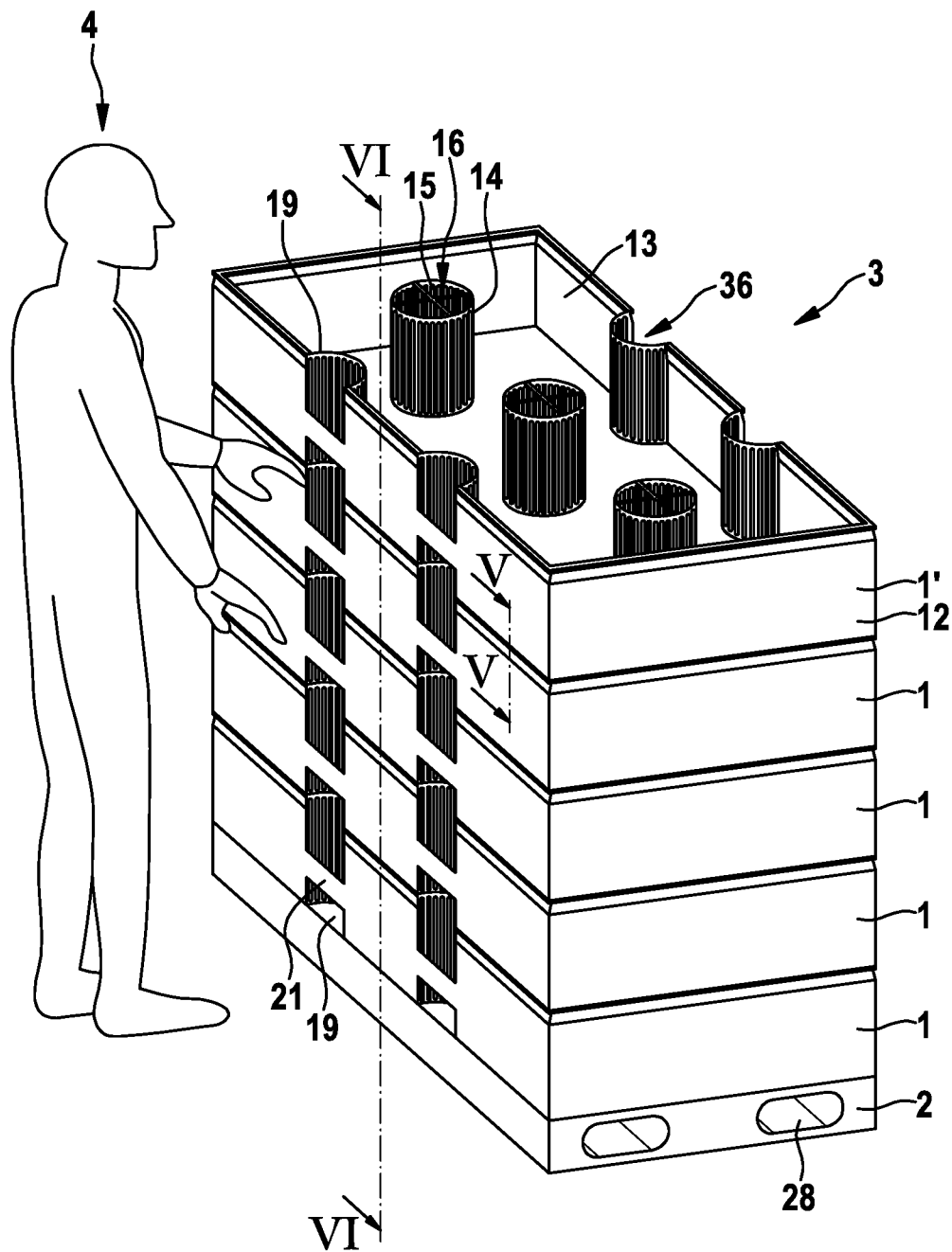
FIG. 6 shows five containers of the type shown in FIGS. 3 and 4 which are arranged in a stack on a pallet.

FIG. 6 shows five broiler transport containers 1, as shown in FIGS. 3-5, stacked one on top of another on a pallet 2 to form a broiler transport unit 3 which conventionally further includes a covering in the form of a net or a lid (not shown) on the upper container.

An operator 4, who has just filled the fourth broiler transport container from the bottom with broilers (not shown), has placed a fifth empty container on top and is ready to load it with broilers.

Figure 7:
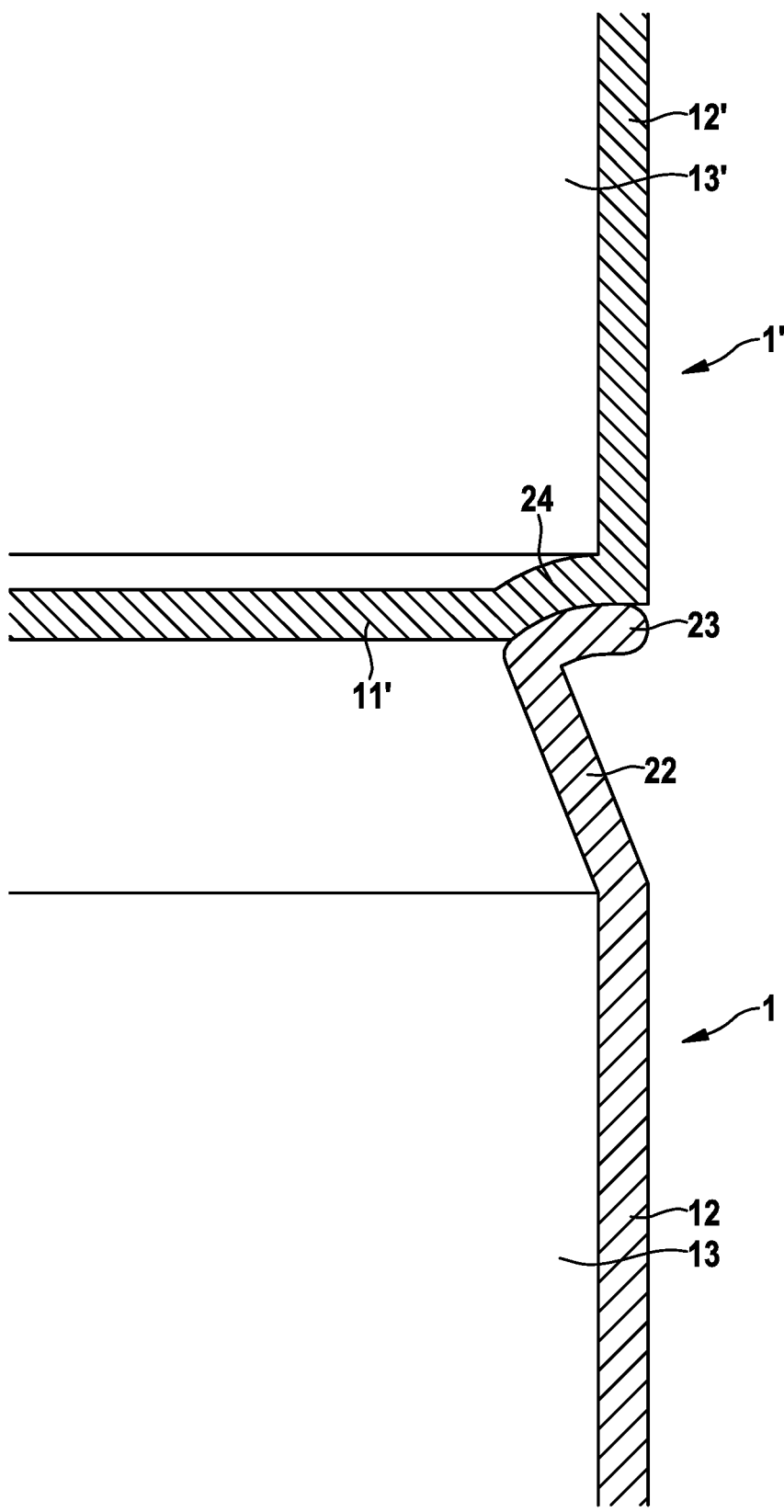
FIG. 7 shows a cross-section along line V-V in FIG. 6.

As can likewise be seen in FIGS. 3-5, the upper edges of the side walls 12, 13 have a bevelled portion 22, which projects inwards slightly towards the inner volume of the container, and a flange 23, which projects outwards away from the inner volume. These are designed to engage with a bevelled edge portion 24 of the floor 11 when containers 1, 1' are stacked one on top of another as shown in FIG. 6, so that the upper container 1' is able to rest on the lower container 1 without a portion thereof protruding outwards beyond the planes of the outsides of the side walls 12, 13 and substantially without limiting the opening of the inner volume as shown in FIG. 7, which is a cross-sectional view of the detail marked V-V in FIG. 6.

Figure 8A:
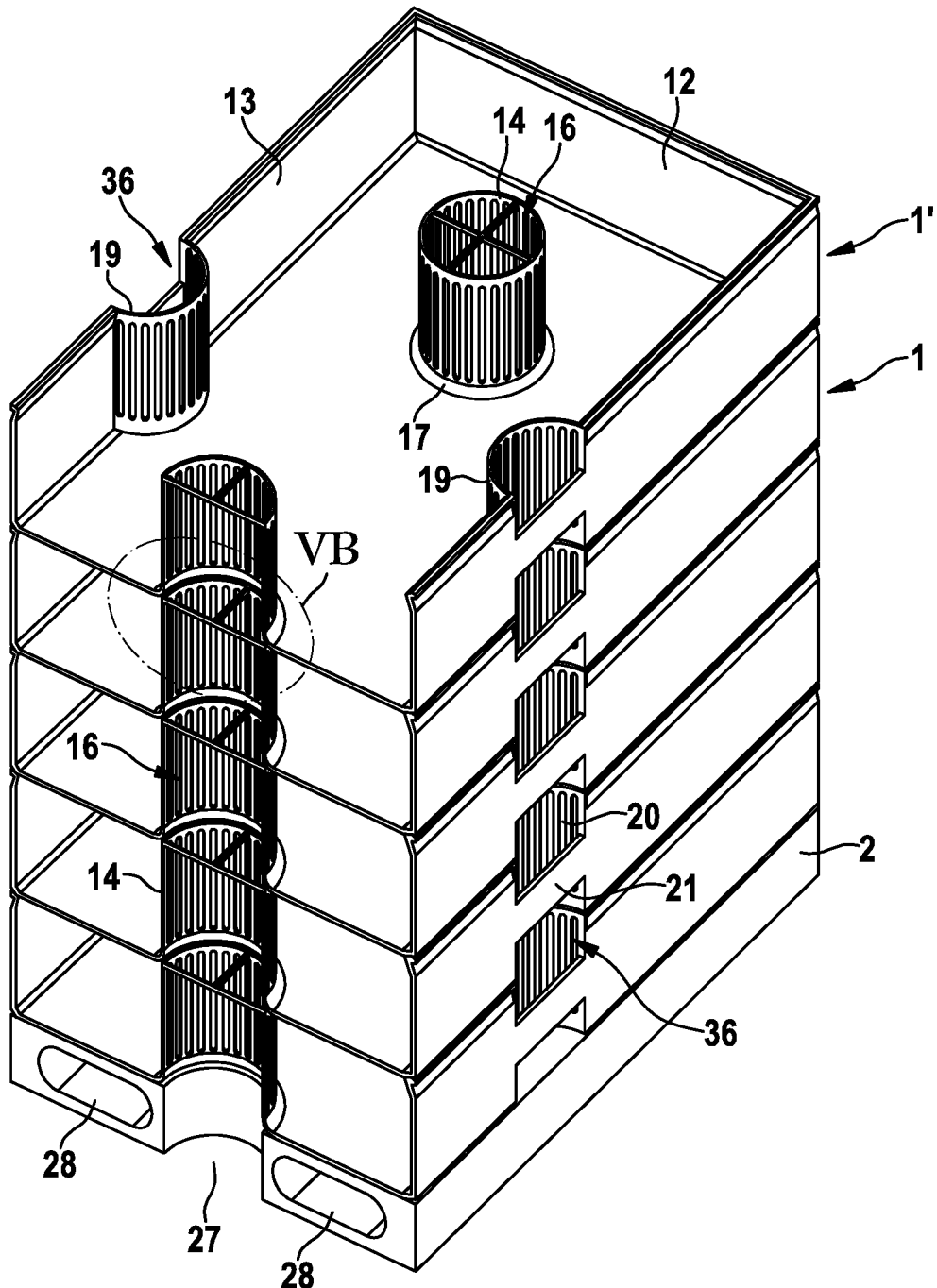
FIG. 8A shows a cross-section along line VI-VI in FIG. 6.

FIG. 8 shows a cross-section through the transport unit 3 along line VI-VI in FIG. 6. As can be seen, the column sections 14 of the five broiler transport containers 1, 1' are positioned as a continuation of one another when the containers are stacked, so that they form a common ventilation column 16 in the form of a continuous hollow-cylindrical channel through the transport unit. By applying an air pressure to the channels 16, all the broiler transport containers 1, 1' in the transport unit can be ventilated at the same time.

The recesses 19 in the side walls are likewise situated one above another, as is also shown in FIG. 6, so that semicircular continuous hollow columns 36 are formed at the longitudinal side walls 13, which can contribute to the ventilation of the transport unit as a whole. When the transport unit is arranged close to another transport unit composed of broiler transport containers of the same type and is in alignment therewith, the recess columns 36 in those transport units are aligned and form a common ventilation column having a circular cross-section, which is similar to that of the channel 16 formed by the ventilation columns. A similar effect can be achieved by arranging the transport unit with the longitudinal side wall 13 close to a wall or the like in order thus to close the recesses 19 and produce a semicircular ventilation channel.

Figure 8B:
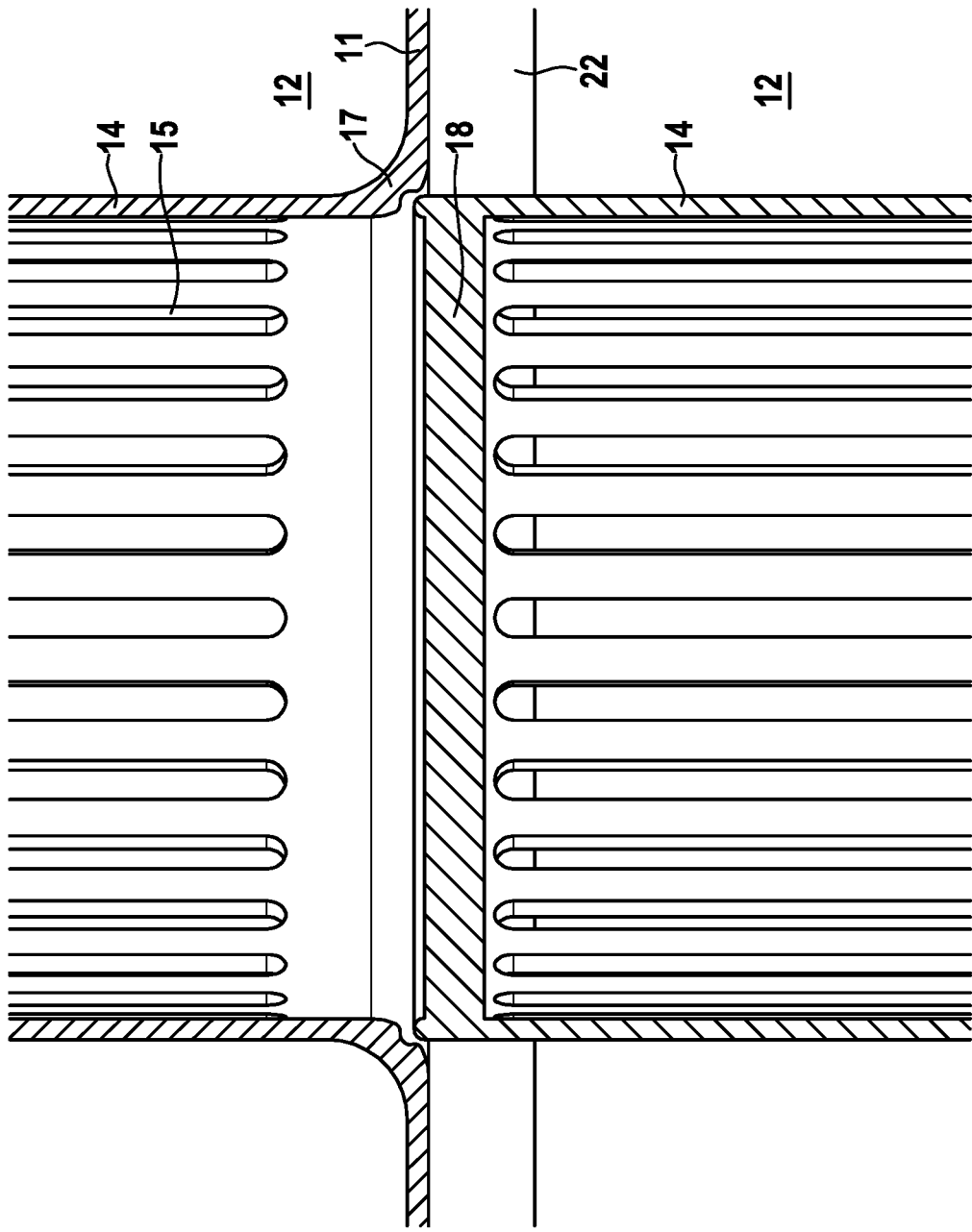
FIG. 8B shows the detail marked VB from the side, indicated by the arrow in FIG. 8A.
Figure 9:
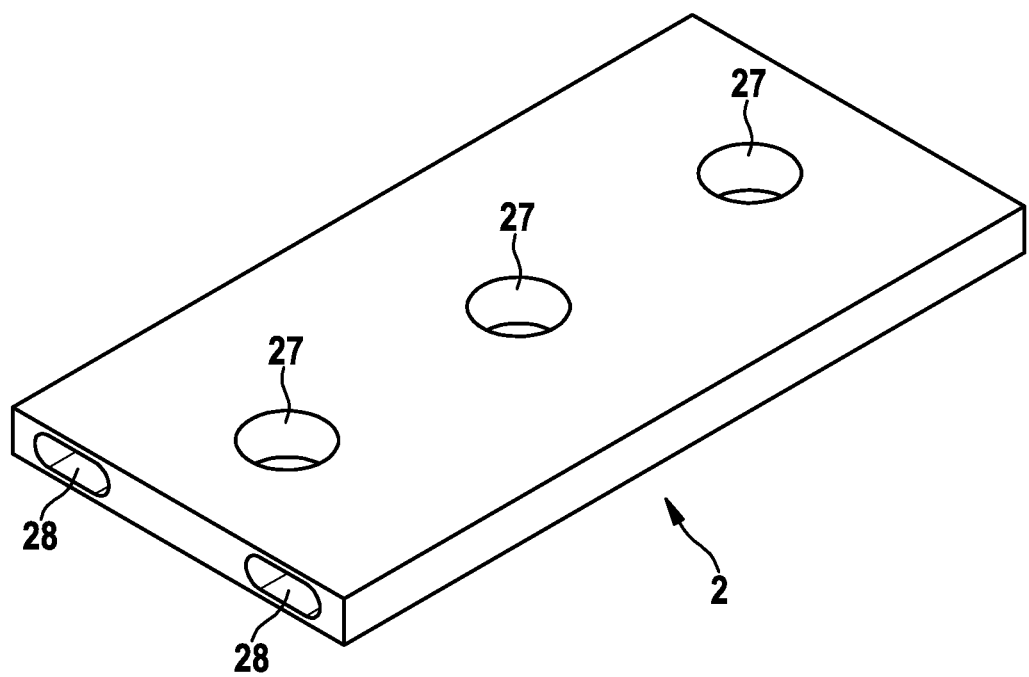
FIG. 9 shows the pallet in FIG. 6 in a perspective view from above.

In this embodiment, the channel 16 formed by the columns 14 continues into the pallet 2, which is provided with a row of openings 27 in the same positions as the columns in the broiler transport containers, as is likewise shown in FIG. 9, but this does not need to be the case. The channels formed by the recesses 19 do not continue into the pallet, but can do so in other embodiments. Horizontal openings 28 in the pallet 2 are designed for engagement with the arms of a forklift truck (not shown) used for handling the transport unit 3. These horizontal openings can be in communication with one of the channels 16, 36, but that is not the case in the embodiment shown in FIGS. 6, 8 and 9. These openings can be used for correctly positioning the lowermost broiler transport container 1 of a stack by aligning the columns 14 therein with the openings 27 and also for positioning the (transport) unit 3 on a truck, a trailer or another vehicle.

The provision of pallets and/or coverings and the engagement between containers described with reference to FIG. 7 also applies to the embodiment of FIGS. 1 and 2.

Figure 10:
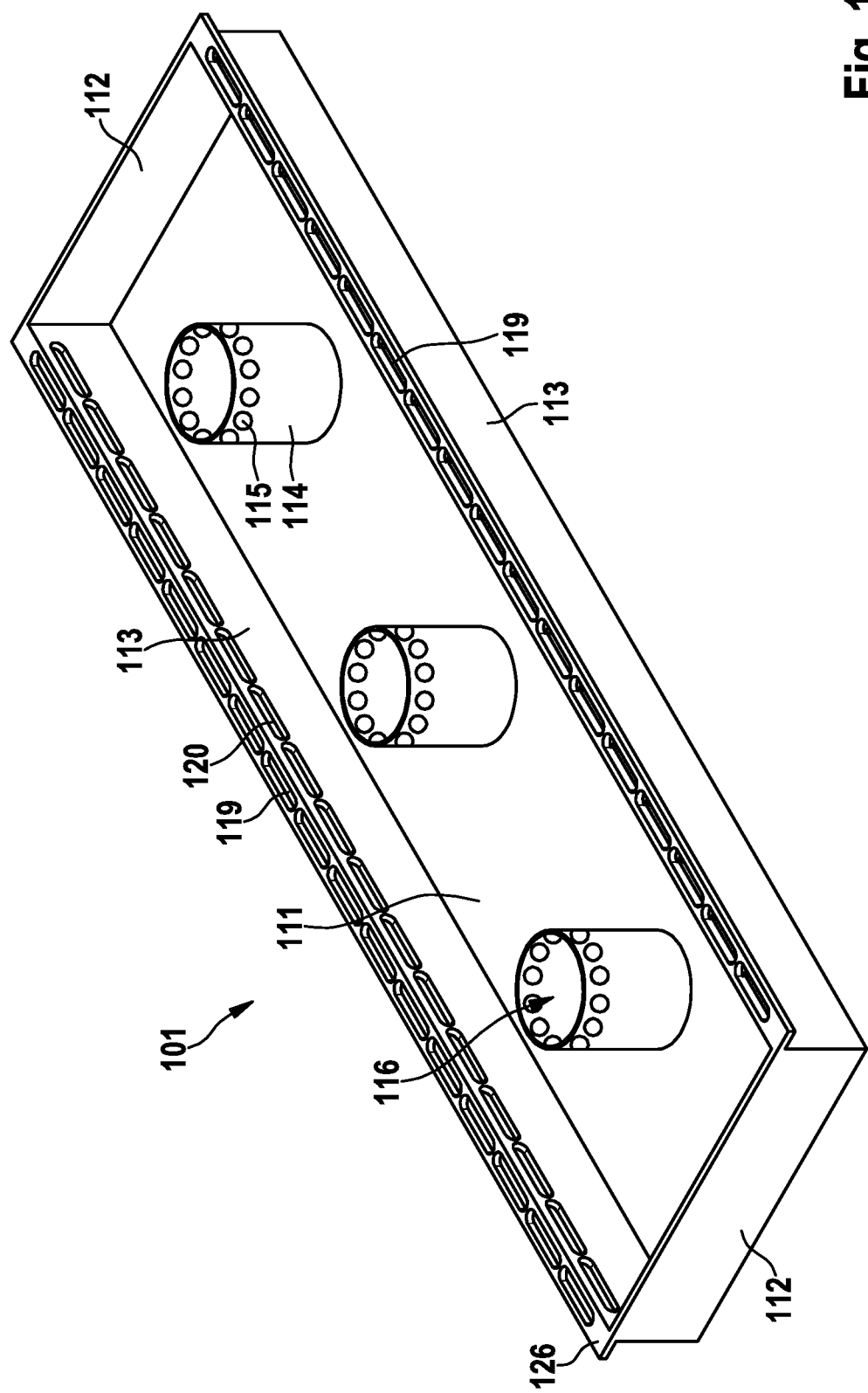
FIG. 10 shows another embodiment of a broiler transport container in a perspective view seen from above.
Figure 11:
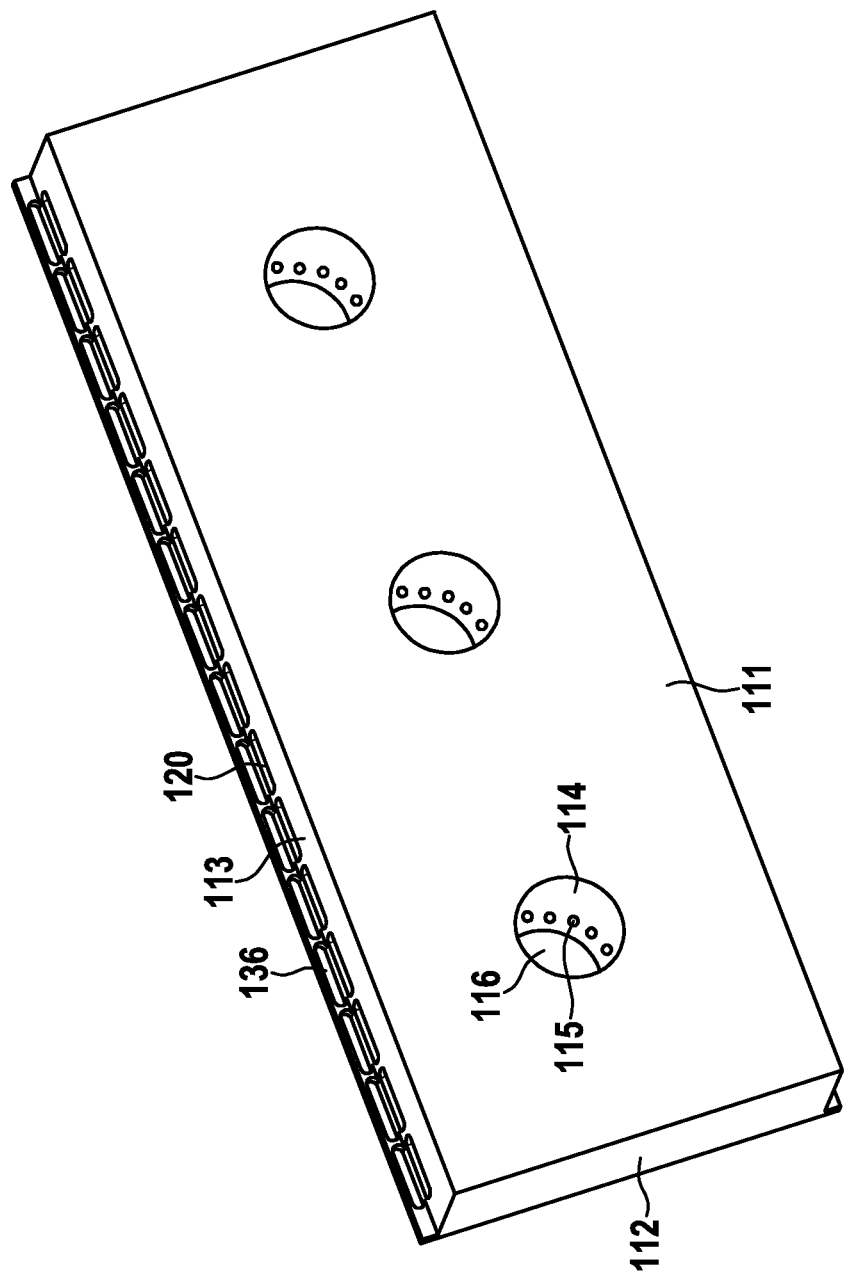
FIG. 11 shows the broiler transport container in FIG. 10 in a perspective view seen from beneath.

Another embodiment of a broiler transport container 101 is shown in FIGS. 10 and 11. Reference numerals corresponding to those in FIGS. 1-9 are used, but with the addition of 100, and features having such corresponding reference numerals then have the same function unless indicated otherwise.

This broiler transport container 101 also has three ventilation column sections 114 which are so arranged that they project from the floor 111 and form a ventilation column 116, but the container is of a simpler construction, and the ventilation openings 115 are provided only at the upper edges of the column sections. These ventilation openings have a smaller total opening area than those shown in FIGS. 1-9 and are situated at head height of the broilers. The ventilation efficiency is in many cases the same, however, because the bodies and plumage of the broilers (not shown) in the container frequently block lower portions or ventilation openings or hinder the distribution of air along the floor, while the openings in FIGS. 8 and 9 are situated at head height of the broilers.

The shape, size and position of the openings can vary greatly without having a substantial negative effect on the ventilation properties, and other questions, such as, for example, whether the container is better or worse to clean, should therefore likewise be considered when making a decision about a particular construction. It is also possible to provide regulation of the openings, for example by allowing some ventilation openings or a portion of ventilation openings to be covered if a smaller area is desired, for example if different opening areas are desired in different inner volumes in a transport unit. This applies to all the embodiments of the invention and to all types of ventilation openings.

The container in FIGS. 10 and 11 does not have recesses in the side walls. Instead, it is provided with a series of openings 120 in the upper portion of the longitudinal side walls 113. A flange 126 projecting away from the inner volume of the container serves as a spacer, so that there is always a ventilation passage along the outside of the longitudinal side walls. This permits a ventilation air flow in a horizontal direction, but also a vertical ventilation flow, because the flanges are provided with openings 119.

The projecting flanges 126 can also be used as handles when handling the containers and allow the container to be inserted into a frame system and used in a transport unit of the prior art if desired.

Figure 12:
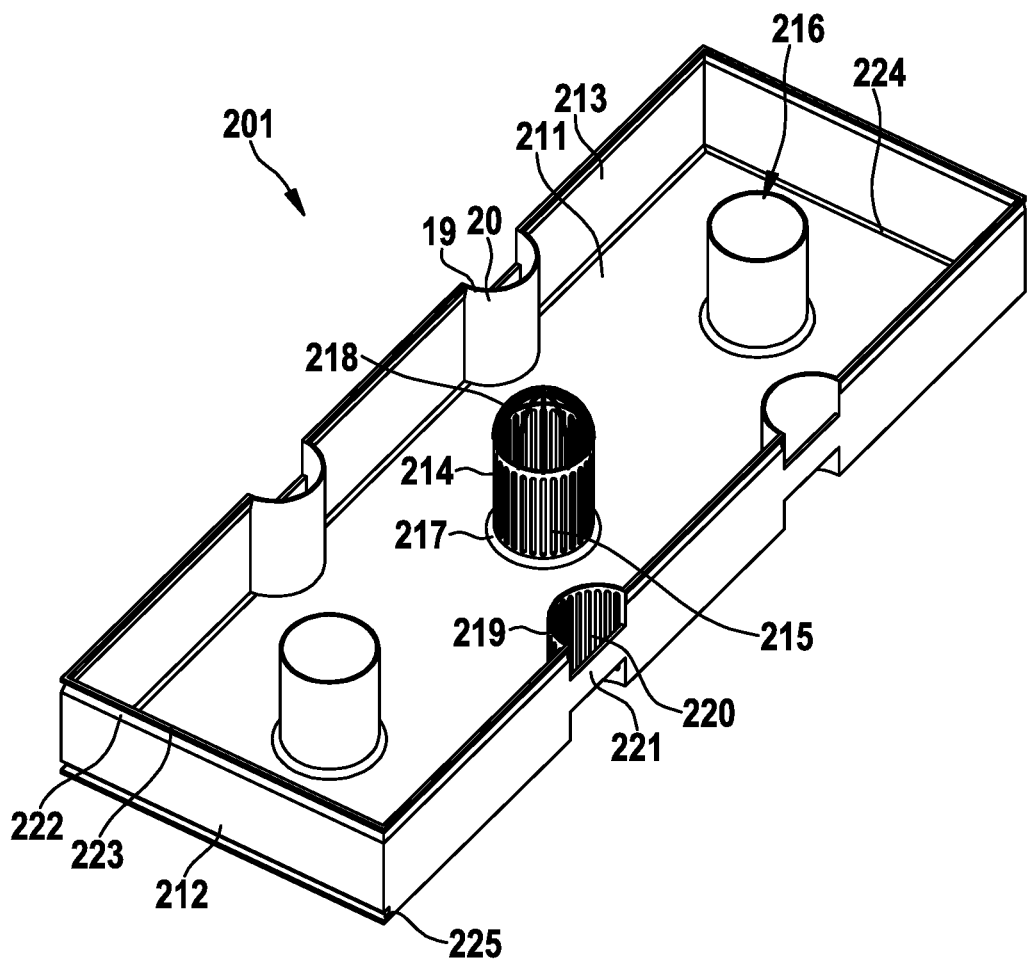
FIG. 12 shows yet another embodiment of a broiler transport container in a perspective view seen from above.
Figure 13:
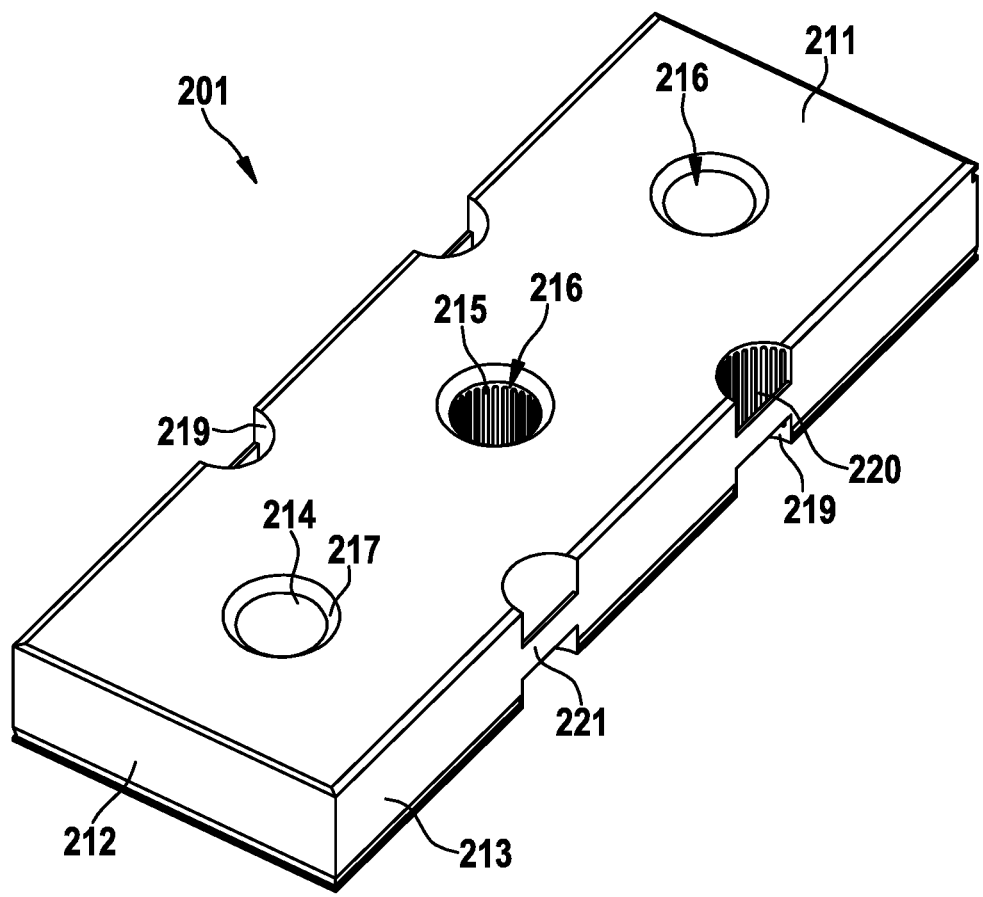
FIG. 13 shows the broiler transport container in FIG. 12 in a perspective view seen from beneath.

FIGS. 12 and 13 show yet a further embodiment of a broiler transport container 201, and reference numerals corresponding to those in FIGS. 1-9 are used here too, but with the addition of 200, and features having such corresponding reference numerals then have the same function unless indicated otherwise. It is noted, however, that the illustrations in FIGS. 12 and 13 are highly schematic and that ventilation openings 215, 220 are provided only at one ventilation column section 214 and one recess 219, although all three column sections 214 and all four recesses 219 have similar ventilation openings 215, 220.

This embodiment differs from that in FIGS. 1-9 in that the ventilation column sections 214 are provided with a dome 218 (shown only on the middle column) instead of the cross 18. The dome 218 not only prevents broilers from entering the ventilation columns 216 but it also protrudes beyond the upper side of the side walls 212, 213, which means that, when containers of this type are stacked, the dome is inserted into the cavity of the ventilation column above, which contributes to the fixing of the two containers in relation to one another and thus to the stability of the stack as a whole.

Figure 14:
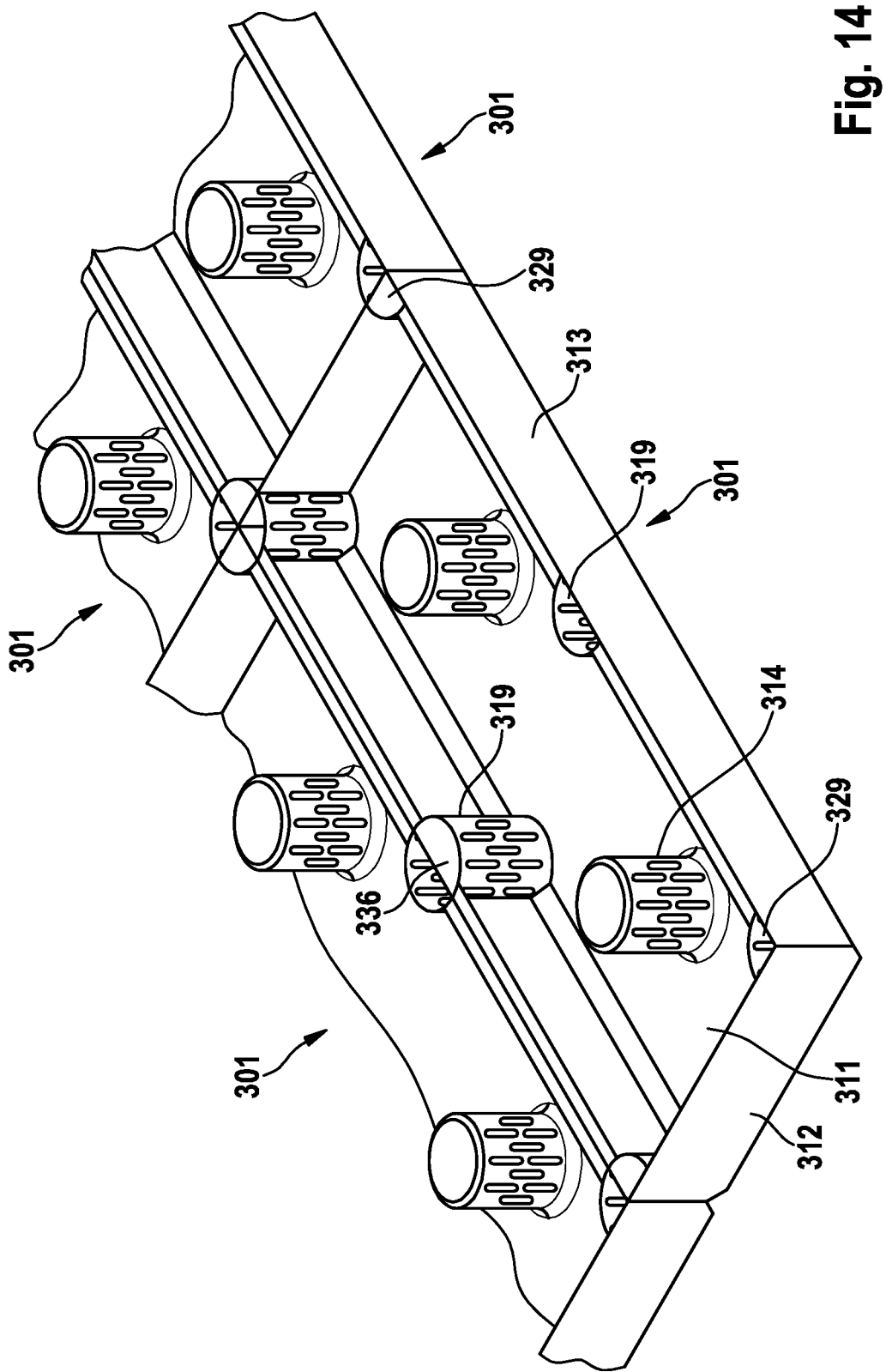
FIG. 14 shows yet another embodiment of a broiler transport container in a partially cutaway perspective view seen from above and arranged close to another broiler transport container of the same type in a pair-wise configuration.

An even more highly schematic representation of a further embodiment of a broiler transport container 301 is shown in FIG. 14, and reference numerals corresponding to those in FIGS. 1-9 are used here too, but with the addition of 300, and features having such corresponding reference numerals then have the same function unless indicated otherwise. This embodiment differs from those of FIGS. 1 to 9 in that the four recesses have been replaced by two semicircular columns 336, so that the outsides of the longitudinal side walls 313 are uninterrupted, and four corner columns 329 have each been replaced by a quadrant-shaped cross-section. When such containers are arranged tightly side by side as illustrated in FIG. 14, the columns 319, 329 are placed side by side and together form a circular column which can be ventilated by a common ventilation device. In this embodiment, when the outsides of the container are uninterrupted, the circular side columns 319, 329 are divided into independent semicircular and quadrant-shaped sub-columns, but if common columns with a uniform air pressure are desired, openings can also be provided in the side walls, either as in FIGS. 1-9 or in the form of smaller openings similar to the ventilation openings illustrated.

Figure 15:
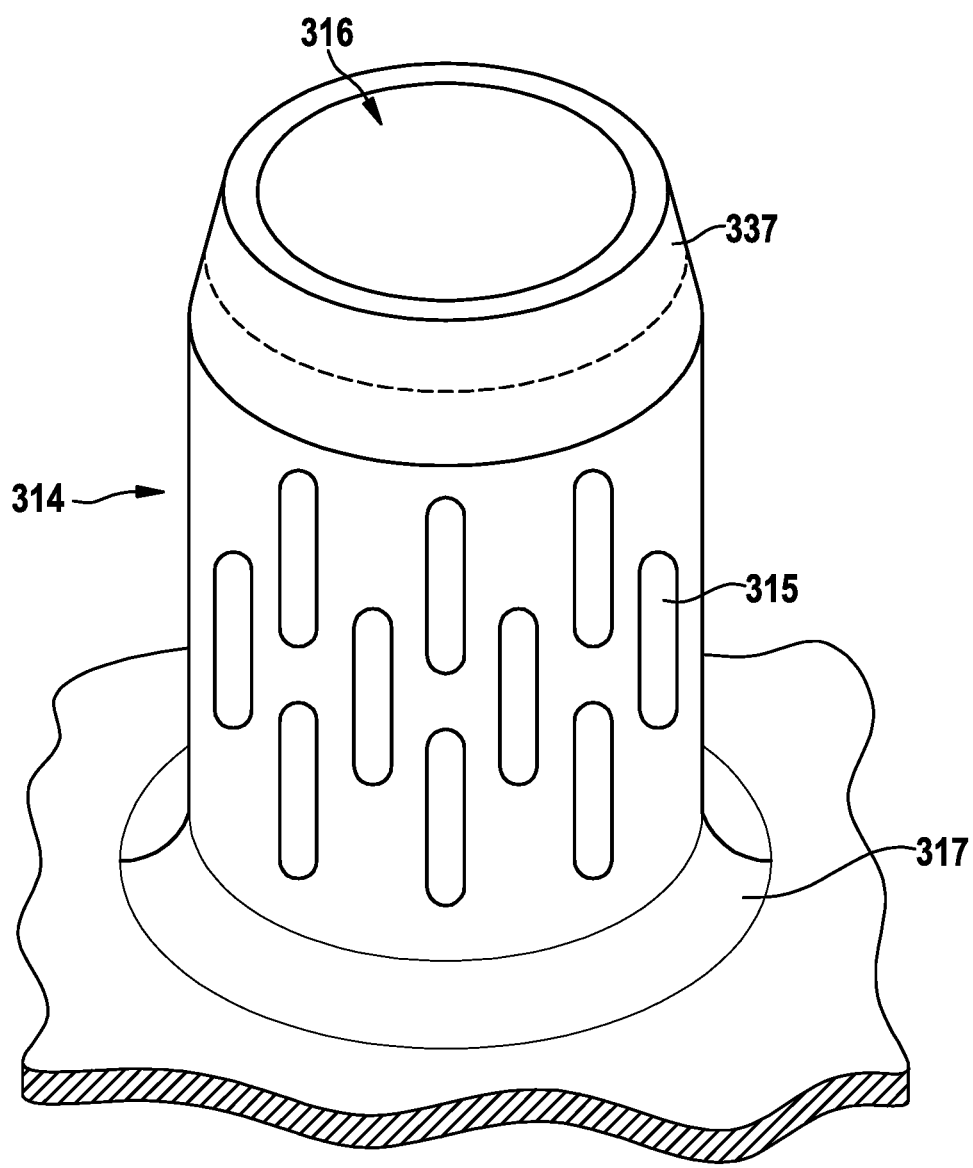
FIG. 15 shows a perspective view of a ventilation column as in FIG. 14.

The embodiment in FIG. 14 further differs in that there are only two ventilation column sections 314, which are each designed substantially as shown in FIG. 15. As can be seen, the ventilation openings 315 in these ventilation column sections are elongate but shorter than those in the embodiments of FIGS. 1-9 and distributed in an even pattern over the ventilation column sections, so that a combination of the advantages described with reference to the preceding embodiments is achieved. Another difference is in the construction of the upper portion 337 of these column sections 314, which has a reduced diameter compared with the remainder of the column. The upper portion 337 can thus be inserted into the cavity at the floor of a corresponding column section of another container, as described with reference to the dome in FIG. 12, and they can even interlock with one another if the column sections are suitably dimensioned.

Figure 16:
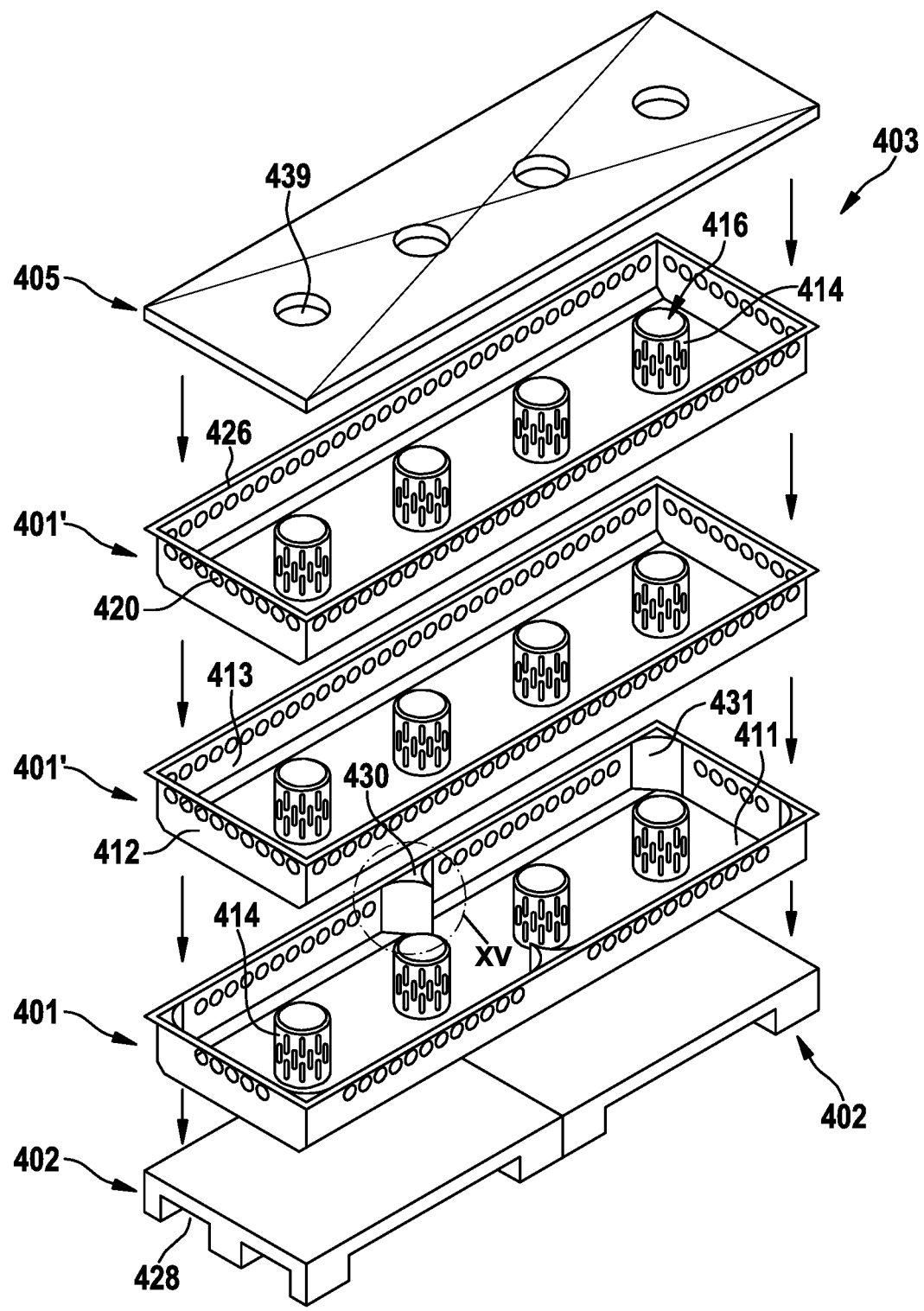
FIG. 16 shows yet another embodiment of a broiler transport container in a partially cutaway perspective view seen from above, wherein three such broiler transport containers are arranged one on top of another, wherein the stack is arranged on two pallets arranged close together, and wherein a covering is provided on the uppermost broiler transport container to form a transport unit.

A further two embodiments of broiler transport containers 401, 401' are shown in FIG. 16, where a container 401 with reinforcements is arranged on two pallets 402 and where two containers 401' of a relatively lightweight construction are arranged thereon and covered with a lid 405 in order to form a transport unit 403. Here too, reference numerals corresponding to those of FIGS. 1-9 are used, with the addition of 400, and features having such reference numerals then have the same function unless indicated otherwise.

Both these embodiments of the container are provided with ventilation column sections 414 similar to those in FIG. 15 and with ventilation openings 420 along the upper edges of the side walls 412, 413. These features have the same functions as described above with reference to other embodiments and will therefore not be described in greater detail here.

The use of two pallets 402 arranged side by side allows smaller pallets to be used and thus potentially permits the use of standard pallets and/or the same pallets for smaller and larger versions of the broiler transport container. In this embodiment, the openings 428 in the pallets for engagement with the arms of a forklift truck (not shown) are open at the bottom, which reduces the risk of their trapping dirt and makes them easier to clean than the pallet in FIG. 9. Although not shown, these pallets can also have ventilation openings 27 corresponding to those shown in FIGS. 8 and 9.

Figure 17:
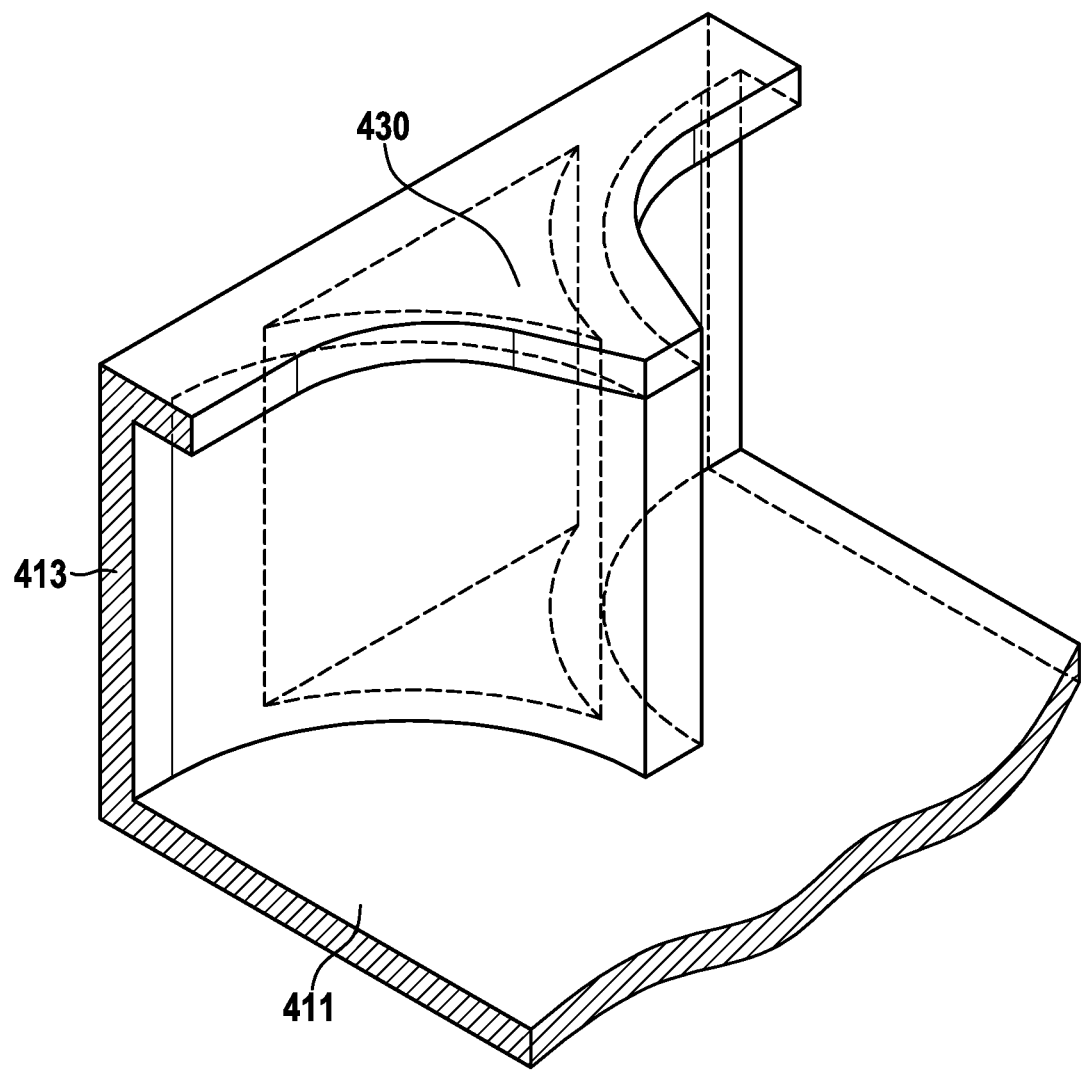
FIG. 17 shows a perspective view of the detail marked XV in FIG. 16.

The lowermost broiler transport container 401 differs from those described previously in that it has reinforcing sections 430, 431 at the corners and in the middle of the longitudinal side walls 413. In this embodiment, the reinforcing sections, which can be solid or hollow as indicated by the broken lines in FIG. 17, are provided with rounded surfaces facing the inner volume of the container in order to facilitate cleaning and prevent injury to the broilers as described above with reference to the columns, but other shapes can also be used. The reinforcing sections can also serve as a support for the container 401' arranged on top of the reinforced container 401.

Although the reinforcement is shown here only on the lowermost container 401 in the transport unit 403, it will be appreciated that such containers can be used higher in the stack, in particular if the stack contains more than three containers and/or if they are heavily loaded. Tests have shown that the second lowest container in a stack is frequently the one that is exposed to the greatest stresses because it carries the weight of all the loaded containers above it and does not have the surface support offered by the pallet(s) but rests only on the lowermost container.

As mentioned above, FIG. 8 shows a cross-section through the transport unit 3 along line VI-VI in FIG. 6. As can be seen, the columns 14 of the five broiler transport containers 1, 1' are positioned as a continuation of one another when the containers 1, 1' are stacked, so that they form a continuous hollow-cylindrical column 16 through the unit. These columns 16 allow the load of the broiler transport container 1, 1' at the top of the stack to be transmitted via the columns 14 in the transport containers 1, 1' beneath it to the pallet 2 in the middle of the transport unit 1, 1', so that the loads on the side walls and the distances between supports that are bridged by the floors 11 are reduced. This in turn has the result that the floors 11 and outer side walls 12, 13 can be made relatively thin and without reinforcing ribs, as a result of which the material consumption and weight of the container 1 are reduced and at the same time cleaning is facilitated.

When broiler transport containers 1 as shown in FIGS. 3-8 are arranged in a stack as shown in FIGS. 6 and 8, the bevelled portion 17 allows the upper edge of the column 14 of a lower broiler transport container 1 to project slightly into the corresponding column 14 of an upper broiler transport container 1, as is shown in detail in FIG. 8B. Each column 14 has an upper and a lower end, it being provided with an upper corresponding region at the upper end and with a lower corresponding region at the lower end. In other words, the upper end of the column 14 of a first container 1 is so designed that it can be stacked to form a positive and/or non-positive locking engagement with the lower end of a column 14 of a second container 1, and vice versa. The broiler transport containers 1 are here shown in the empty state, but when they are full, the floor 11 is deflected slightly so that the two columns 14 come into contact with one another and thus form a load-bearing column as described above. Many other embodiments permitting engagement between the columns 14 are possible, one of which will be described below. In the detailed construction, care should be taken to ensure that the broiler transport containers 1 can easily be placed one on top of another, separated and cleaned.

The recesses 19 in the side walls are situated one above another in the same manner as the columns 14, as can also be seen in FIG. 6, so that semicircular continuous hollow columns are formed at the longitudinal side walls 13. These columns 19 themselves have a load-bearing capacity and also contribute to the stability of portions of the side walls between the columns 14 in order thus to increase further the strength and stability of the (transport) unit.

These advantages can in principle also be achieved with solid columns 14, but hollow columns 14 have an excellent load-bearing capacity with very little material consumption and therefore not only offer strength and stability for the broiler transport container 1 and the (transport) unit, but also allow the weight of the empty (transport) unit (the tare weight) to be kept low. A comparison with broiler transport units 1 of the prior art is shown in Tables 1 and 2 below.

Systems ID1 and ID2, marketed by the applicant Linco Food Systems, and ID3, marketed by Anglia Outflow Ltd., Diss, Norfolk, in England, of the prior art represent a type of transport unit in which loose crates or drawers are held in a frame, while systems ID4-ID7, marketed by Meyn Food Processing Technology B.V., Amsterdam, Netherlands, represent a different type without such drawers. The use of loose drawers allows the system to be taken apart, which is advantageous with regard to cleaning of the transport unit, and further permits de-stacking before the broilers are stunned, but the weight of such systems is relatively high. As is apparent from Table 2, the ratio between the basic unit weight, that is to say the total weight of the empty transport unit, and the total available area of the floors in the unit for such systems is from 60 to 100 kg/m², while that ratio for the systems without loose drawers is approximately 30 kg/m². Because broiler transport units are typically loaded to the maximum permitted weight for the truck or trailer, a high tare weight of the transport unit leaves less capacity for transporting the broilers.

In a (transport) unit 3 as shown in FIGS. 3-8, the ratio between the basic unit weight and the total available area for the broilers is very low, as illustrated in Examples 1 and 2 (ID8 and ID9), in which the ratio is 16-17 kg/m².

Although some embodiments of the invention may have a slightly higher ratio between the basic unit weight and the total available area, the present invention offers a considerable advantage over the prior art.

TABLE 1

| Brand ID | Container footprint L (m) | W (m) | Area A (m²) | Overall size L × W × H (m) | Column area $A_C$ (m²) |
| --- | --- | --- | --- | --- | --- |
| 1 Linco Maxiload | 1.2 | 1.27 | 1.52 | 2.5 × 1.29 × 1.19 | |
| 2 Linco Maxiload | 1.2 | 1.27 | 1.52 | 2.5 × 1.29 × 1.46 | |
| 3 Anglia Autoflow | 1.16 | 0.76 | 0.88 | 2.44 × 1.17 × 1.3 | |
| 4 Meyn EVO | 2.4 | 1.2 | 2.88 | 2.40 × 1.2 × 1.23 | |
| 5 Meyn EVO | 2.4 | 1.2 | 2.88 | 2.40 × 1.2 × 1.48 | |
| 6 Meyn Laco | 2.4 | 1.2 | 2.88 | 2.40 × 1.2 × 1.23 | |
| 7 Meyn Laco | 2.4 | 1.2 | 2.88 | 2.40 × 1.2 × 1.48 | |
| 8 Example 1 | 0.8 | 2.4 | 1.76 | 2.40 × 0.8 × 1.16 | 5 × π × 0.10² |
| 9 Example 2 | 0.8 | 2.4 | 1.76 | 2.40 × 0.8 × 1.41 | 5 × π × 0.10² |

TABLE 2

| Brand ID | Frame weight kg | Basic unit weight (empty) kg | Number of tiers | Total available area m² | Basic unit weight/total available area kg/m² | Total weight loaded kg | Live weight total kg |
| --- | --- | --- | --- | --- | --- | --- | --- |
| 1 Linco Maxiload | 224 | 400 | 4 | 6.08 | 65.8 | | |
| 2 Linco Maxiload | 270 | 490 | 5 | 7.60 | 64.5 | 1340 | 850 |
| 3 Anglia Autoflow | | 350 | 4 | 3.52 | 99.3 | 950 | 600 |
| 4 Meyn EVO | | 340 | 4 | 11.52 | 29.5 | 1000 | 660 |
| 5 Meyn EVO | | 395 | 5 | 14.4 | 27.4 | 1220 | 825 |
| 6 Meyn Laco | | 360 | 4 | 11.52 | 31.3 | 1015 | 655 |
| 7 Meyn Laco | | 415 | 5 | 14.4 | 28.9 | 1234 | 819 |
| 8 Example 1 | 40 | 120 | 4 | 7.05 | 17.0 | 600 | 480 |
| 9 Example 2 | 40 | 140 | 5 | 8.81 | 15.9 | 740 | 600 |

Arranging the (transport) units 3 close to one another so that they support one another from the sides further contributes to the stability of the broiler transport containers 1 during transport. In order to facilitate such an arrangement close together, the side walls have an upper end and a lower end and are provided with upper corresponding regions at the upper end and with lower corresponding regions at the lower end. In particular, the upper edges of the side walls 12, 13 of the broiler transport container in FIGS. 3-8 have a bevelled portion 22 which projects inwards slightly towards the inner volume of the container, and a flange 23 which projects outwards away from the inner volume. The flange is designed for engagement with a bevelled edge portion 24 of the floor 11 when containers 1, 1' are stacked one on top of another as shown in FIG. 6, so that the upper container 1' is able to rest on the lower container 1 without a portion thereof protruding beyond the planes of outer sides of the side walls 12, 13 and substantially without limiting the opening of the inner volume as shown in FIG. 7, which is a cross-sectional view of the detail marked V-V in FIG. 6.

The pallet 2, as shown in FIG. 9, used at the bottom of the transport unit in FIGS. 6 and 8 is to provide stable support for the stack of broiler transport containers 1 and is provided with horizontal openings 28 which are designed for engagement with the arms of a forklift truck (not shown) which is used for handling the (transport) unit 3. In this embodiment, the pallet 2 is provided with a row of openings 27 in the same positions as the columns 14 in the broiler transport containers 1, likewise as shown in FIG. 9, but this need not be the case.

Another embodiment of a broiler transport container 101 is shown in FIGS. 10 and 11. Reference numerals corresponding to those in FIGS. 3-9 are used, but with the addition of 100, and features having such reference numerals then have the same function unless indicated otherwise.

This broiler transport container 101 has three support columns 114 which are so arranged that they project from the floor 111, but the container 101 is of a simpler construction, and the openings 115 are provided only at the upper edges of the columns 114. The shape, size and position of the openings can vary greatly without having a substantial negative effect on the strength and/or stiffness of the columns 114. With the construction in FIGS. 10 and 11, the risk of broilers becoming stuck is very low.

As described above, the columns 414 form a vertical column when they are arranged one on top of another, and the lid 405 is here provided with an opening 439 as a continuation of the column. This opening can be used to position the lid, and it will be appreciated that similar openings are provided above the other columns 414.

Figure 26:
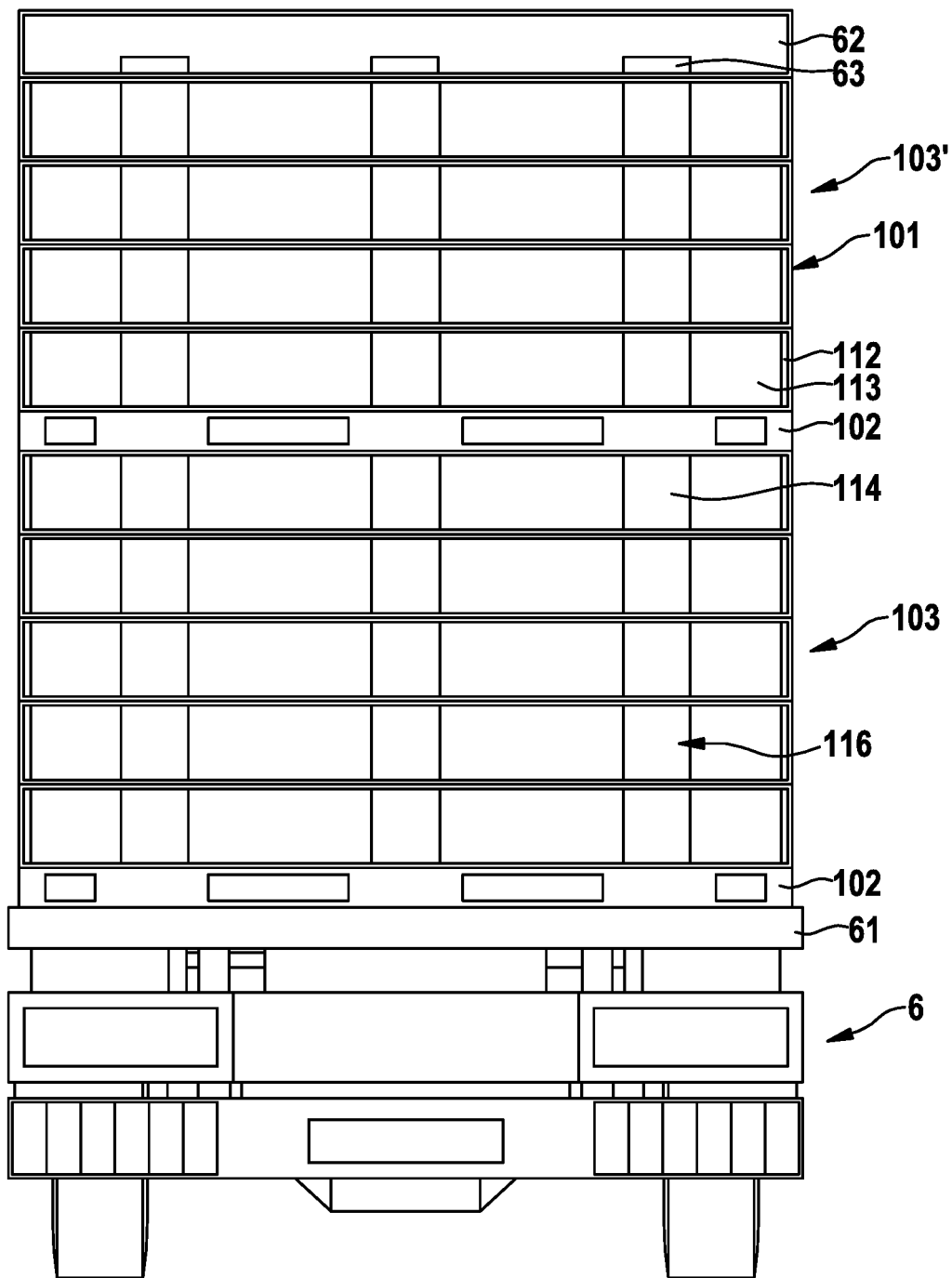
FIG. 26 shows transport units composed of broiler transport containers as illustrated in FIGS. 10 and 11 arranged on a truck trailer.

The rear end of a truck or trailer 6 loaded with transport units 103, 103' composed of the type of broiler transport units 101 shown in FIGS. 10 and 11 can be seen in FIG. 26. Two tiers of such transport units are arranged one on top of another on the floor 61. The transport units 103 in the lower tier each comprise five broiler transport containers, while the transport units 103' in the upper tier each comprise four containers. The longitudinal side walls 113, which face the rear side of the trailer, are not shown in order to reveal the inner volumes of the broiler transport containers. Here too, the columns 114 form vertical common columns 116.

Each transport unit 103, 103' has a width which corresponds to the width of the floor 61 of the truck trailer, so that only one row of transport units needs to be loaded, but it will be appreciated that it is also possible to use broiler transport containers of a smaller size, which are then arranged in two or more rows extending in the longitudinal direction of the floor.

The roof 62 of the truck trailer is provided with engagement means 63 which are each in engagement with one of the columns 116 during transport. In order to achieve this engagement, the roof can be raised and lowered by hydraulic actuators, as is known from current broiler transport trucks and trailers, in order that the transport units can be fixed in position.

Figure 20:
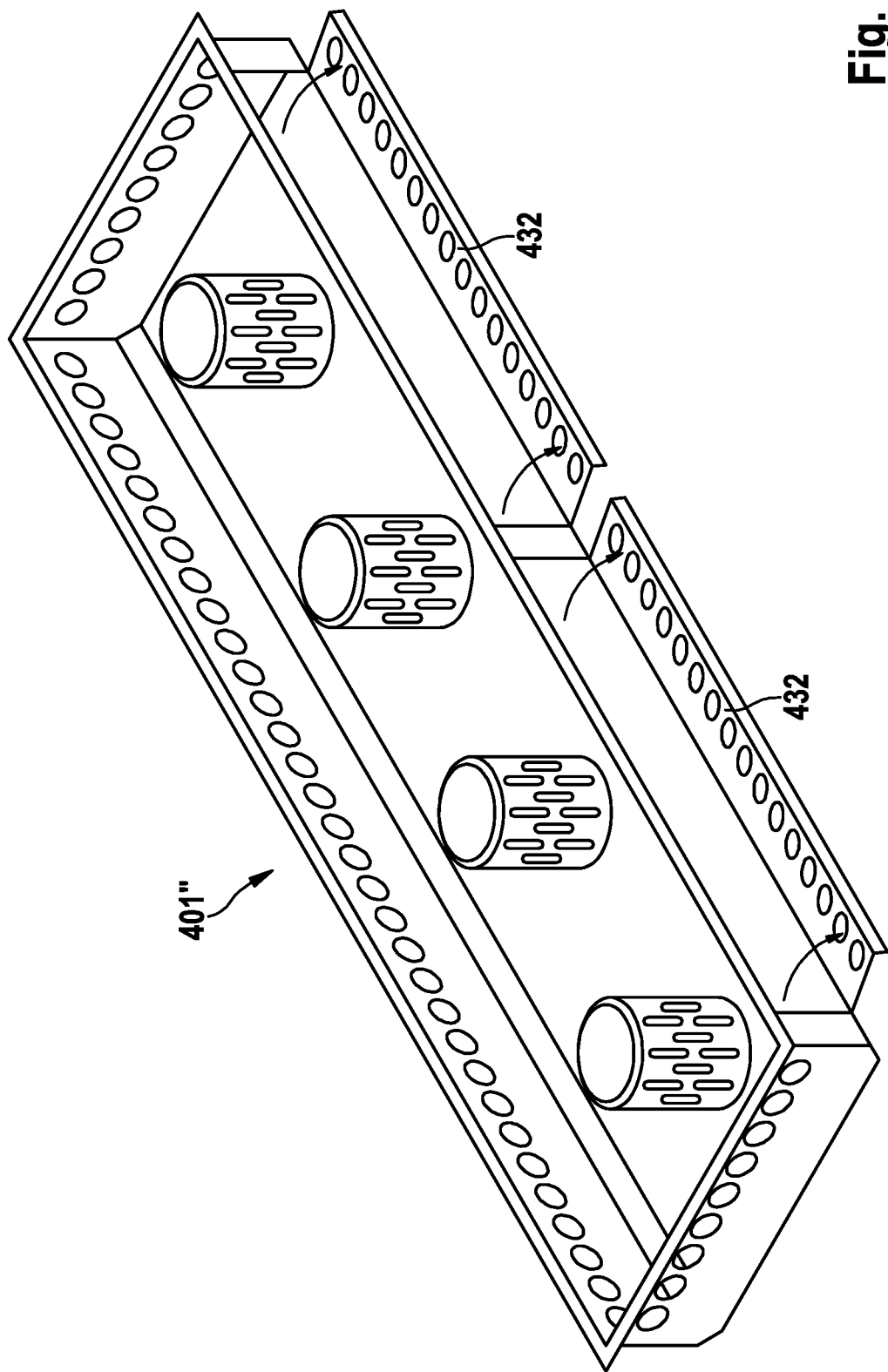
FIG. 20 shows yet another embodiment of a broiler transport container having side doors.

After arriving at the slaughterhouse, the broilers are usually stunned, and this frequently happens while they are still in the broiler transport container. After the stunning, the broiler transport units must be emptied very quickly in order to prevent the hearts of the broilers from stopping beating before they are slaughtered. In order to facilitate emptying, the broiler transport container 401" can be provided with flaps or doors 432 as shown in FIG. 20. The number of flaps or doors can vary.

All the embodiments described above are based on the use of large broiler transport containers with three or more columns, but it is also within the scope of the invention to use containers with fewer columns.

An example of a broiler transport container system with only one column 14 and one recess 19 is illustrated in FIGS. 1 and 2. When such broiler transport containers are arranged one on top of another in stacks as shown in FIG. 2, the column 14 forms a common column 16 which extends vertically through all the units, likewise as shown and described with reference to FIGS. 8 and 8B.

Figure 25A:
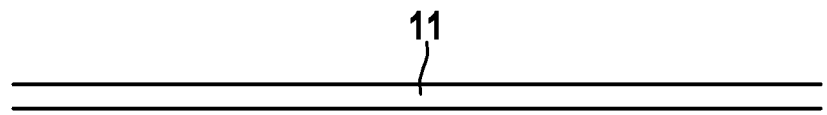
FIGS. 25A-D show four different cross-sectional forms of floors of broiler transport containers.
Figure 25B:
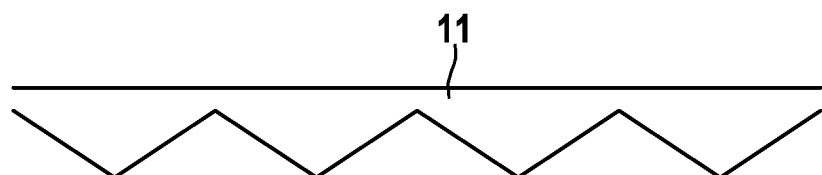
Figure 25C:
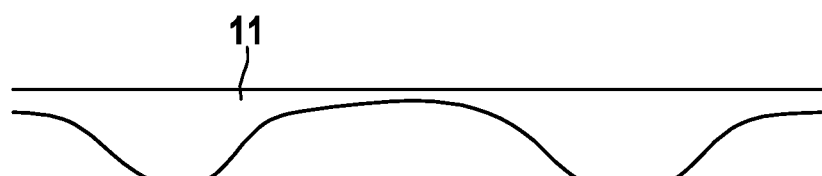
Figure 25D:
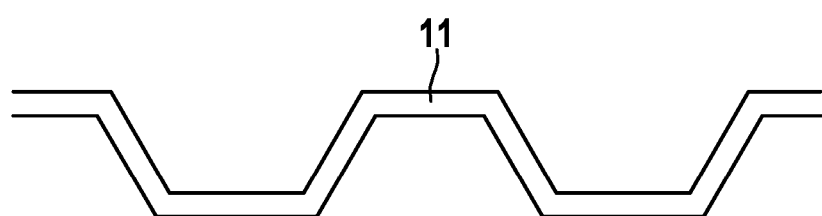

All the broiler transport containers have been represented and described above with a planar floor as shown in cross-section of FIG. 25A, but other forms with triangular (as shown in FIG. 25B) or rounded thickened portions as shown in FIG. 25C or using a trapezoidal metal sheet as shown in FIG. 25D are also possible. A common feature of all these embodiments is that they are composed of planar, sheet-like sections, so that the outer faces are easy to clean. Similar considerations apply to the outer side walls.

As described above, the column sections 414 form a vertical ventilation column when they are arranged one on top of another, and the lid 405 is here provided with an opening 439 as a continuation of the ventilation column. This opening can be used to guide air into or out of the column. The opening can be provided or brought into contact with valves, bellows or similar devices (not shown) for connection to a ventilation device or a ventilation system on the transport trailer. It will be appreciated that similar openings are provided above the other column sections 414.

Figure 18:
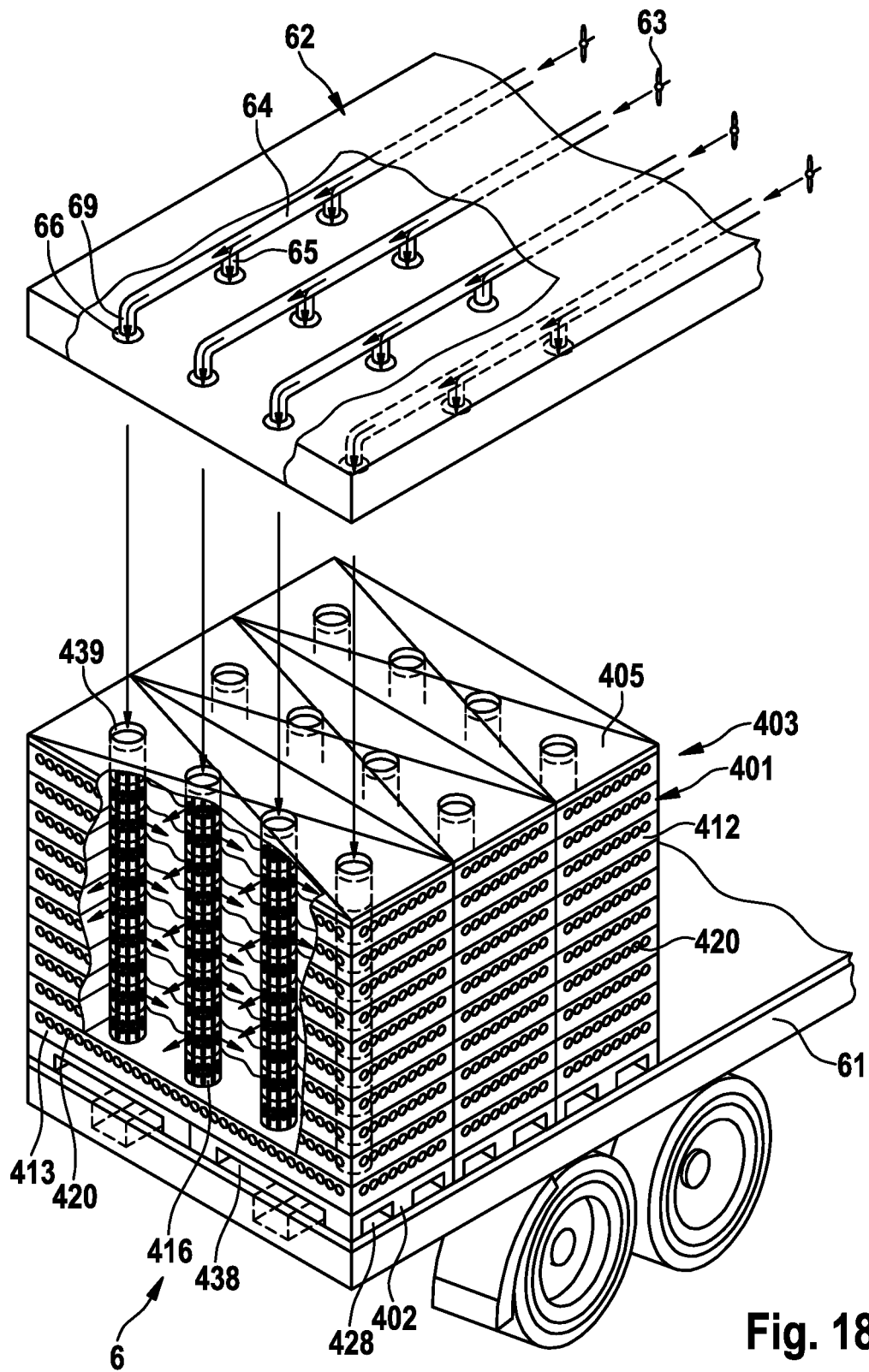
FIG. 18 shows three transport units which are constructed as illustrated in FIG. 16, wherein each unit comprises ten broiler transport containers which are arranged on a truck trailer having a vertically adjustable roof with a ventilation arrangement.

The rear end of a truck or trailer 6 which is loaded with transport units of the type shown in FIG. 16 but with ten containers in each stack is shown in FIG. 18. For the sake of simplicity, the reference numerals used in FIG. 16 are likewise used here, although the number of containers in the stacks is different and the reinforcing sections 430 have been omitted.

Each transport unit 403 has a width which corresponds to the width of the floor 61 of the truck or trailer, so that only one row of transport units needs to be loaded, but it will be appreciated that broiler transport containers of a smaller size can also be used and arranged in two or more rows extending in the length direction of the floor.

The roof 62 of the truck or trailer is provided with a ventilation arrangement having four ventilators 63, each of which generates an overpressure at a ventilation pipe 64 which extends over the length of the truck or trailer 6. Each ventilation pipe 64 branches off into a row of outlets 65, each of which is provided directly above one of the ventilation columns 416 in the transport units 403. When the roof is lowered, the outlets come into engagement with the openings 439 in the lids, so that air is able to flow from the ventilation pipes 64 into the ventilation columns 416 and from there into the inner volumes of the broiler transport containers, as indicated by the arrows. In this manner, each transport unit or each stack of units is supplied with forced ventilation. Part of the transport unit 403 situated at the outermost end of the truck or trailer has been cut away in order to allow the ventilation columns 416 therein and the air flow to be seen.

The ends of the ventilation pipes 64 were here provided with flanges 66 in order to permit a tight fit on the lids 405.

Air is able to flow out of the broiler transport containers via the ventilation openings 420 in the side walls 412, 413, and it is also possible that the ventilation columns 416 formed by the ventilation column sections 414 continue through the pallets 402 so that air is able to escape via pallet openings 428, 438. Ventilation openings are here shown in all four sides of the containers, but it may be expedient to have them only in the longitudinal side walls. The truck or trailer floor can likewise be provided with ventilation openings (not shown).

Figure 19:
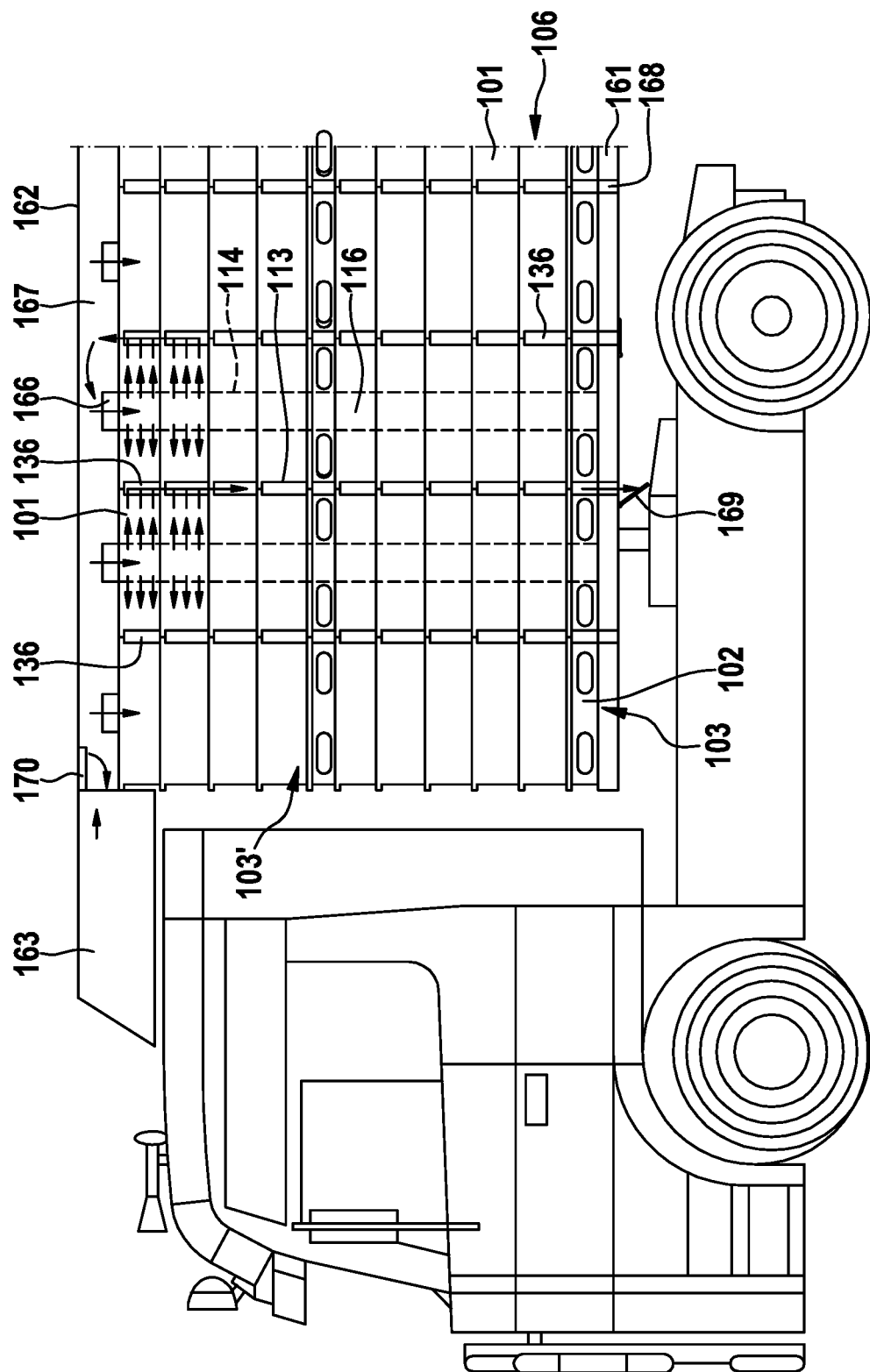
FIG. 19 shows the ventilation on a truck loaded with transport units containing four and five broiler transport containers of the type shown in FIGS. 10 and 11.

FIG. 19 shows a further method for ventilating transport units when they are arranged on a truck or trailer 106. The transport units 103, 103' are here composed of the type of broiler transport containers 101 shown in FIGS. 10 and 11, and two tiers of such transport units are arranged one on top of another on the floor 161. The transport units 103 in the lowermost tier each contain five broiler transport containers, while the transport units 103' in the uppermost tier each contain four containers. On the transport units in the second and third row from the driver's cabin, the transverse side walls of the broiler transport containers have been removed in order to show the inner volumes and ventilation columns 116. Openings in the lids and pallets allow common ventilation columns which extend from the roof 162 right to the floor 161 to be formed.

In this embodiment, the roof 162 has an inner volume 167 in which an overpressure or a low pressure can be generated by means of a ventilation device 163 arranged above the driver's cabin. When an overpressure is generated in the inner volume 167, air is preferably forced into the ventilation columns, as indicated by the arrows, and from there into the inner volumes of the broiler transport containers 101 and out of the ventilation openings (not visible) in the side walls 113 into a ventilation passage 136 between the transport units. When openings 168 in the floor 161 of the trailer are left open, a constant circulation through the transport units can be obtained. This circulation can be assisted by the low pressure which usually occurs on the underside of a moving truck. Ambient air can be supplied directly to the inner volumes, or the air can be conditioned in the ventilation system with regard to temperature and/or humidity and/or chemical composition.

An overpressure in the inner volume 167 in the roof 162 can also be achieved or assisted by leaving open a damper or a controllable flap 170 in the front side of the roof so that air is forced into the inner volume as the truck travels forwards.

In very cold weather, the transport units may have to be heated. This can be achieved by closing at least some of the openings 168 in the floor 161 by dampers 169 and potentially also closing the inlet from the ventilation device 163 by a damper 170 and recirculating the air as indicated by the arrows in the third row of transport units. In this manner, the body heat of the broilers is used to gradually heat the air, but a certain amount of fresh air is typically added in order to ensure a sufficient oxygen content and regulate the carbon dioxide content. Recirculation requires an additional ventilation device which can be, for example, in the form of local fans 166 arranged at the top of each ventilation column 116. Such local fans can also be used on their own to induce air flow into the ventilation columns.

Regulation of the ventilation can also take place in response to the measurement, for example, of temperature and humidity in ventilation air coming out of the ventilation openings, and sensors for measuring those parameters can be provided, for example, in the ventilation passages 136 or on the pallets 102.

It is also possible to mix additives such as anaesthetics with the air in order to keep the broilers calm during transport. In one embodiment, this is achieved by, for example, loading $CO_2$ tanks onto the truck or trailer and passing this gas into the transport units via the ventilation columns, but it is also possible to collect exhaust gases from the truck engine, to clean the exhaust gases sufficiently by passing them through filters and adsorption devices which remove volatile organic compounds NOx, SOx, and possibly through an active charcoal filter, and then to add the purified gases to the air supplied to the transport units via the ventilation system. It is also possible to stun the birds while they are still on the truck, but this requires very rapid unloading of the transport units so that the broilers are slaughtered in due time.

After the broilers have been stunned, the transport units must be emptied very quickly in order to prevent the hearts of the broilers from stopping beating before they are slaughtered. In order to facilitate emptying of the broiler transport containers 401", they can be provided with flaps or doors 432 as shown in FIG. 20. The number of flaps or doors can vary.

All the embodiments described above are based on the use of broiler transport containers having ventilation columns which extend from the floor, but it is also within the scope of the invention to use horizontal ventilation columns.

Figure 21:
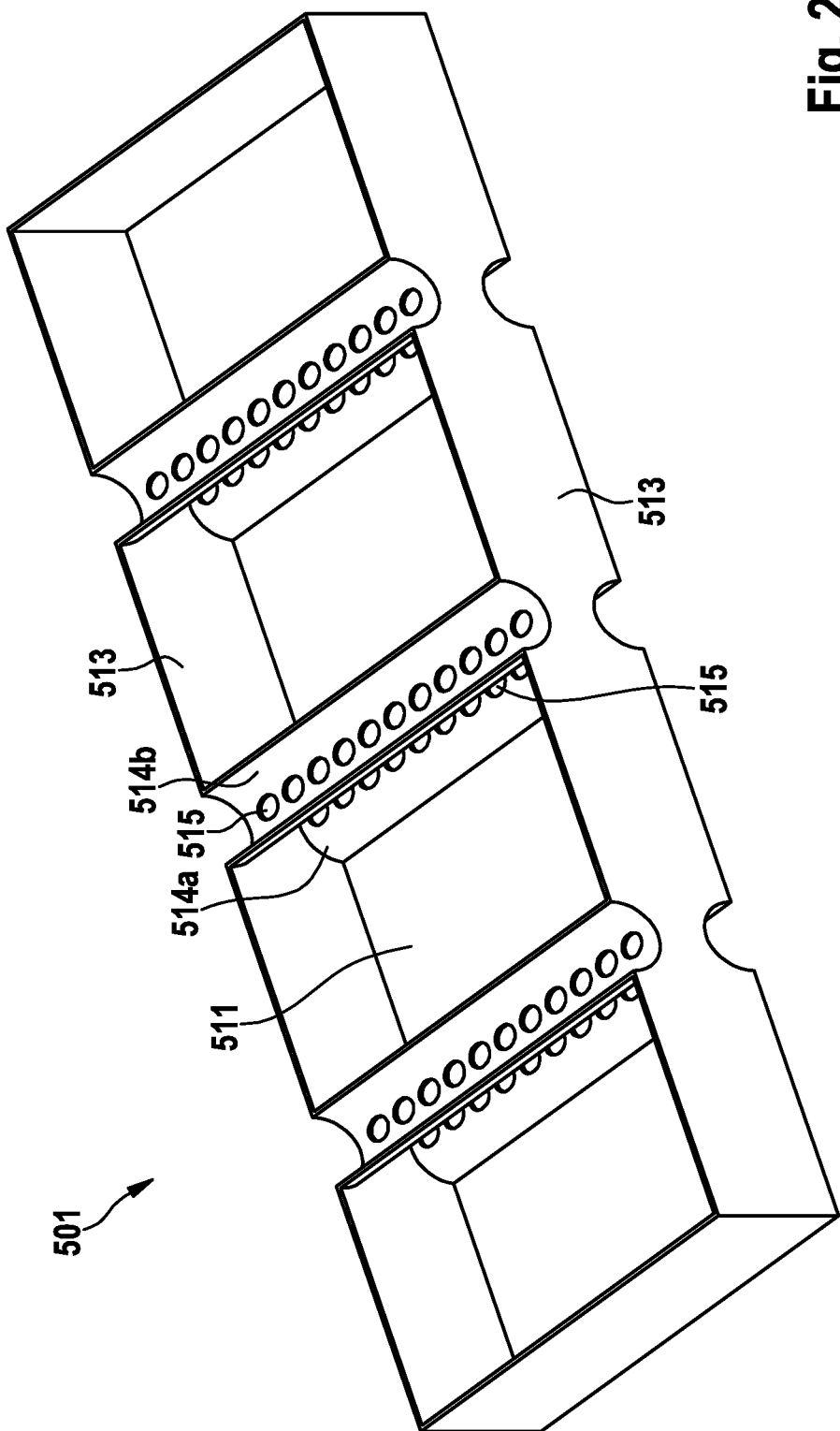
FIG. 21 shows yet a further embodiment of a broiler transport container in a perspective view seen from above.
Figure 22:
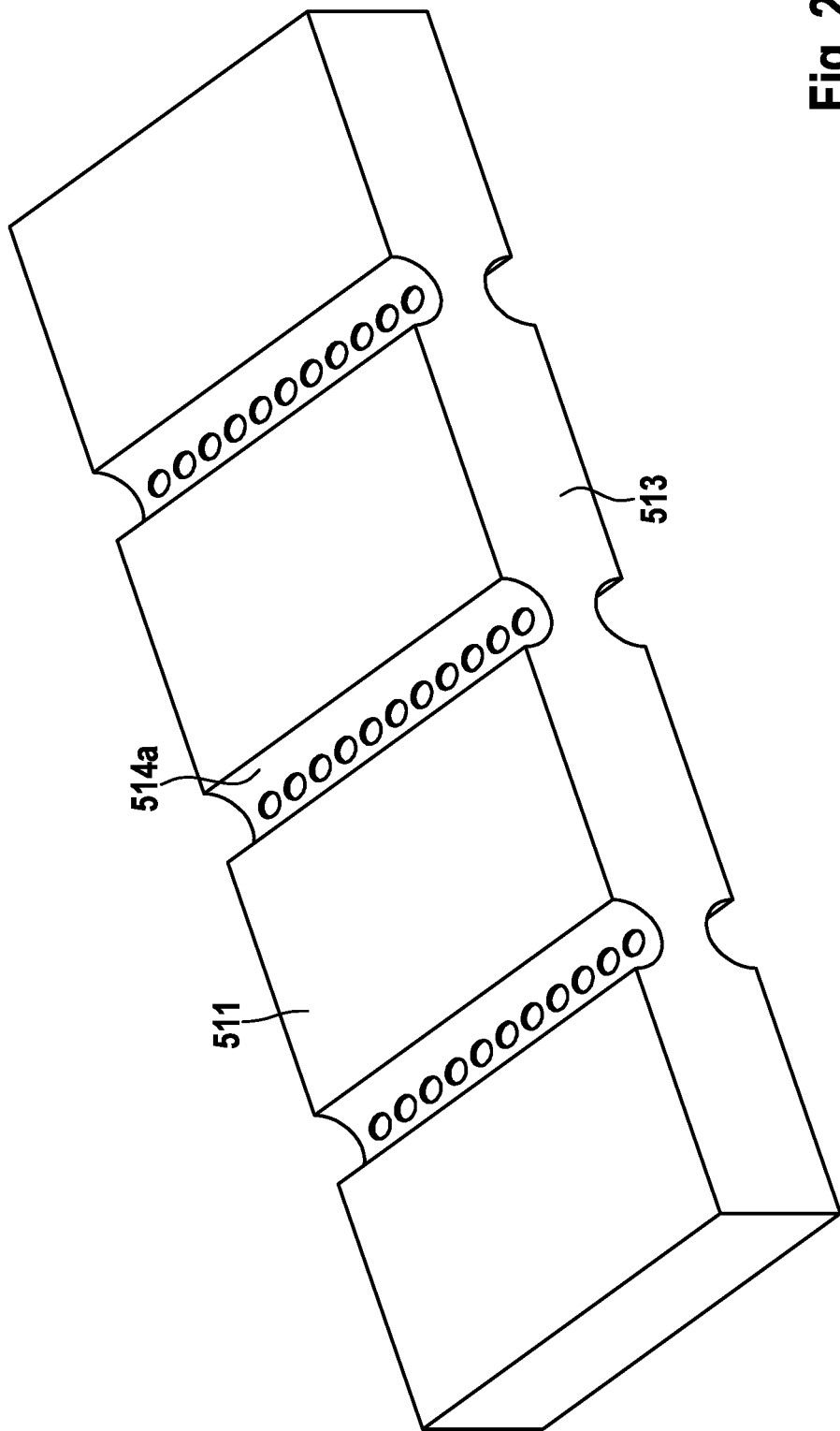
FIG. 22 shows a broiler transport container in FIG. 21 in a perspective view seen from beneath.
Figure 23:
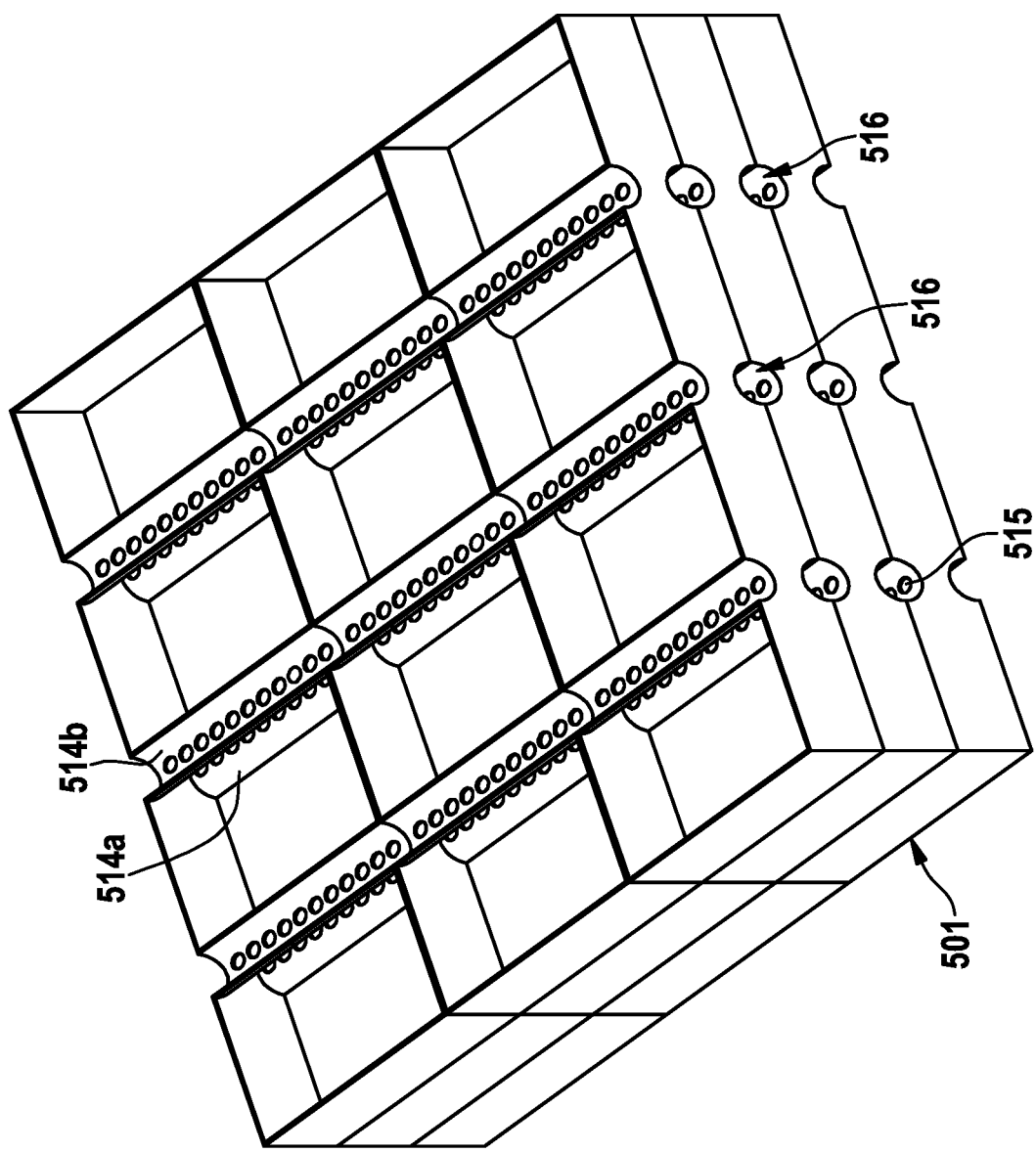
FIG. 23 shows a group of broiler transport containers as in FIGS. 21 and 22 in a perspective view seen from above.

An example of a broiler transport container system having horizontal ventilation columns is shown in FIGS. 21-23. Each broiler transport container 501 here comprises two types of column sections 514a, 514b which extend into the inner volume and each have a row of ventilation openings 515. One column section 514a is provided as a curved portion of the floor 511, while the other 514b extends from one outer longitudinal side wall 513 to the other. Ventilation openings are here provided over the entire length of the column sections, but it would also be possible to have openings only in a middle portion of one or both column sections and/or openings having a more elongate shape.

When such broiler transport containers are stacked one on top of another and such stacks are arranged side by side as shown in FIG. 23, the column sections 514a, 514b of adjacent containers for common ventilation columns 516 extend horizontally through all the units. If an overpressure is applied to every second ventilation column 516 in the vertical direction, air enters through the ventilation openings 515 in one column of each container and emerges via openings in the other column. In this manner, even containers without ventilation openings in the floor or the side walls can be ventilated, but it is of course also possible to provide such openings in those containers.

Figure 24:
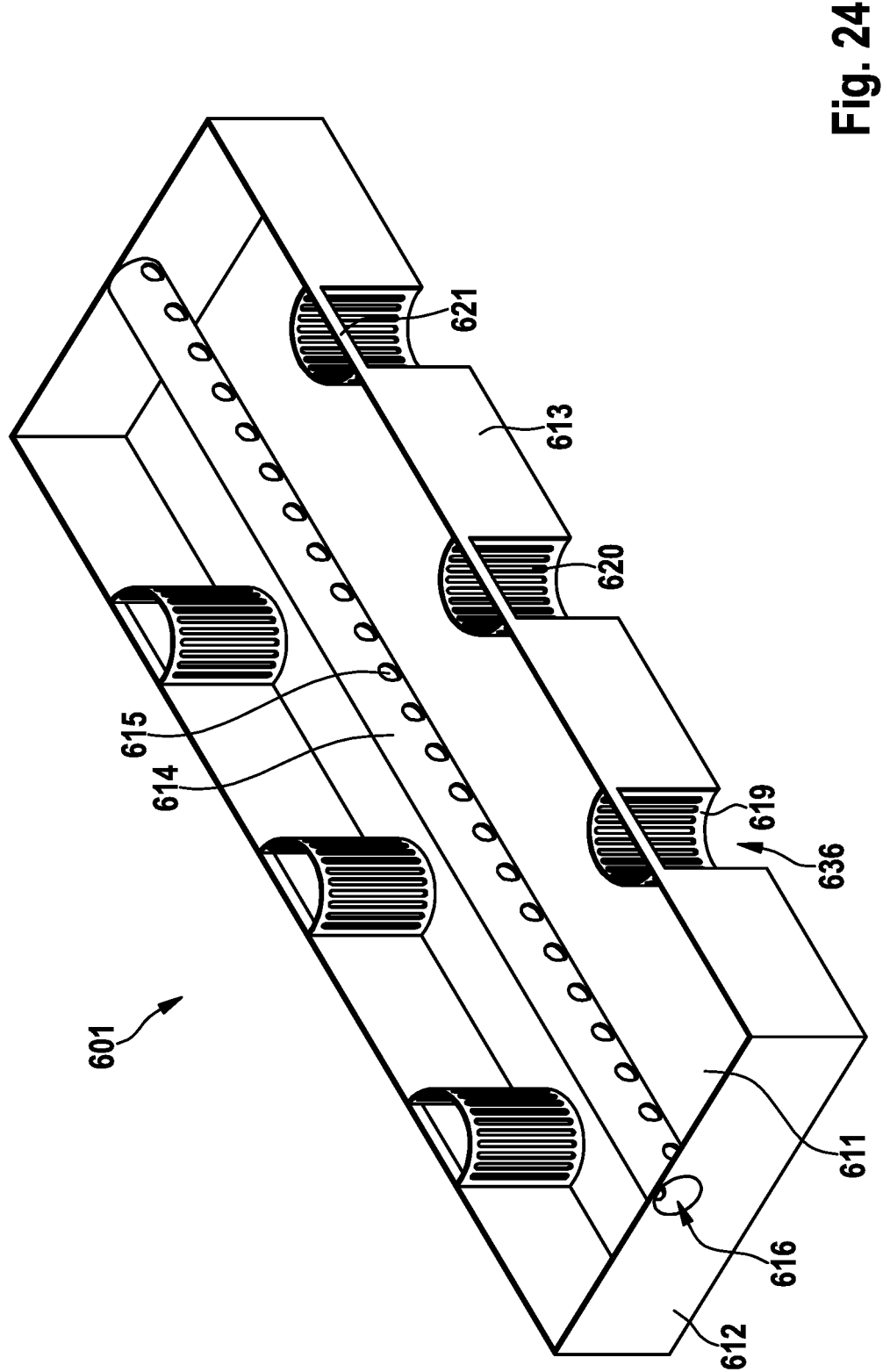
FIG. 24 shows yet a further embodiment of a broiler transport container in a perspective view seen from above.

FIG. 24 shows a further embodiment of a broiler transport container 601 in which features from the embodiments in FIGS. 1-9 and FIGS. 21-22 are combined. As can be seen, this container includes a column section 614 which extends from one outer end side wall 612 to the other and has ventilation openings 615. Here too, the size, shape and distribution can be different, but when containers are arranged end to end, the column sections form a common ventilation column 616 which extends through them. Recesses 619 with openings 620 as described with reference to FIGS. 1-9 contribute to the ventilation and form vertical ventilation columns when containers are stacked one on top of another and side by side. Accordingly, this embodiment of a broiler transport container allows horizontal and vertical ventilation columns to be combined.

All the broiler transport containers have been represented and described above with a planar floor 11 as shown in cross-section in the upper part of FIG. 25, but other forms with triangular or rounded thickened portions as shown in the middle of FIG. 25 or using a trapezoidal metal sheet as shown in the lower part of FIG. 25 are also possible. A common feature of all these embodiments is that they are composed of planar, sheet-like sections, so that the outer surfaces are easy to clean. Similar considerations apply to the outer side walls.

Ventilation devices such as fans or compressors can be provided on an individual stack of broiler transport containers, such as, for example, by placing a ventilation device on top of the stack at an end opening of a common ventilation column which is composed of the ventilation columns in the individual broiler transport containers located one above another in the stack, or at the bottom of such a stack, or by integrating a ventilation device into a pallet support. In such embodiments, the ventilation devices can follow the broiler transport unit stack and can ventilate it even when the transport vehicle or the transport trailer is not present.

Figure 27:
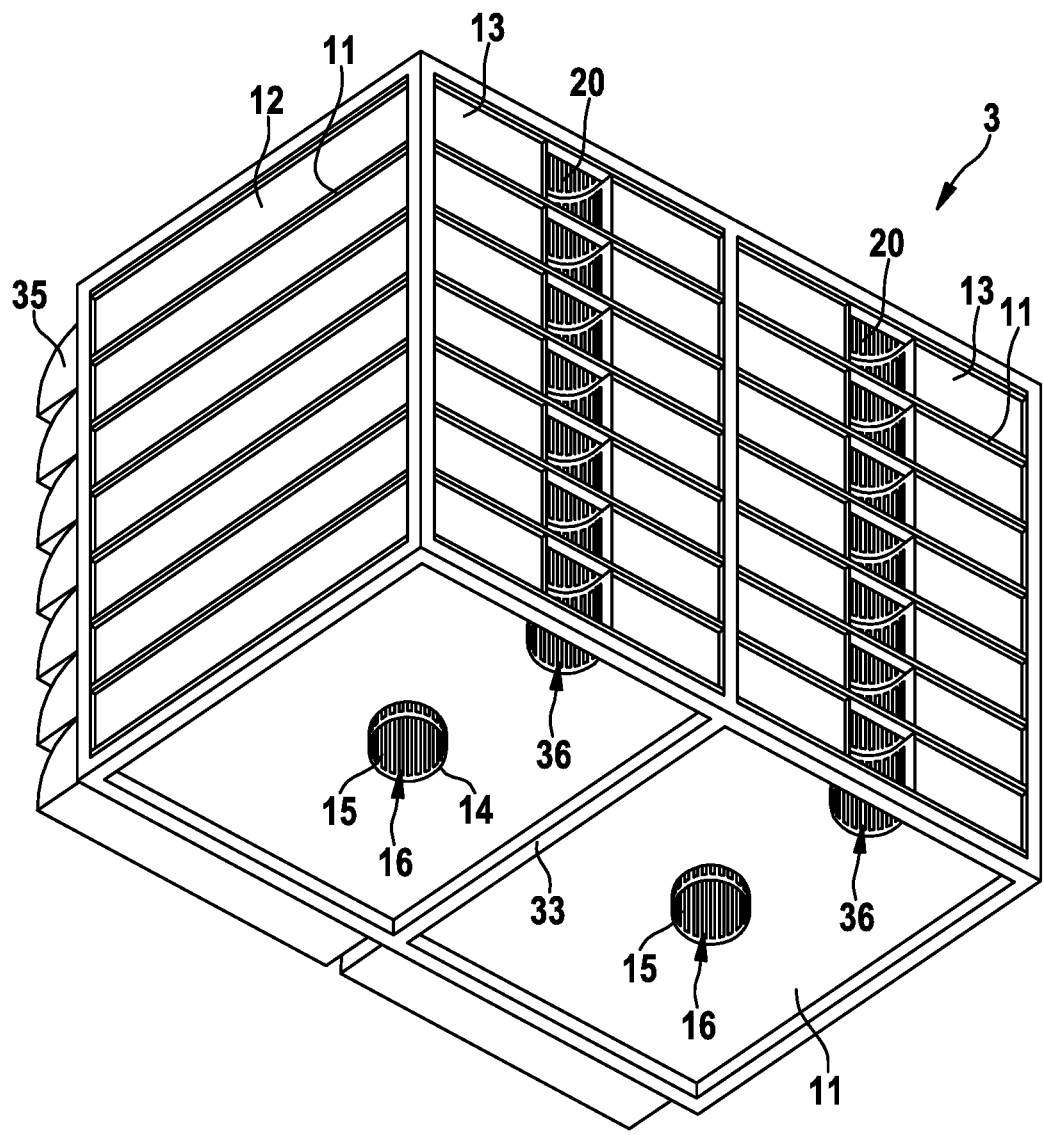
FIG. 27 shows an embodiment of a transport unit according to the present invention in a perspective view seen from beneath.

In an embodiment according to FIG. 27, a broiler transport unit 3 has outer side walls 12, 13 and seven floors in full length, each divided into two floors 11 by a vertical inner side wall 34 in the middle between side walls 12 and 13. Fourteen inner volumes are situated above the floors, one inner volume above each floor. Each inner volume can receive at least five live broilers during transport to a slaughterhouse. A ventilation column 14 extends vertically through the inner volumes and through the floors in the middle of each floor. In the first embodiment, the broiler transport unit has two such ventilation columns 14. Each ventilation column 14 is provided with ventilation openings 15 which open into the respective inner volume, so that all the inner volumes can be ventilated at the same time by applying an air pressure to channels 16 in the ventilation columns 14. In this manner, fresh air can be supplied to broilers situated at a distance from the side walls 12, 13.

Ventilation openings 15 are elongate and extend over almost the entire height of the column. The openings in the first embodiment have a total opening area per inner volume which corresponds to approximately 40% of the total area of the column in the volume, corresponding to approximately 9% of the area of the floor of the broiler transport unit, but the openings can be shorter and/or narrower if a smaller opening area is desired. The ventilation columns 14 are cylindrical with a constant diameter.

One side wall 13 is provided with a recess, which corresponds in size and shape to half a ventilation column 14, and with a portion of a ventilation column wall which is provided with ventilation openings 20, in order to form a semicircular continuous hollow ventilation column 36 which is joined to the side wall 13. Air blown in via ventilation openings 15 in the columns 14 is able to leave the inner volumes via openings 20. Ventilation air can also flow in the opposite direction from ventilation columns 36 via openings 20 to ventilation columns 16 if a low pressure is generated in the ventilation channel 16. It is also possible to provide different pressures in different ventilation columns 16 in order to induce a flow of air from one ventilation channel to the other so as thus to permit ventilation even when the side walls do not have openings but the inner side wall has openings.

Figure 28:
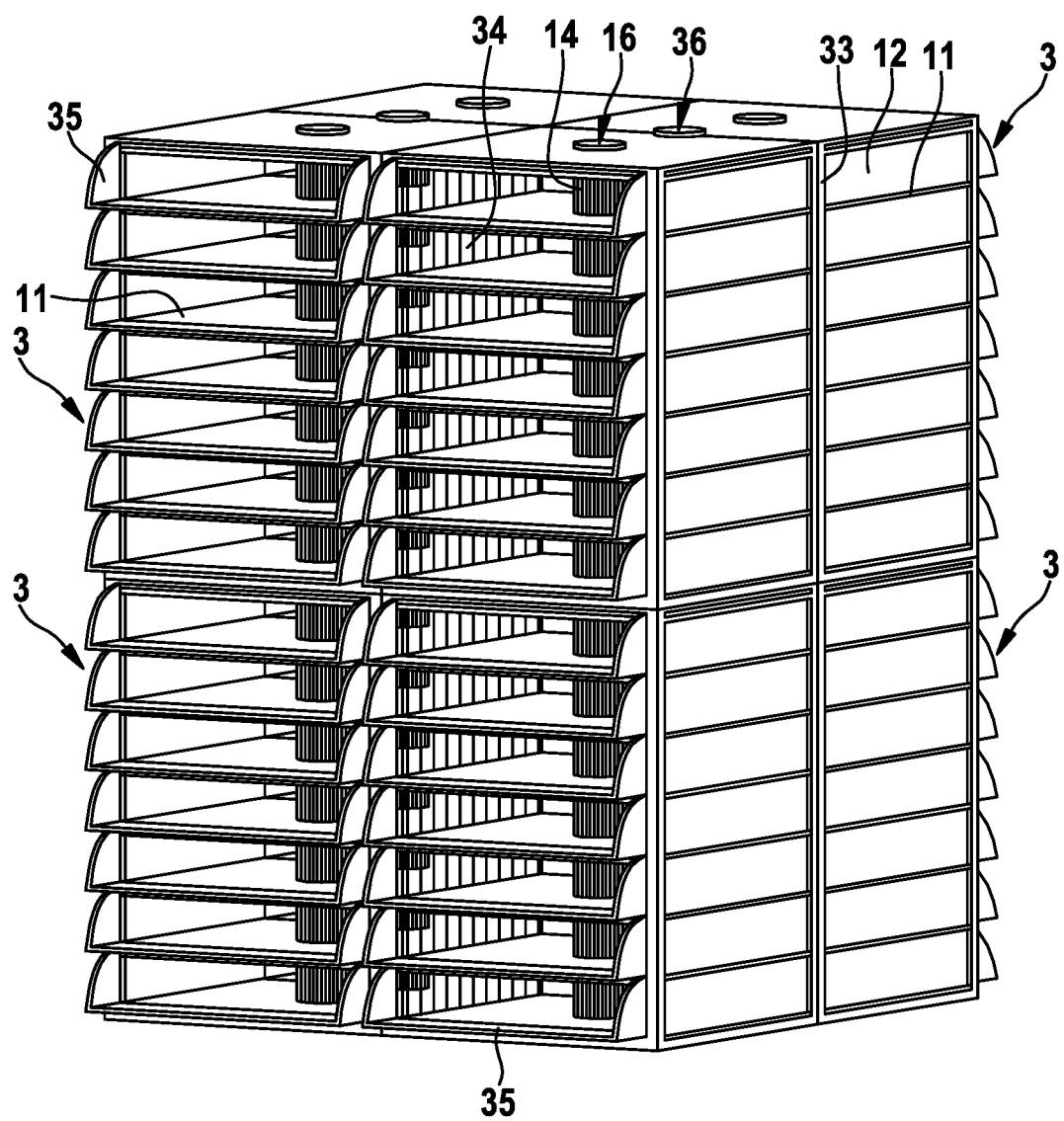
FIG. 28 shows four transport units of the embodiment of FIG. 27 arranged with two transport units in a stack and two such stacks placed side by side.

When transport units 3 of the embodiment as shown in FIG. 28 are arranged close together, the two semicircular ventilation columns 36 are aligned and form a common ventilation channel having a circular cross-section similar to that of the channel 16 formed by the ventilation column 14. Two transport units are placed in a stacked configuration, and the ventilation columns 16 are strung together to form a common ventilation column. The same applies to the ventilation columns 36.

The rounded surfaces and the relatively large diameter of ventilation columns 14 and ventilation columns 36 contribute towards protecting the broilers during transport and during loading into the transport unit. If a broiler hits the side of a column or recess, there are no sharp edges which could otherwise cause bruising.

In the following description of further embodiments, the same reference numerals as in the description of the first embodiment have been used for details having the same function, for the sake of simplicity.

Figure 29:
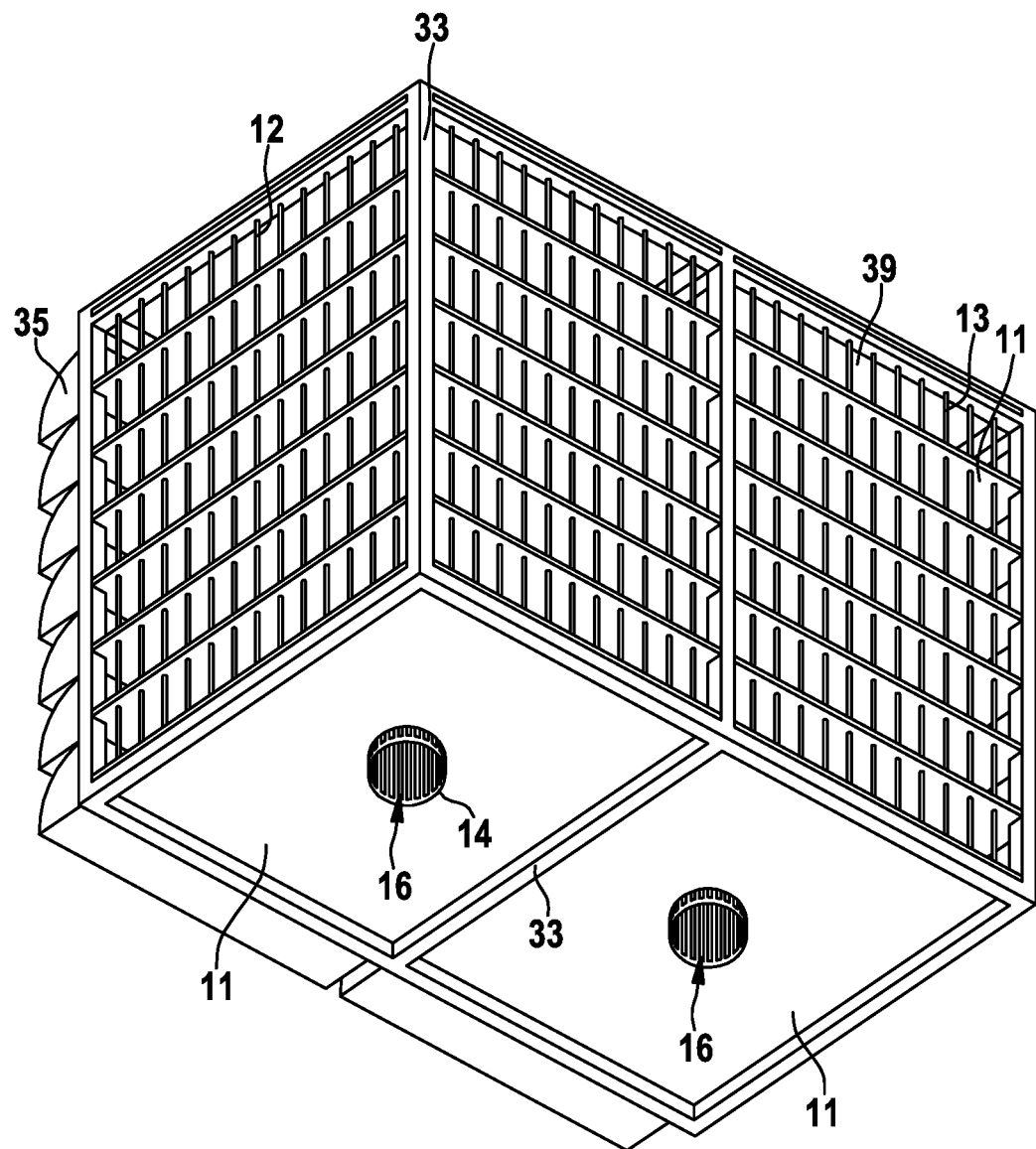
FIG. 29 shows a perspective view as in FIG. 27 of another embodiment of the transport unit.

The embodiments in FIGS. 27 and 28 have closed side walls and an open inner wall formed of vertical rods. It is also possible to design the outer walls 12, 13 with openings or to form the walls with rods, as in the second embodiment illustrated in FIG. 29. The second embodiment has only a single ventilation column 16 which extends centrally across the floors 11.

Figure 30:
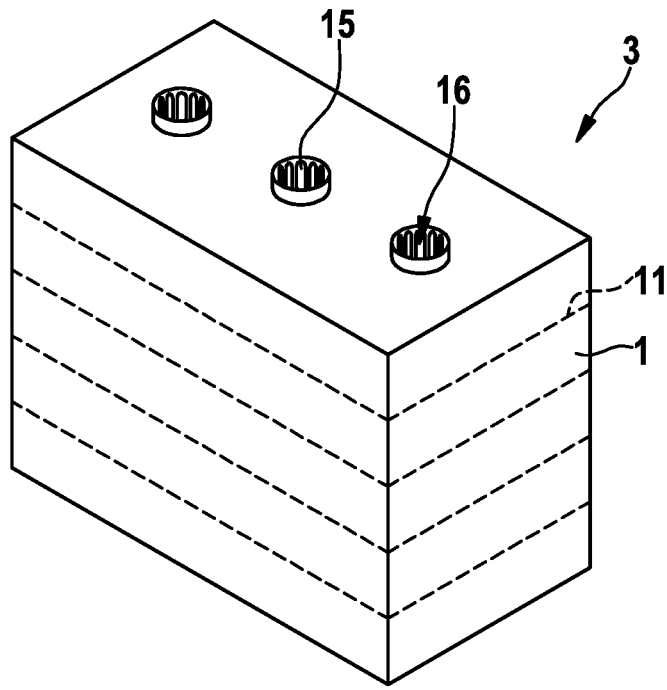
FIG. 30 shows a perspective view of a third embodiment of the transport unit from above.

In the third embodiment of FIG. 30, the broiler transport unit 3 has five parallel floors 11 which extend over the entire width of the broiler transport unit. In this embodiment, the broiler transport unit has three ventilation columns 14 with ventilation openings 15 in the inner volumes above each floor. The three ventilation openings extend through the broiler transport unit 13 over the entire height thereof and have open lower ends. Each ventilation column ends at an annular collar which has a slightly larger diameter than the column 14 and is mounted in the floor of the broiler transport unit, so that it is able to receive the slightly upwardly projecting upper end of the column 14 when two broiler transport units are placed in a stacked configuration.

Figure 31:
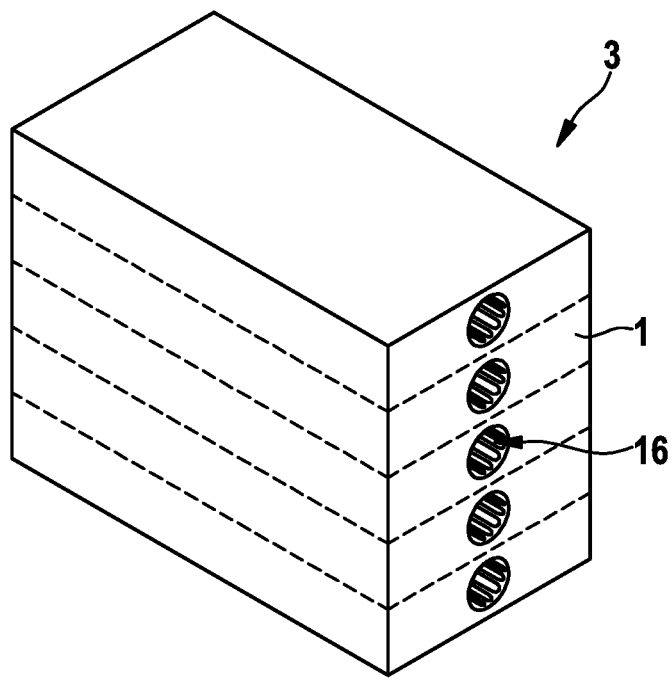
FIG. 31 shows another perspective view of a fourth embodiment of the transport unit from above.

In a fourth embodiment of FIG. 31, the broiler transport unit has a ventilation column which extends in the horizontal direction through each inner volume from one side wall 12 to the opposite side wall 12.

Figure 32:
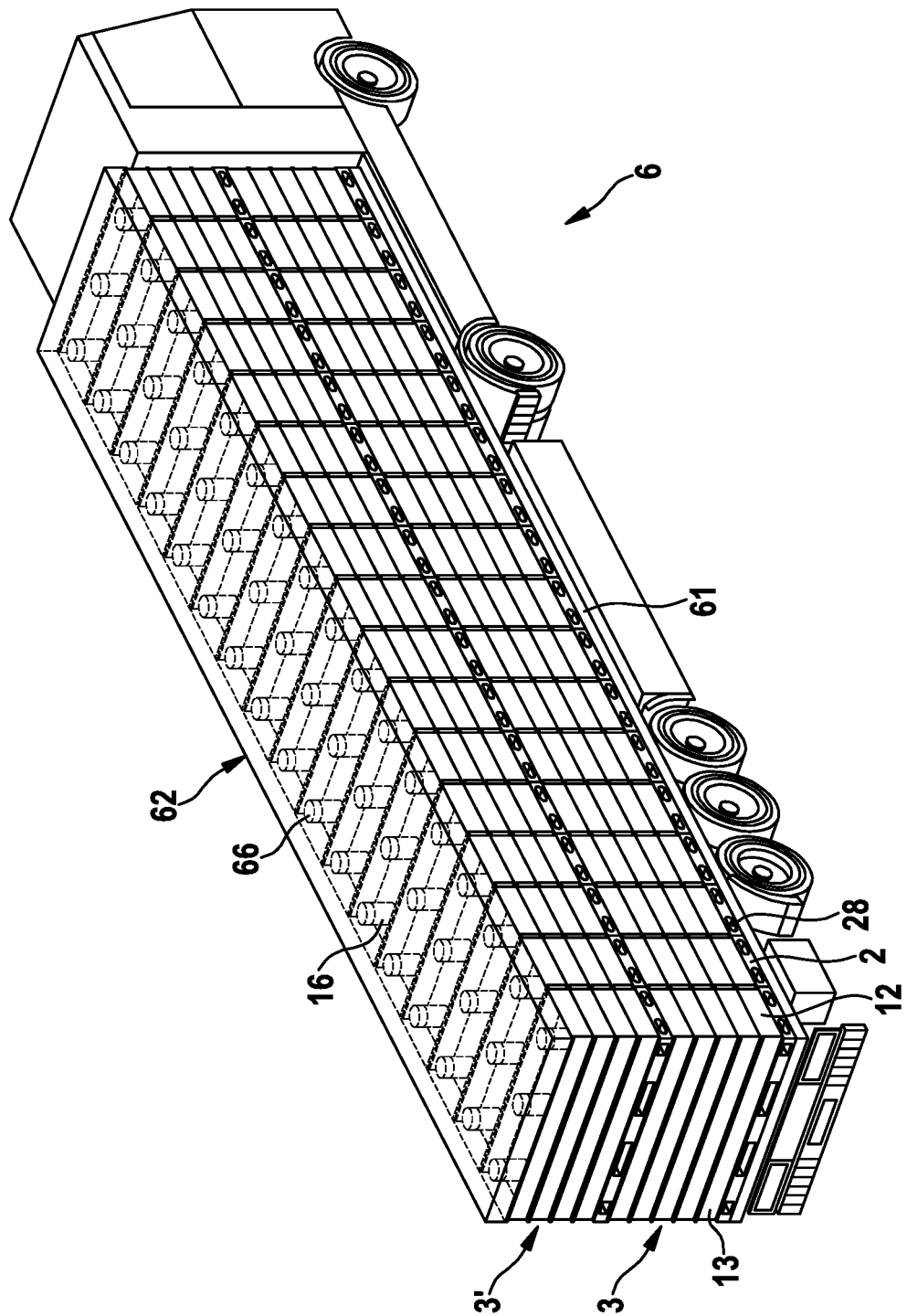
FIG. 32 shows a truck loaded with transport units according to the embodiment of FIG. 30.

FIG. 32 illustrates broiler transport units which are loaded onto a transport vehicle such as a trailer or a truck 6, where one broiler transport unit having five floors is situated in a bottom row and another broiler transport unit having four floors is situated in a top row which is stacked on the units in the bottom row. The illustrated broiler transport units have a floor structure 2 with holes 28 for a forklift truck used to lift the unit or a stack of two units.

Each broiler transport unit 3 has a width which corresponds to the width of the floor 61 of the truck or trailer, so that only one row of broiler transport units needs to be loaded, but it is also possible to use broiler transport units having a smaller width and then arrange them in two or more rows extending in the length direction of the floor.

In FIG. 19, the roof section 162 of the truck or trailer is provided with a ventilation system, in which a ventilation apparatus 163 is situated on top of each ventilation column 14 in the broiler transport units. In one embodiment, the ventilation system of the truck or trailer can comprise a plurality of sections which are individually adjustable in relation to a broiler transport unit or a group of broiler transport units, so that the ventilation can be produced and activated for one transport unit or one group of transport units while additional transport units are being loaded onto the truck or trailer.

The individual ventilation apparatus can also be a separate apparatus which is provided on the ventilation column on the broiler transport unit independently of the truck or trailer and is able to ventilate inner volumes connected to the ventilation column while the broiler transport unit is awaiting transport or further handling. Such a separate ventilation apparatus, or a set of such separate ventilation apparatuses, can be supplied with power from a battery or a rechargeable battery or a power supply device, such as, for example, from a solar cell device. Alternatively, the ventilation apparatus can be connected to a power supply, such as, for example, via a plug to a stationary power socket which is provided in the holding region of the broiler transport unit, such as, for example, on the farm after broilers have been loaded or at the slaughterhouse after they have been unloaded from the transport vehicle.

Alternatively, the ventilation system can be arranged as illustrated in FIG. 18, where a ventilation pipe 64 extends along the length of the truck or trailer 6 and has an outlet 65 branched off from the ventilation pipe 64 to each ventilation column 416 situated beneath the ventilation pipe. A ventilation apparatus 63 guides ventilation air to the ventilation pipe 64. The broiler transport units 403 illustrated in FIG. 18 each have four ventilation columns 416 and ten floors. The side walls 412, 413 have a row of ventilation openings 420 which are situated in the upper portion of each inner volume.

The roof section 62 can be raised in order to create space for loading and unloading broiler transport units. After loading, the roof section can be lowered into its position on the broiler transport units again, and the mechanical forced ventilation can be activated. Ventilation air flows from the ventilation pipes 64 into the ventilation columns 416 and from there into each inner volume of the broiler transport units, as indicated by the arrows. In this manner, each transport unit or each stack of units is supplied with forced ventilation. A portion of the transport unit 403 situated at the outermost end of the truck or trailer has been cut away in order to give a better view of the ventilation columns 416 therein and the air flows. Air can flow out of the broiler transport units via the ventilation openings 420 in the side walls.

In FIG. 19, the transport units in the second and third row from the driver's cabin are not illustrated with transverse side walls, in order to give a better view of the inner volumes and ventilation columns 116. In this embodiment, the roof section 162 has an inner volume 167 in which an overpressure or a low pressure can be generated by means of a ventilation apparatus 163 arranged above the driver's cabin. When an overpressure is generated in the inner volume 167 (FIG. 19), air is forced into the ventilation columns 116, as indicated by the arrows, and from there into the inner volumes of the broiler transport units 101 and out through the ventilation openings (not visible) in the side walls 113 into ventilation passages 136 between the broiler transport units. If openings 168 in the floor 161 of the trailer 106 are left open, a constant stream of fresh ventilation air can form through the transport units, possibly assisted by the low pressure which generally occurs at the underside of a moving truck. Air can be taken directly from the surroundings or can be conditioned in the ventilation system with regard to temperature and/or humidity or by recirculation.

When broiler transport units of the embodiment in FIG. 31 having horizontal ventilation columns are arranged side by side, the column sections 14 of adjacent units form common ventilation columns 16 which extend horizontally through the units. There can also be at least two, such as, for example, from two to six, horizontal ventilation columns for each inner volume. The higher numbers of ventilation columns are most relevant when the broiler transport unit has a width corresponding to the width of the load space 161 and the ventilation columns are arranged in the longitudinal direction of the load space and extend between the opposing side walls 13 of the unit. If an overpressure is applied to every second ventilation column 16, air enters through the ventilation openings 15 in a column and emerges via openings in the intermediate column. In this manner, even broiler transport units without ventilation openings of type 20 in the floor or in the side walls can be ventilated, but it is of course also possible to provide such openings in these containers.

In a further embodiment, a broiler transport unit has one ventilation column 14 that extends from one side wall 12 to the other in the horizontal direction, and one ventilation column that extends in the vertical direction.

All the broiler transport units used in the transport units described above have been shown and described as having flat floors without openings. Details of specific embodiments can be combined within the scope of the patent claims to give further embodiments. The broiler transport units can be produced with a triangular basic shape having three side walls or having more than four side walls in a polygonal basic shape.

The individual ventilation column can extend wholly through the floors, or the ventilation column can be produced from sections, the individual section being joined to a movable portion of the floor. Each floor 11 can be movable in relation to the frame 33 or side walls 12, 13. The use of movable floors or movable floor sections can facilitate the loading of broilers into the broiler transport unit.

The floors, side walls, upper wall and doors 35 can be in sheet form without ventilation openings, except at the ventilation columns. This gives a high degree of calm and shelter for the broilers and also shields the broilers from intense light such as sunlight.

The number and position of the ventilation columns in relation to the side walls and the other ventilation columns can vary, and the size, shape, position and number of the ventilation openings in the side walls can also vary, including the possibility that ventilation openings are provided only in the ventilation columns. It is also noted that the different broiler transport units do not need to be identical and that the ventilation columns do not need to extend continuously through the transport unit. For example, the lowermost floor of a transport unit can be without a ventilation column section, it being possible for the inner volume above this floor to be ventilated via a hollow ventilation section in the floor above the opening into the lowermost inner volume.

The rear end of a broiler transport trailer 6 which transports broilers to the slaughterhouse is illustrated in FIG. 18 with transport units 403 each having a width corresponding to the width of the floor 61 of the trailer. In connection with the present invention, the expression transport trailer is to be understood in a broad sense. The transport trailer can be a trailer which is driven by a truck drive unit and which can be parked in a state in which it is disconnected from the truck drive unit. The transport trailer can be part of an articulated truck, such as, for example, the articulated trailer, which can travel connected to the truck and behind the truck or behind a trailer driven by the truck drive unit. The transport trailer can have dual wheels, a plurality of chassis or simply an axle at both ends. The transport trailer can have a standard size or a large size (XL), in particular a large length. The transport trailer can also have a smaller size, such as, for example, a lorry. The expression transport trailer also includes railway wagons.

The roof 62 of the trailer is provided with a ventilation system which comprises four ventilation devices 63 in the form of a ventilator driven by an electric motor which is supplied with power either by the drive unit of the trailer, a rechargeable battery on the trailer or via a power connection which is connected to a power supply on the farm, at the slaughterhouse or at another stationary supply point. The ventilation device supplies (mechanical) forced ventilation to a ventilation pipe 64 which extends over the length of the trailer 6. The ventilation pipe 64 supplies a row of branched outlets 65 with ventilation air. The individual outlet 65 is in each case situated in a position which corresponds to an end opening of a ventilation column 416 in the transport units 403. When the roof 62 is lowered onto the broiler transport units, the outlets come into alignment with openings 439 at the upper ends of the ventilation columns or are integrated therewith or come into engagement therewith, so that ventilation air is able to flow between the ventilation pipes 64 and the ventilation columns 416 and via the columns and ventilation openings therein through inner volumes of the broiler transport containers, as indicated by the arrows. In this manner, each broiler transport unit or each stack of transport units is supplied with forced ventilation air. A portion of the transport unit 403 situated at the outermost end of the truck or trailer has been cut away in order to give a view of the ventilation columns 416 in the interior and of the air flow.

In this embodiment, the ends of the ventilation pipes 64 have been provided with flanges 66 which permit a tight fit on the coverings 5.

The ventilation devices can be controlled individually in order to achieve ventilation conditions which are adapted to the local conditions in the ventilation column or ventilation columns which are supplied with ventilation by the ventilation device. A group of ventilation devices can be controlled together, such as, for example, if a special ventilation air composition is to be supplied to all the inner volumes or if one side of the trailer is more exposed to sunlight than the other side. Ventilation devices can also be controlled so that less ventilation air is supplied when the natural ventilation is high, for example when travelling at high speed, and more ventilation air is supplied when less or no ventilation air is created by the travelling speed.

Air can flow out of the broiler transport units via the ventilation openings 420 in the side walls 412, 413, and it is also possible that the ventilation columns 416 are continued through the pallets 402 so that air is able to escape via pallet openings 428, 438. Ventilation openings 420 are here to be seen in all four sides of the broiler transport units, but it may be expedient to have them only in the longitudinal side walls. The trailer floor 61 can likewise be provided with ventilation openings (not shown).

In FIG. 18, a single row of broiler transport containers fills the floor of the trailer, but it is also possible to use broiler transport units of a smaller width and arrange them in two, three, four or more rows extending in the length direction of the floor.

Figure 33:
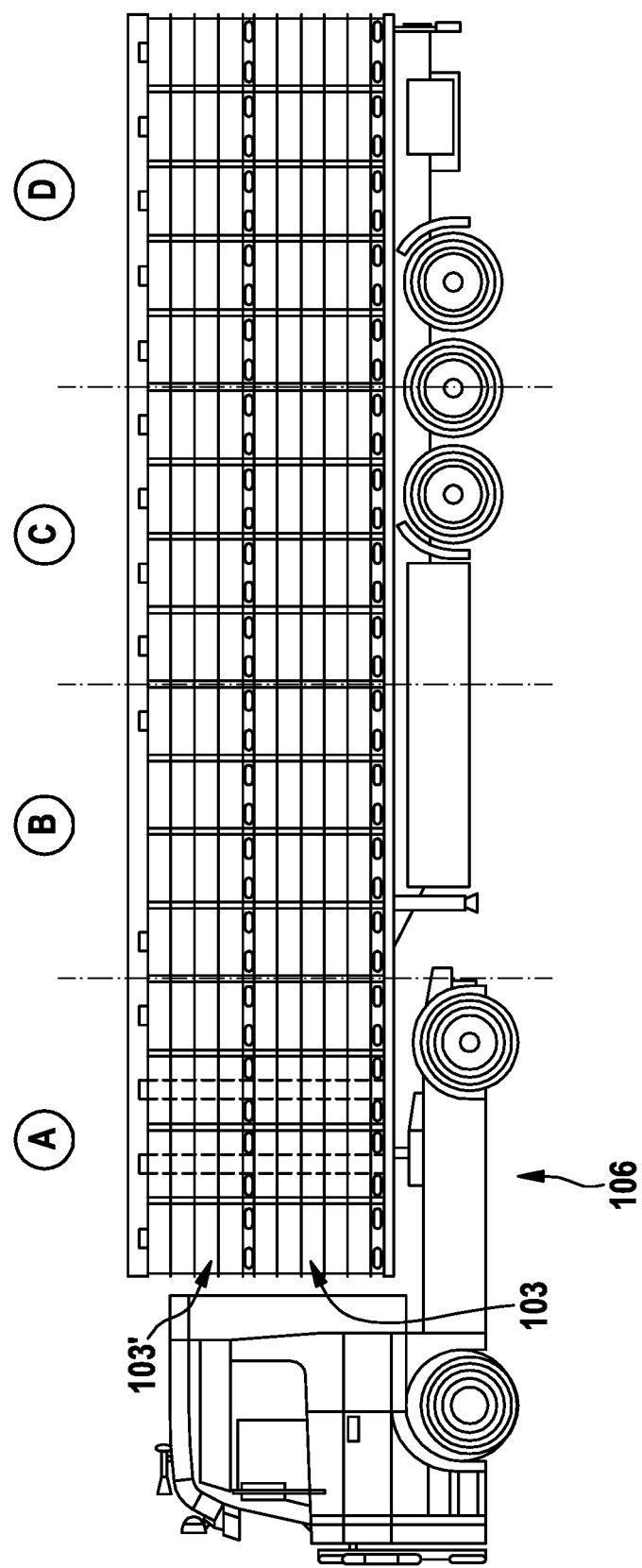
FIG. 33 shows a truck with the trailer loaded with transport units each containing four or five broiler containers, seen from the side.

The ventilation system of any of the described embodiments and of other embodiments of the invention can be used to ensure adequate ventilation of the broiler transport units 103 during loading of the truck. Loading of a typical broiler transport truck 106 as shown in FIG. 33 in its full length usually takes about one hour, and it can therefore be expedient to divide the ventilation into sections as indicated by the broken lines. When section A is fully loaded, the ventilation of that section is started while loading is continued in section B, then section B is connected to the ventilation etc., until finally the ventilation in section C is started. This can be achieved simply by providing air regulating mechanisms such as dampers or valves in ventilation pipes which extend over the length of the truck, as shown in FIG. 18, or in an inner roof volume as in FIG. 19. The number of rows in each ventilation section A-D can vary according to the size of the broiler transport units and the size of the trailer, and by providing sufficient regulating mechanisms it is even possible to adjust the size of the individual sections, for example according to the ambient temperature and the speed with which broiler transport containers are loaded.

The ventilation can be regulated in response to the measurement, for example, of air temperature, air humidity and/or $CO_2$ content either in the air in the inner volumes of the broiler transport units or in the ventilation air flowing out of the broiler transport units. Sensors which measure one or more of the mentioned air values can be arranged in the broiler transport units, possibly in the pallets thereof, or in the truck used for this purpose.

A recording system can be used for controlling the ventilation and/or for recording different conditions of the ventilation system, of the broiler transport units and/or of the broilers. The outlet air temperature and air humidity and/or the $CO_2$ content at the outlets, for example, can be used as indicators of the condition of the broilers, while information about the ambient air temperature and air humidity can be used to assess a future need for adjustment. Other parameters such as ventilation air temperature and air humidity as well as the transport duration etc. can be used to calculate expected values for other parameters and to compare actual and expected values for adjusting the ventilation.

FIG. 6 shows an embodiment of a broiler transport unit 3 having outer side walls 12, 13 and five floors 11 which define five inner volumes each of which can receive at least five live broilers during transport to a slaughterhouse. Three ventilation columns 14 on each floor together form three continuous hollow-cylindrical ventilation channels 16 which are composed of the ventilation columns 14 of the five broiler transport units 1, 1' situated in the prolongation of one another. Each column section 14 is provided with ventilation openings 15 which open into the respective inner volumes, so that all the broiler transport units 1, 1' in the transport unit can be ventilated at the same time by applying an air pressure at the ventilation columns 16. In this manner, it is possible to supply fresh air even to birds that are at a distance from the side walls 12, 13. The air supply can also be used for heating or cooling the inner volume of the container.

A ventilation column in a broiler transport container or in a unit can be referred to as a ventilation column section 14 because it becomes a section of a common ventilation column which extends through a plurality of broiler transport containers when they are stacked to form a unit, and possibly becomes part of a ventilation column which is common to two or more broiler transport units when they are loaded onto a transport trailer.

The broiler transport unit shown in FIGS. 6 and 8 is composed of a series of broiler transport containers 1 stacked one on top of another, and such a container is shown in FIGS. 3-5. The floor 11 is rectangular with two transverse side walls 12 and two longitudinal side walls 13, which together delimit the inner volume. The three columns 14 extend from the floor 11 upwards through the inner volume at a distance $d_T$ from the transverse side walls 12 and at a distance $d_L$ from the longitudinal side walls 13. These distances $d_T$, $d_L$ are such that there is space for at least one broiler between each of the columns 14 and the respective side walls 12, 13. The ventilation columns are arranged in a row along the middle longitudinal axis L of the container and are evenly spaced.

Each column 14 is so designed that it serves as a ventilation column by being provided with elongate ventilation openings 15 which extend over almost the whole height of the column. The openings here have a total opening region which corresponds to approximately 40% of the total area of the column, corresponding to approximately 9% of the area of the floor of the broiler transport unit, but the openings can also be smaller and/or narrower if a smaller opening region is desired.

The columns 14 are cylindrical with a constant diameter $d_C$, except for a small bevelled portion 17 provided at the point of connection to the floor 11. The bevelled portion not only reinforces the structure but also allows a column of another container to project slightly into the cavity, as is shown in FIG. 8. In this embodiment, the height $h_C$ of the columns 14 corresponds to the height of the side walls 12, 13, but they can also be slightly higher so that they are able to come into engagement with a column of another container.

The two longitudinal side walls 13 of the broiler transport unit in FIGS. 6 and 8 are provided with recesses 19 which correspond in size and shape to half a ventilation column 14, and they are also provided with ventilation openings 20, but there is no bevelled portion and no cross. In order to ensure the stability of the broiler transport unit even when it is fully loaded with broilers, a carrier 21 bridging each recess 19 is provided as a continuation of the plane of the longitudinal side wall 13. The carrier can also be used as a handle when the container and/or the transport unit is handled either manually or automatically.

In the broiler transport unit 3, the recesses 19 in the side walls are situated one above another, as is also apparent from FIGS. 6 and 8, so that they form a semicircular, continuous, hollow ventilation column 36 which is joined to the longitudinal side walls 13 and has ventilation openings 20. Air guided via the ventilation openings 15 into the ventilation columns 14 can flow out via openings 20 in the recesses 19 in the side walls. Ventilation air can also flow in the opposite direction from the openings 20 in the side walls to the ventilation columns, for example if a low pressure is generated in the ventilation channel 16. It is also possible to provide different pressures in different ventilation columns 16 in order to induce an air flow from one ventilation column to another, so that ventilation is possible even if there are no specific ventilation openings in the side walls. This can be effected by providing the individual ventilation column with a ventilation device which can be controlled independently of other ventilation devices for other ventilation columns in the ventilation system.

When a transport unit 3 of the type shown in FIGS. 6 and 8 is arranged close to and in alignment with another transport unit of the same type, the recess channels 19 in those two transport units are then in alignment with one another and form a common ventilation channel having a circular cross-section corresponding to that of the channel 16 formed by the ventilation columns 14. A similar effect can be achieved by arranging the transport unit with the longitudinal side wall 13 close to a wall or the like, in order thus to close the recesses 19 and generate a semicircular ventilation column. The ventilation column 36 so formed functions in the same manner as the ventilation passage 136 described with reference to FIG. 19.

The broiler transport unit in FIGS. 3-6 and 8 has a length of 240 cm and a width along the transverse side walls 12 of 80 cm and a diameter of the ventilation columns 14 of 20 cm, and the individual broiler transport units have a height of 22.5 cm. Such a broiler transport unit spans the whole width of a European standard truck trailer when it is arranged as in FIG. 18.

The pallet 2 used in FIGS. 6 and 8, which is shown on its own in FIG. 9, is provided with a row of openings 27 in the same positions as the columns in the broiler transport units, as is also shown in FIG. 8, so that the ventilation columns 16 continue through the pallet. Although this is not the case in this embodiment, the ventilation columns formed by the recesses 19 can likewise continue into the pallet. Horizontal openings 28 in the pallet 2 are designed for engagement with the arms of a forklift truck (not shown) which is used for handling the transport unit 3. These horizontal openings can contribute to the ventilation by being brought into communication with one of the ventilation openings 16, 19, although this is not the case in the embodiment shown in FIGS. 6, 8 and 9.

Another embodiment of a broiler transport container is shown in FIG. 1. This container corresponds to those in FIGS. 3-6 and 8, except that it is smaller and has a different configuration of the ventilation columns, and the same reference numerals will therefore be used.

The broiler transport container in FIG. 1 has a length and a width of 120 cm, a height of 22.5 cm and a diameter of the ventilation columns 14 of 20 cm. Two rows of broiler transport units composed of such containers fill the width of a trailer when they are arranged side by side. The distance $d_T$ to the side walls 12 without recesses is approximately 50 cm, and the distance & to the side walls opposite the side wall with the recess 19 is approximately 30 cm in the embodiment illustrated.

Another embodiment of a broiler transport container 101 is shown in FIG. 10. Reference numerals corresponding to those in FIGS. 1, 3-6, 8, 9, 18, 19, 33 are used, but with the addition of 100, and features with such corresponding reference numerals have the same function unless indicated otherwise.

This broiler transport container 101 also has three ventilation column sections 114 which are so arranged that they project from the floor 111 and form a ventilation column 116. The container is of simpler construction, and the ventilation openings 115 are provided only at the upper edges of the ventilation sections. The ventilation openings have a smaller total opening region than those shown in FIGS. 3-6 and 8 and are situated at head height of the broilers.

The container in FIG. 10 does not have recesses in the side walls. Instead, it is provided with a row of openings 120 in the upper portion of the longitudinal side walls 113. A flange 126 projecting away from the inner volume of the container serves as a spacer, so that there is always a ventilation passage 136 along the outside of the longitudinal side walls. In addition to the vertical flow described with reference to FIG. 19, where the trailer is loaded with broiler transport units composed of containers of this type, this permits a flow of ventilation air in a horizontal direction along the outsides of the side walls.

The projecting flanges 126 can also be used as handles when handling the containers and allow the container to be inserted into a frame system and used in a transport unit of the prior art if required.

The trailer in FIG. 33 is likewise shown loaded with broiler transport units composed of broiler transport containers of this type.

All the embodiments described above are based on the use of broiler transport units having ventilation column sections 14, 114 which extend from the floor, which means that the ventilation columns 16, 116 of the broiler transport units also extend in a substantially vertical direction, but it is also within the scope of the invention to use horizontal ventilation columns.

An example of a broiler transport container system having a horizontal ventilation column is shown in FIG. 24. As can be seen, this container comprises a column section 614 which extends from one outer end side wall 612 to the other and has ventilation openings 15. When such containers are arranged end to end, the column sections form a common ventilation column 616 which extends through them, and the ventilation system on the trailer must then be arranged along the side of the trailer or be provided with connecting pipes or lines which extend along the side. Here too, recesses 619 with openings 620 as described with reference to FIGS. 3-6 and 8 are so designed that they contribute to the ventilation and form vertical ventilation columns 636 when containers are stacked one on top of another and side by side. Accordingly, this embodiment of a broiler transport container allows horizontal and vertical ventilation columns to be combined. Alternatively, the recesses can be omitted and replaced by simple openings in the side walls or by an additional horizontal ventilation column.

As described above, a recording system can be used for controlling the ventilation and/or for recording different conditions of the ventilation system, of the units and/or of the poultry. The recording system can comprise a local memory unit, which follows the individual poultry transport unit, for documenting the conditions of the welfare of the animals. Such a local memory unit can be situated, for example, in the pallet or in a covering or in the lid of the poultry transport unit and can be connected to a central unit for the ventilation system on the trailer during transport. Alternatively, the recording system can be supplied with the detected values, which are stored in a memory, or print-outs of detected values are another means of storing the information. It is also possible that the detected values are transmitted online to a central unit which is situated on the farm or at the slaughterhouse or at the retail supplier who sells the poultry to customers. In this manner, for example, end consumers can have access for checking the transport conditions for the poultry.

The poultry transport units 3 comprise a plurality of floors in a stack-like configuration. The plurality of floors can be contained in a common structure, such as, for example, conventional container transport systems, wherein the outer side walls are common to all the floors in the transport unit, and the floors can be removed at least partially with respect to the side walls in order to provide access for poultry.

The ventilation columns 16 in the poultry transport units 3 end in ventilation column end openings 39. This applies to both horizontal and vertical ventilation columns. The ventilation system has a ventilation opening which is situated at the individual ventilation column end opening 39. In an alternative embodiment of the ventilation system, the ventilation system has a ventilation device which is situated at the individual ventilation column end opening 39. In such an arrangement, the ventilation for each ventilation column can be controlled individually if the ventilation system is equipped with a regulating system or control system for the individual ventilation device.

Figure 34:
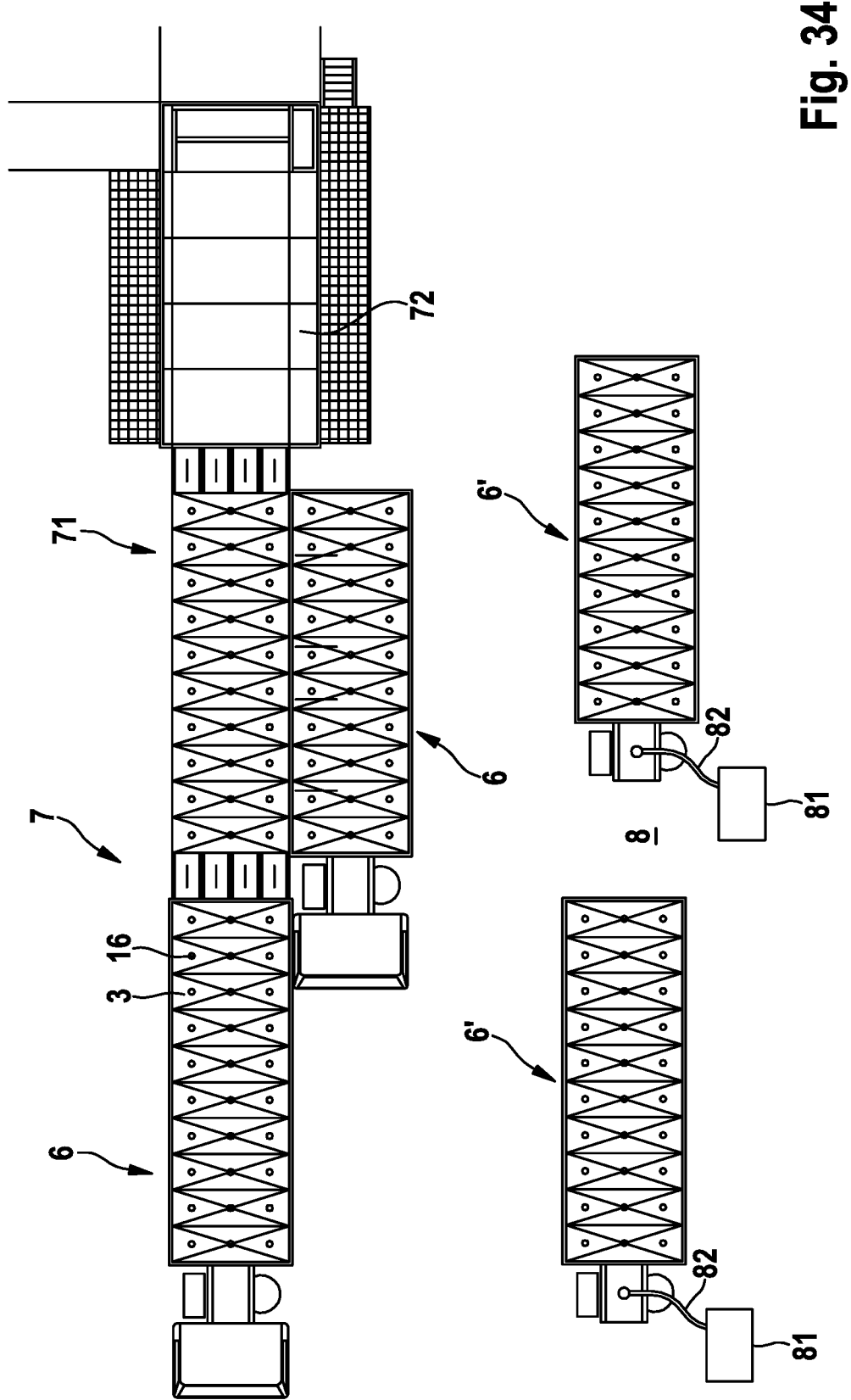
FIG. 34 shows two trucks with poultry transport trailers and two parked trailers at a slaughterhouse, in a schematic view seen from above.

On arrival at a slaughterhouse, the poultry transport units must be unloaded from the trailer. One possible method of doing this is shown in FIG. 34, where two trucks with poultry transport trailers 6 are parked in an unloading region next to a receiving system 7.

One trailer 6 is parked as a direct continuation of a conveyor 71 in the poultry receiving system, so that the poultry transport units 3 on the floor or on the trailer can be transferred directly to the conveyor by being pushed or pulled in the longitudinal direction of the trailer. This can be effected by semi-automatic or automatic actuators, which are so designed that they engage poultry transport units and which can be integrated into the trailer or into the receiving system.

The other trailer 6 is parked parallel to the conveyor, so that the transport units can be pushed or pulled sideways from the trailer and onto the conveyor. This sideways unloading allows the system to be unloaded quickly because all the poultry transport units can be dealt with at the same time and an external unit (not shown) for pushing the poultry transport units from the trailer can be arranged at the side of the trailer opposite the conveyor, but it is of course also possible to use semi-automatic or automatic actuators which are integrated into the trailer or into the receiving system.

The conveyor 71 of the receiving system 7 here also serves as a delivery system for delivering poultry transport units to a CAS (controlled atmosphere stunning) apparatus 72 by transferring poultry transport units received from the trailers directly to the CAS apparatus. One or more poultry transport units can enter the CAS apparatus at the same time and, although not shown here, it is also possible to incorporate a de-stacker for dividing poultry transport units 3 composed of poultry transport units 1 into individual poultry transport units 1 before they enter the CAS apparatus.

Figure 35:
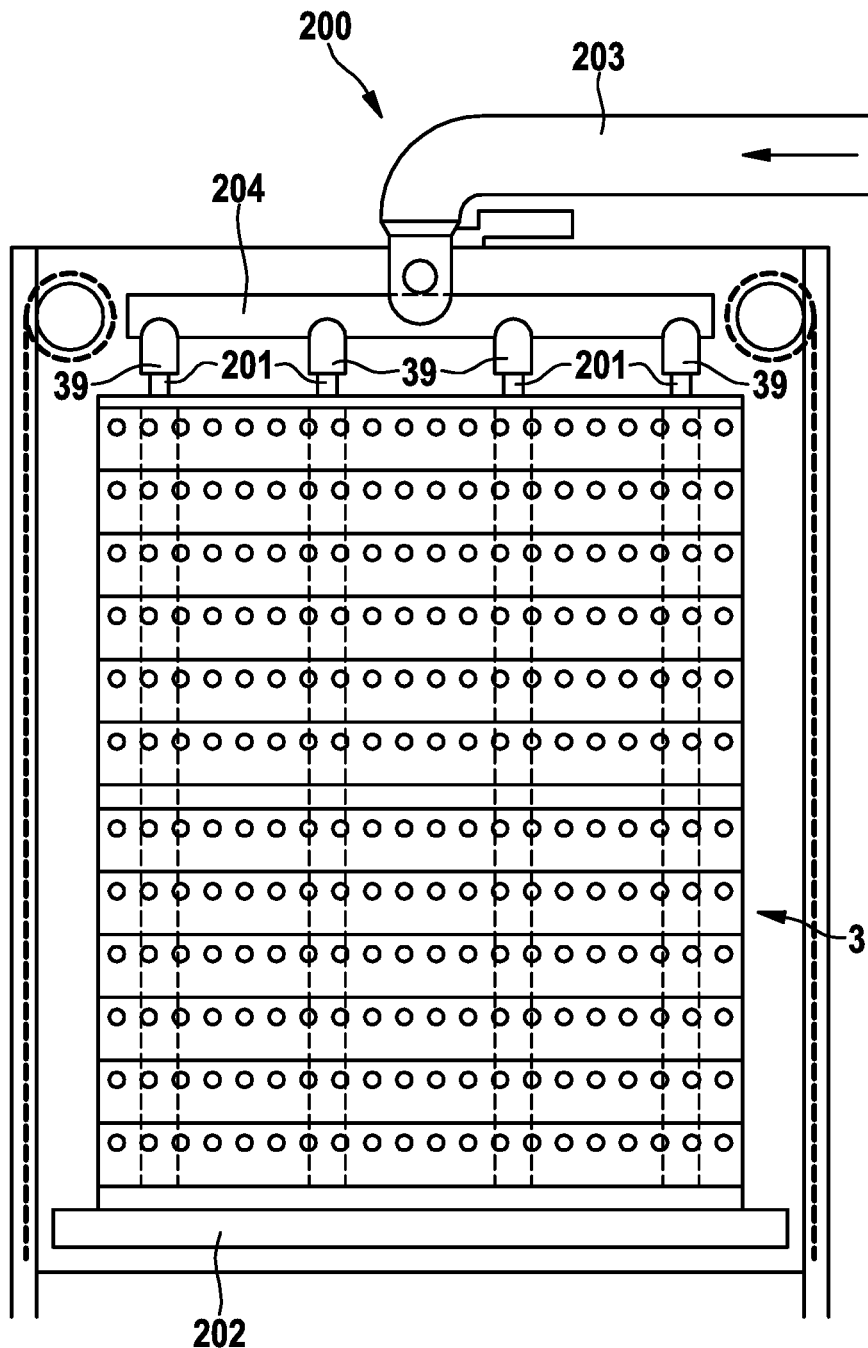
FIG. 35 shows an apparatus for controlled atmosphere stunning.

FIG. 35 illustrates a poultry transport unit 3 situated in a chamber of the CAS apparatus. The apparatus has a ventilation device 200 with an arrangement of four outlet openings 201 which are so arranged that they are connected to the ventilation column end opening 39 of the poultry transport unit when a movable support 202 in the chamber has moved the poultry transport unit upwards into an end position. Controlled atmosphere gas, such as air having a specific carbon dioxide content, is passed through a supply line 203 into a distributor 204 which distributes the controlled atmosphere gas to each outlet opening 201. From the outlet opening 201, the gas is passed into the ventilation columns and out via ventilation gas outlet openings situated in the inner volumes of the poultry transport unit 3. The number of outlet openings 201 in the distributor is matched to the number of ventilation column end openings 39 in the poultry transport unit and, if the ventilation columns are horizontal, the distributor is situated at the side of the chamber so that it coincides with the positions of ventilation column end openings 39.

In one embodiment (not shown), the CAS apparatus has a chamber which is of a size to receive a single poultry transport unit 1 having a single ventilation column end opening, and in this embodiment the supply line is situated without a distributor in direct flow connection with a single outlet opening 201. This embodiment is very compact and provides effective stunning. In another embodiment, the CAS apparatus has a chamber which is of a size to receive a single poultry transport unit 1 having two ventilation column end openings, and in this embodiment the supply line is situated in direct flow connection with two outlet openings 201 by the formation of a single branch line in the end region of the supply line without an actual distributor. In another embodiment, the CAS apparatus has a chamber which is of a size to receive a single poultry transport unit 1 having three ventilation column end openings, and in this embodiment the supply line is in direct flow connection with three outlet openings 201 by the formation of two branch lines in the end region of the supply line.

Poultry transports sometimes arrive at the slaughterhouse at the same time, when there is no available capacity in the stunning apparatus, and the trailers are then parked in a poultry lairage region 8, as is shown in the bottom part of FIG. 34. Each trailer 6' is coupled via a cable and/or a line connection 82 to a supply unit 81, each supply unit having one or more supply sockets for operating the ventilation system on the trailer, so that the ventilation columns extending into the inner volumes of the poultry transport units continue to be ventilated as described above. In this manner, the poultry transport units can be kept on the trailer during lairage.

The supply units typically supply power to an on-board ventilation system on the trailer, but they can additionally or alternatively supply cooled or dehumidified air or other fluids. Preferably, the on-board recording system, where present, continues to detect and document relevant parameters during the lairage period, and the delivery unit can also include sensors for detecting such parameters and may be in communication with the on-board recording system.

When the stunning and slaughtering sections are ready to receive the poultry transport units, the connection 82 is separated from the supply sockets of the supply unit and the trailer is brought into the unloading region 7 and unloaded as described above. In this embodiment, only two supply units are shown, but it is of course also possible to provide further supply units. It is likewise noted that the lairage region is usually an outside region, but a covering can be provided in order to protect the supply units from the weather.

As has been described in detail, the invention is directed in particular to the transport of the slaughter-ready broilers. However, a further preferred field of use of the invention will be described with reference to FIGS. 36 to 39. The above-described containers and units of two or more containers are suitable in particular also for rearing, starting with day-old chicks to slaughter-ready broilers, which can then be transported to the slaughterhouse by the transport trailer described above.

Figure 38A:
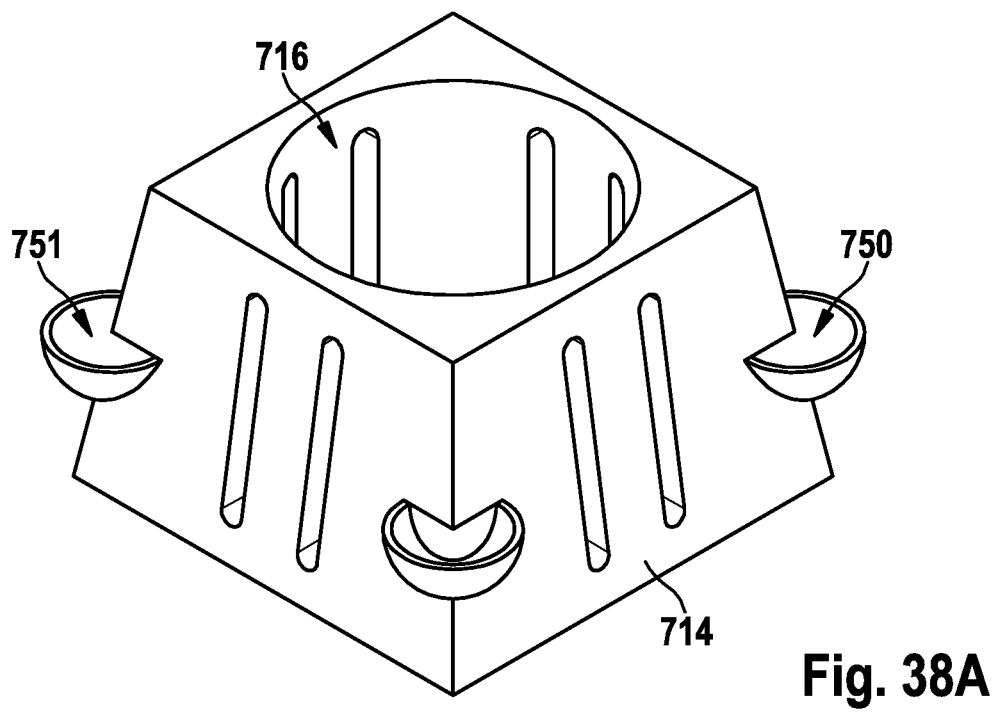
FIG. 38A shows a single container which is designed and configured for rearing and transport of broilers.
Figure 38B:
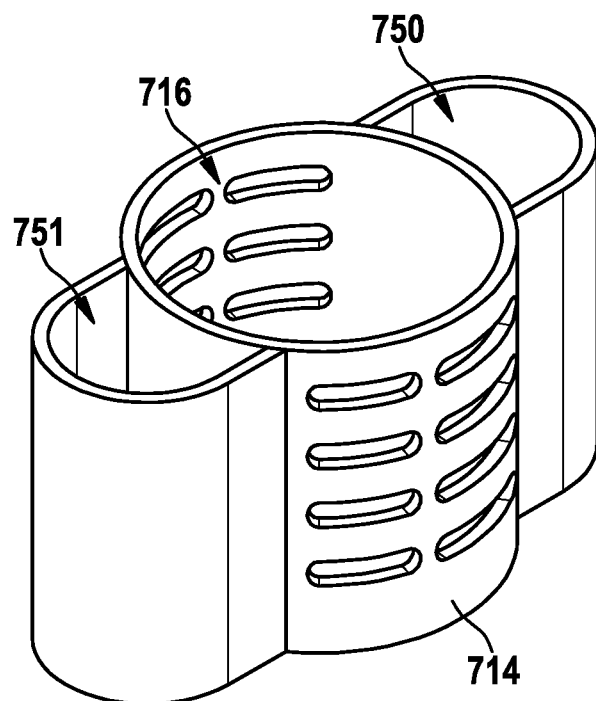
FIG. 38B shows a column comprising two containers in accordance with a representative embodiment.
Figure 38C:
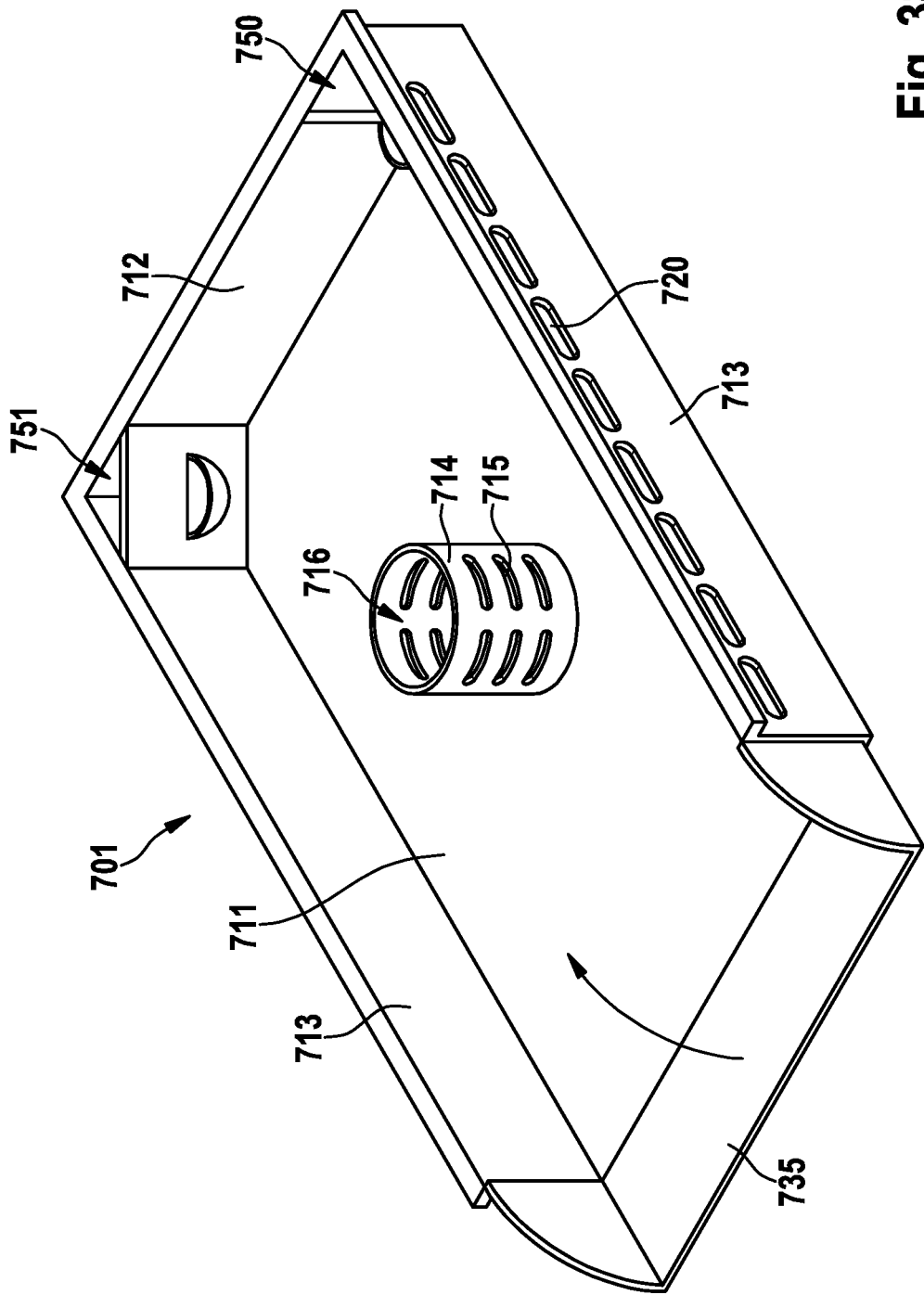
FIG. 38C shows a container designed and configured for accommodating poultry during rearing of chicks until they are slaughter-ready broilers and for transporting the broilers.

The container 701 (as illustrated in FIG. 38C) is designed and configured for permanently accommodating the poultry during rearing of the chicks until they are slaughter-ready broilers and for transporting the broilers. The container 701 comprises a floor 711 and four side walls 712, 713. At least one of the side walls 735 is in the form of a pivotable flap, swing door, sliding element or the like in order to facilitate access to the inner volume. A column section 714 or a column 716 in the form of a ventilation or air outflow column is preferably provided in the middle. The column section 714 or column 716 can optionally additionally be in the form of a support column in order to improve the stacking of a plurality of such containers 701 to form a unit. The number and the position of the column sections 714 or columns 716 can vary. Openings 720 are provided in at least one side wall 713 in order to ensure ventilation circulation. The container 701 additionally comprises a supply for supplying feed. In the example shown, a container 750 for water and a container 751 for feed are provided. The containers 750, 751 are preferably arranged in corner regions of the container 701 and can be filled from outside. The containers 750, 751 can also be in the form of separate components or and in combination with the column section 714 or the column 716 (see e.g., FIG. 38C).

Figure 36:
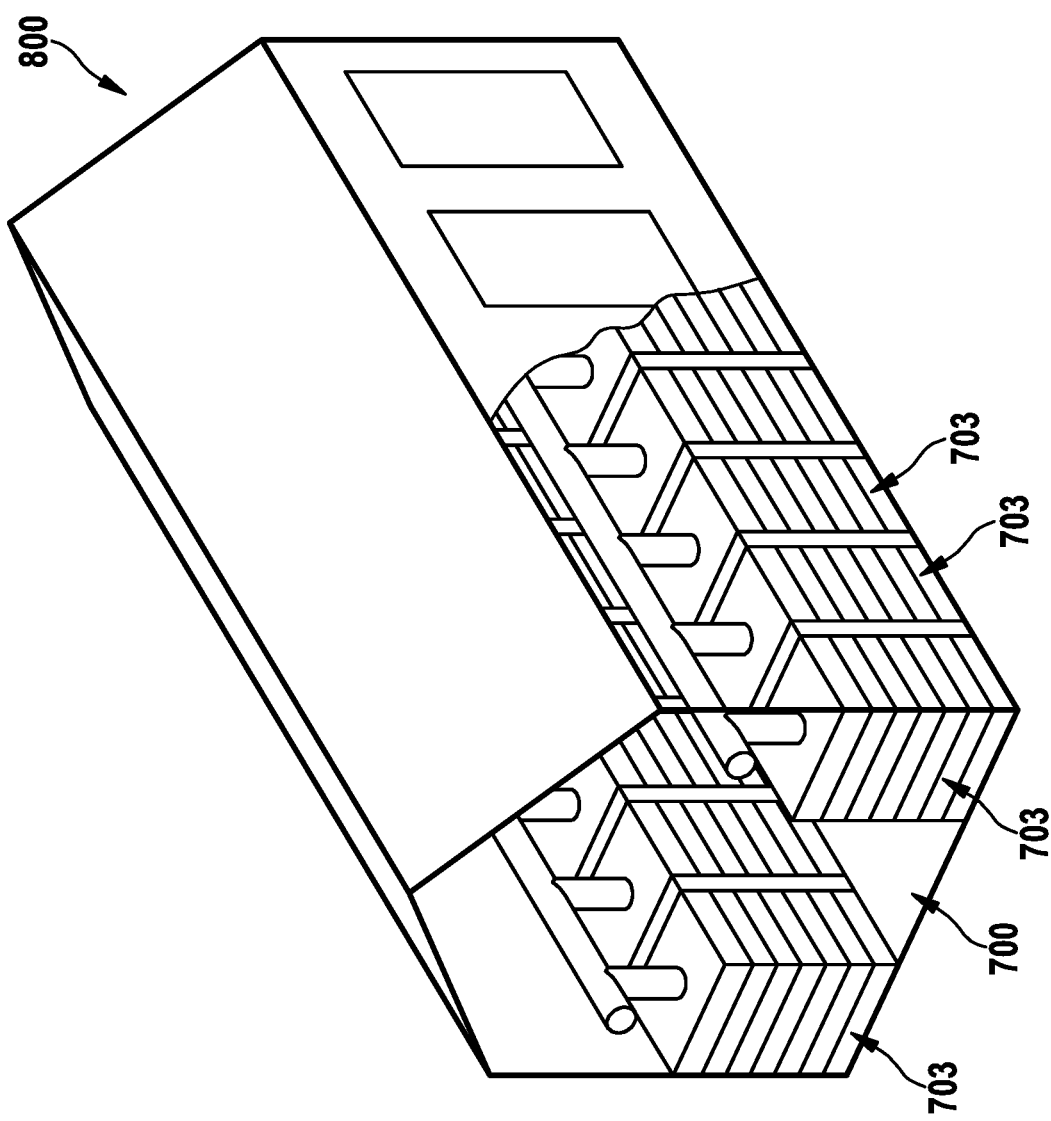
FIG. 36 shows a schematic representation of a rearing enterprise.
Figure 37:
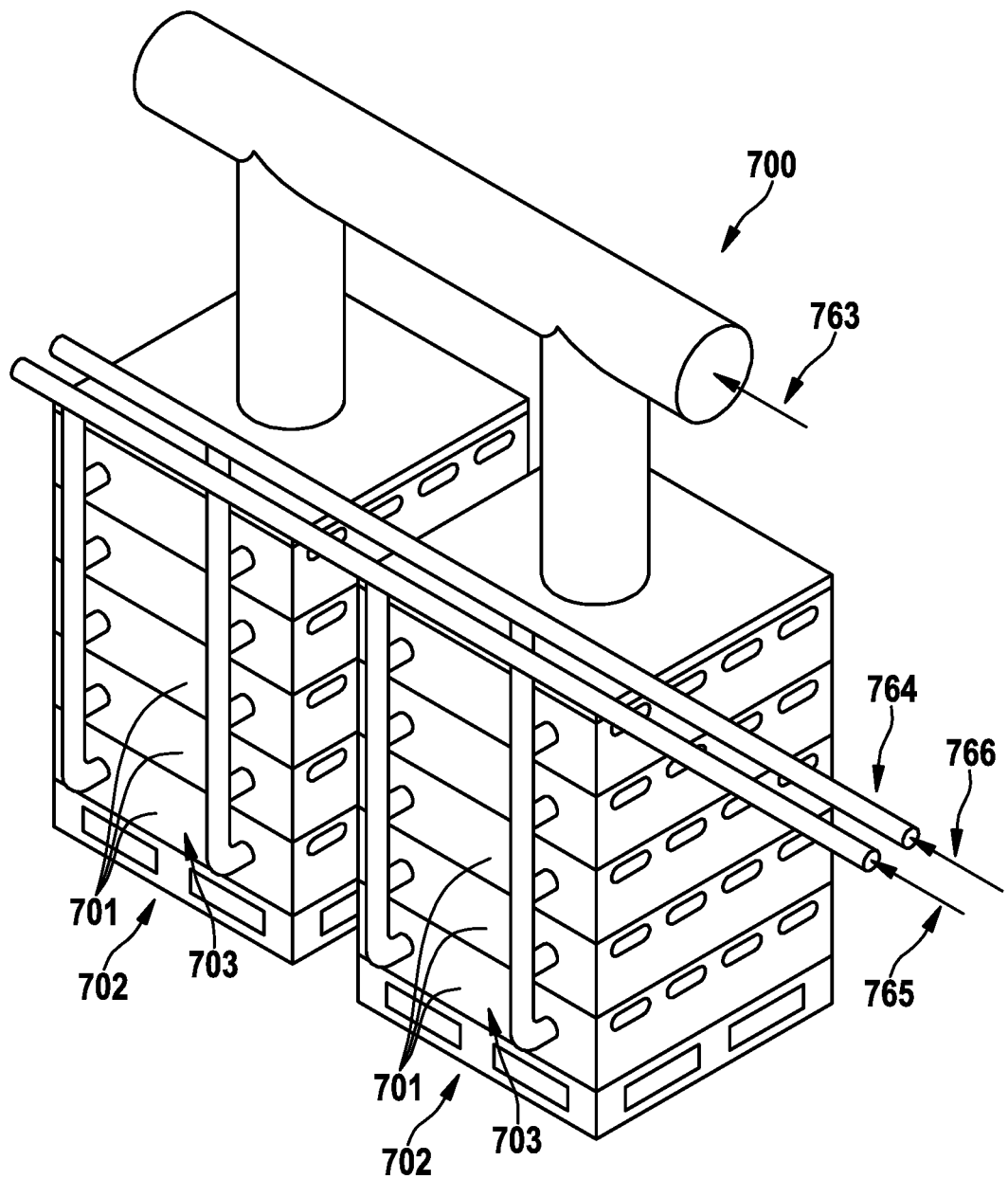
FIG. 37 shows a schematic representation of two units which, for the rearing of broilers, are connected to a ventilation system and a supply for feed.
Figure 39:
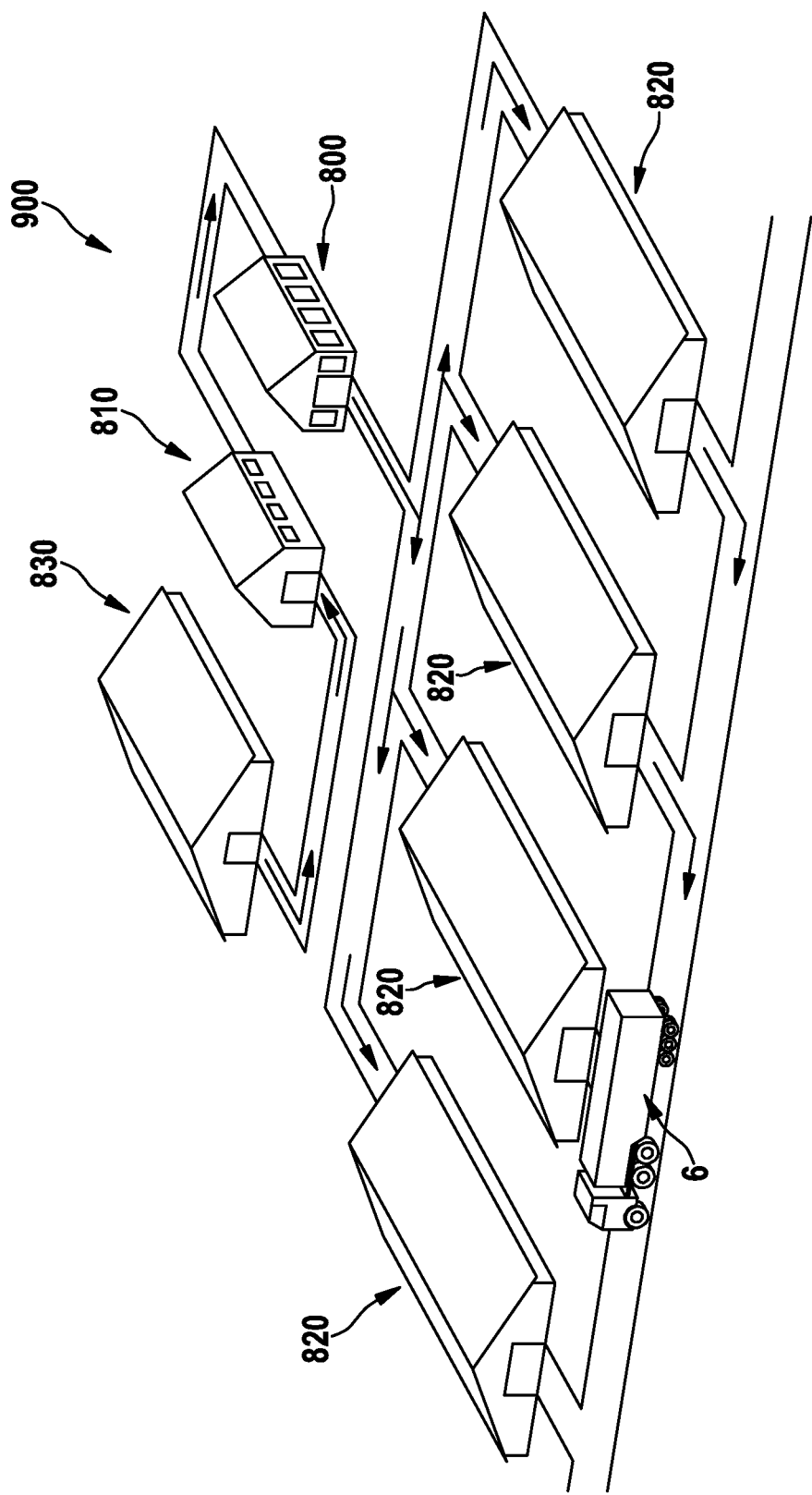
FIG. 39 shows a schematic representation of an agricultural installation from the breeding station to the loading station onto the transport trailers for transport to the poultry slaughterhouse.

A plurality of such containers 701 can be stacked to form a unit 703 (see FIG. 37). In this representation, two units 703 are each placed on a pallet 702 and connected on the one hand to a central ventilation system 763 and on the other hand to a central feed supply 764 and form the arrangement 700, which can be placed as desired and extended as desired. A separate supply 765 for water and a separate supply 766 for feed are preferably provided. In FIG. 36, an agricultural enterprise 800 is shown by way of example. An arrangement 700 is arranged in a sheltered region, for example a barn or the like. With reference to FIG. 39, the agricultural enterprise 800 is only part of an agricultural plant 900 which comprises, in addition to the agricultural enterprise 800 as a nesting house, a breeding station 810 before it and a rearing house 820 after it. The plant 900 can optionally also include a shed 830 for male and female breeding animals. Starting from the breeding station 810, the day-old chicks can remain in their containers permanently until they are transported, and in particular also during transport as slaughter-ready broilers, because on the one hand they are optimally ventilated and on the other hand they are supplied with sufficient feed. However, the containers 701 serve in particular for rearing the broilers for the first 20 days of the life cycle of a broiler, before the broilers are set down on the floor of the shed until they are ready for slaughter. The container 701 and plant 900 ensure that the broilers are kept in a particularly space-saving and environmentally friendly manner, accompanied by an improved rearing situation for the individual broilers. By accommodating the broilers at least for the first 20 days, more rapid growth of the broilers is also achieved.

Details of the individual embodiments can be combined into further embodiments within the scope of the patent claims.

What is claimed is:

1. A broiler container system comprising:
   a broiler container stack that comprises:
      a first broiler container having a floor and side walls defining an inner volume that is configured to receive and accommodate a live broiler, wherein the first broiler container is configured to be stackable with a second broiler container, wherein the first broiler container comprises a first segment of a first ventilation or air outflow column that extends through the inner volume and that is disposed at a distance from at least one of the side walls, wherein the first segment of the first ventilation or air outflow column is configured to align with a second segment of the first ventilation or air outflow column of the second broiler container and also for connection to an active ventilation system, and wherein an uppermost end of the first segment of the first ventilation or air outflow column of the first broiler container is configured to support a weight of the second segment of the first ventilation or air outflow column of the second broiler container;
   a pallet having an upper portion that comprises a first orifice that aligns with the first segment of the first ventilation or air outflow column so as to channel gas through the upper portion of the pallet and through the first segment of the first ventilation or air outflow column, and wherein the pallet and the broiler container stack are configured to couple together and move as a single unit, separate from at least one of a truck and a trailer; and a covering that is configured to extend over a top end of the broiler container stack, and wherein the covering is configured to at least one of channel gas (i) to and (ii) from the first segment of the first ventilation or air outflow column of the first broiler container.

2. The broiler container system according to claim 1, wherein the pallet comprises a wall at a perimeter of the pallet, with the wall comprising an opening that is in fluid communication with the first orifice.

3. The broiler container system according to claim 1, characterised in that the first broiler container comprises multiple segments for multiple ventilation or air outflow columns, in that the first broiler container has four side walls which form two pairs of opposing side walls, in that the first segment of the first ventilation or air outflow column of the first broiler container extends from the floor upwards through the inner volume, in that the first segment of the first ventilation or air outflow column of the first broiler container is formed integrally with the floor, and in that the first segment of the first ventilation or air outflow column of the first broiler container is situated in at least one row between one pair of opposing side walls at a distance of approximately D/(N+1), where D is a distance between the one pair of opposing side walls of the first broiler container and N is a number of segments of the ventilation or air outflow columns in the at least one row in the first broiler container.

4. The broiler container system according to claim 1, wherein the covering comprises a duct that aligns with the first segment of the first ventilation or air outflow column of the first broiler container, and wherein the duct is configured to be in fluid communication with the active ventilation system.

5. The broiler container system according to claim 1, wherein the first orifice is configured to be directly aligned with the first segment of the first ventilation or air outflow column when the broiler container stack is seated on the pallet.

6. The broiler container system according to claim 1, characterised in that the first segment of the first ventilation or air outflow column comprises at its uppermost end a broiler barrier, with the broiler barrier extending across an end opening of the first segment of the first ventilation or air outflow column to prevent the live broiler from entering the first segment of the first ventilation or air outflow column.

7. The broiler container system according to claim 1, characterised in that a length of the first broiler container is in one of the following ranges: a) from 0.50 m to 0.70 m, b) from 0.70 m to 0.90 m, and c) from 1.10 m to 1.30 m, and a width of the broiler container is in one of the following ranges: a) from 0.50 m to 0.70 m, b) from 0.70 m to 0.90 m, and c) from 1.10 m to 1.30 m.

8. The broiler container system according to claim 1, characterised in that all the side walls and the floor are in sheet form and closed, apart from locations for at least one of (i) the first segment of the first ventilation or air outflow column and (ii) at least one ventilation or air outflow opening defined in the first segment of the first ventilation or air outflow column.

9. The broiler container system according to claim 1, characterised in that the first broiler container is made of a plastics material, comprising an injection moulded monolithic structure.

10. The broiler container system according to claim 1, characterised in that there are provided at least two ventilation or air outflow columns which extend from the floor upwards through the inner volume.

11. The broiler container system according to claim 1, characterised in that the first segment of the first ventilation or air outflow column has elongate ventilation or air outflow openings, each having a longitudinal axis which is oriented with the longitudinal axis in a longitudinal direction of the first segment of the first ventilation or air outflow column.

12. The broiler container system according to claim 1, characterised in that a length of the first broiler container is in a range of from 2.10 m to 2.80 m, and in that the width of the first broiler container is in a range of from 0.70 m to 2.6 m.

13. The broiler container system of claim 1, wherein the broiler container stack further comprises the second broiler container, wherein the second broiler container being stacked on top of the first broiler container such that the second segment of the first ventilation or air outflow column of the second broiler container is located above the first segment of the first ventilation or air outflow column.

14. The broiler container system according to claim 13, wherein the first broiler container comprises a first segment of a second ventilation or air outflow column, and wherein the second broiler container comprises a second segment of a the second ventilation or air outflow column, wherein the first segment of the second ventilation or air outflow column, and the second segment of the second ventilation or air outflow column are aligned to form a portion of the second ventilation or air outflow column, and wherein the pallet comprises a second orifice that aligns with the second ventilation or air outflow column.

15. The broiler container system according to claim 13, characterised in that the broiler container stack has at least three floors which define inner volumes, with the first ventilation or air outflow column extending through the broiler container stack and into the pallet.

16. The broiler container system according to claim 13, wherein the covering comprises:

a first conduit that is aligned with the first ventilation or air outflow column; and a second conduit that is aligned with the second ventilation or air outflow.

17. The broiler container system according to claim 16, characterised in that the pallet comprises adapters in a form of ventilation or air outflow column sections which are designed and configured for connecting the first segment and the second segment of the first ventilation or air outflow column of first ventilation or air outflow column.

18. The broiler container system according to claim 1 further comprising the active ventilation system, wherein the active ventilation system is configured to actively ventilate the first broiler container.

19. A broiler container system comprising:

a broiler container stack that comprises:

a first broiler container having a floor and side walls defining an inner volume which is configured to receive and accommodate a live broiler, wherein the first broiler container is configured to be stackable with a second broiler container, wherein the first broiler container comprises a first segment of a first ventilation or air outflow column that extends through the inner volume and that is disposed at a distance from at least one of the side walls, wherein the first segment of the first ventilation or air outflow column of the first broiler container is configured to connect to a second segment of the first ventilation or air outflow column of the second broiler container and also for connection to an active ventilation system, wherein an uppermost end of the first segment of the first ventilation or air outflow column of the first broiler container is configured to support a weight of the second segment of first ventilation or air outflow column of the second broiler container;

a pallet having a different design than the first broiler container and that is sized and shaped to receive the broiler container stack, wherein an upper portion of the pallet comprises a first orifice that is configured to align with the first segment of the ventilation or air outflow column of the first broiler container so as to channel gas through the upper surface of the pallet and through the first segment of the first ventilation or air outflow column of the first broiler container, and wherein the pallet and the container stack assemble together to move as a single unit, separate from at least one of a truck and a trailer; and a covering having a different design than the first broiler container and that is sized and shaped to extend over a top end of the container stack, and wherein the cover comprises a duct that directly aligns with the first segment of the ventilation or air outflow column and that is configured to at least one of channel gas (i) to and (ii) from the first segment of the first ventilation or air outflow column of the first broiler container.

20. The broiler container system of claim 19, wherein a wall at a perimeter of the pallet defines an opening that is in fluid communication with the first orifice.

\* \* \* \* \*